United States Patent
Manduley et al.

(10) Patent No.: US 11,741,212 B2
(45) Date of Patent: Aug. 29, 2023

(54) APPARATUS, METHOD, AND COMPUTER PROGRAM PRODUCT FOR CLAIM MANAGEMENT DEVICE LOCKOUT

(71) Applicant: ASSURANT, INC., New York, NY (US)

(72) Inventors: Maria Manduley, Miami, FL (US); Charles Daniel Cartwright, Atlanta, GA (US); Gilberto Jose Almonte, Jr., Miami, FL (US)

(73) Assignee: Assurant, Inc., New York, NY (US)

( * ) Notice: Subject to any disclaimer, the term of this patent is extended or adjusted under 35 U.S.C. 154(b) by 0 days.

(21) Appl. No.: 17/656,135

(22) Filed: Mar. 23, 2022

(65) Prior Publication Data

US 2022/0327195 A1    Oct. 13, 2022

Related U.S. Application Data

(63) Continuation of application No. 16/745,138, filed on Jan. 16, 2020, now Pat. No. 11,308,195.

(60) Provisional application No. 62/793,337, filed on Jan. 16, 2019.

(51) Int. Cl.
*G06F 21/88* (2013.01)
*G06F 21/44* (2013.01)
(Continued)

(52) U.S. Cl.
CPC .............. *G06F 21/44* (2013.01); *G06F 21/33* (2013.01); *G06F 21/57* (2013.01)

(58) Field of Classification Search
CPC .......... G06F 21/44; G06F 21/33; G06F 21/57; G06F 21/88; H04W 12/126
See application file for complete search history.

(56) References Cited

U.S. PATENT DOCUMENTS

| 5,987,609 A | 11/1999 | Hasebe |
| 2003/0074577 A1 | 4/2003 | Bean et al. |

(Continued)

FOREIGN PATENT DOCUMENTS

JP    2013-503507 A    1/2013

OTHER PUBLICATIONS

U.S. Appl. No. 16/745,138, filed Jan. 16, 2020, U.S. Pat. No. 11,308,195, Issued.

(Continued)

*Primary Examiner* — Nelson S. Giddins
(74) *Attorney, Agent, or Firm* — Alston & Bird LLP

(57) ABSTRACT

Embodiments of the present disclosure relate to electronic lockout of a client device, specifically to managing electronic lockout of a client device associated with a claim process via a device protection program management system and third-party provider. In this regard, embodiments herein may process various data associated with determining whether to authorize a claim under a device protection program, and cause initiation of and/or termination of an electronic lockout of a client device depending on received data and/or lack of received data. In this regard, example embodiments include receiving a device claim request indication associated with a client device, where the client device is associated with a functionality lockout state; initiating a claim associated with the client device; causing initiation of an electronic lockout of the client device; processing the claim to determine whether to authorize the claim; and causing updating of the electronic lockout based on the determination.

20 Claims, 15 Drawing Sheets

(51) Int. Cl.
  *G06F 21/33* (2013.01)
  *G06F 21/57* (2013.01)

(56) References Cited

U.S. PATENT DOCUMENTS

| | | |
|---|---|---|
| 2006/0234679 A1 | 10/2006 | Matsumoto et al. |
| 2010/0145734 A1 | 6/2010 | Becerra et al. |
| 2011/0072520 A1* | 3/2011 | Bhansali ............ G06F 21/31 726/27 |
| 2012/0149332 A1 | 6/2012 | Wu et al. |
| 2013/0326643 A1 | 12/2013 | Pai et al. |
| 2014/0075550 A1 | 3/2014 | Mirashrafi et al. |
| 2014/0200929 A1* | 7/2014 | Fitzgerald ............ H04W 8/22 705/4 |
| 2016/0027120 A1 | 1/2016 | Smith |
| 2016/0381552 A1* | 12/2016 | Jakobsson ........... H04L 63/108 455/411 |

OTHER PUBLICATIONS

1st Examination Report for Australia Application No. 2020209849 dated Sep. 29, 2022 (4 pages).

Anonymous, System, Method, Apparatus, and Computer Program Product for Insurance and Replacement of a Mobile Device, May 8, 2013, IP.com No. IPCOM000227601D.

EPO The Hauge, Extended European Search Report for EP Application No. 20741443.4 dated Sep. 27, 2022 (13 pages), dated Sep. 27, 2022.

D. Bantz et al., Blue Star: Wireless Claims Processing for the Property and Casualty Industry, Apr. 16, 2011, ICEBE 2008, 1-12, 2.6.

ISA/US, International Preliminary Report on Patentability for PCT/US2020/013930, dated Jul. 29, 2021.

ISA/US, International Search Report and Written Opinion for PCT/US2020/013930, dated May 21, 2020.

Office Action for Japan Application No. 2021-539652 with English translation (15 pages).

* cited by examiner

APPARATUS, METHOD, AND COMPUTER PROGRAM PRODUCT FOR CLAIM MANAGEMENT DEVICE LOCKOUT

CROSS-REFERENCE TO RELATED APPLICATIONS

This application is a continuation of U.S. patent application Ser. No. 16/745,138, filed Jan. 16, 2020, titled "Apparatus, Method, And Computer Program Product For Claim Management Device Lockout," which claims the benefit of U.S. Provisional Application No. 62/793,337, filed Jan. 16, 2019, the content of which is incorporated herein by reference in its entirety.

TECHNOLOGICAL FIELD

Embodiments of the present disclosure generally relate electronic lockout of a device to enable a limited set of functionality, and specifically to management of an electronic lockout for a device based on processing of a claim associated with the client device by a device protection program management system.

BACKGROUND

Devices often are misplaced, stolen, or otherwise lost. Limiting access to such devices is desirable to prevent access to data stored on the device. Additionally, preventing access to some of all functionality of the device further reduces chances that an unauthorized user will obtain and continue to utilize the device, which would unjustly eliminate the need for the unauthorized user to obtain a device of their own for rightful use. Such access prevention is similarly desirable in circumstances where a device is damaged and to be submitted for repair or replacement. However, in circumstances where a device is to be locked, the device must be effectively managed for locking and/or unlocking at appropriate times. Improper unlocking of the device can provide access to unauthorized access to the device by users not intended and/or otherwise permissioned for accessing the device. Improper locking of the device can cause user frustration for the rightful owner and/or possessor, including in circumstances where the user requests lockout of the device in association with a loss and/or damage claim, and later locates the device or changes their mind to keep the device as is. Often, systems for managing lockout of the device, managing claims associated with the device, and/or managing initiation of such claims, increasing the difficulty in performing efficient and/or effective management of the electronic lockout as a claim is processed. Applicant has discovered problems with current implementations of secure device lockout management. Through applied effort, ingenuity, and innovation, Applicant has solved many of these identified problems by developing embodied in the present disclosure, which are described in detail below.

BRIEF SUMMARY

In general, embodiments of the present disclosure include apparatuses, computer-implemented methods, and computer program products for secure device lockout management. Other implementations for one or more of the alternative illuminator assemblies and/or alternative illumination imaging apparatuses will be, or will become, apparent to one with skill in the art upon examination of the following figures and detailed description. It is intended that all such additional implementations be included within this description be within the scope of the disclosure, and be protected by the following claims.

In accordance with one aspect of the present disclosure, a computer-implemented method for secure device lockout management is provided. The computer-implemented method may be performed via any combination of computing devices embodied in various hardware, software, firmware, and/or a combination thereof, as described herein. In at least one example embodiment, an example computer-implemented method includes receiving a device claim request indication, where the device claim request indication is associated with a client device, and wherein the client device is associated with a functionality lockout state. The example computer-implemented method further includes initiating a claim associated with the client device based on the device claim request indication. The example computer-implemented method further includes causing the functionality lockout state for the client device to be set to a locked out state. The example computer-implemented method further includes processing the claim to determine whether to authorize the claim. The example computer-implemented method further includes causing updating of the functionality lockout state for the client device based on the determination of whether to authorize the claim.

Additionally or alternatively, in some embodiments of the example computer-implemented method, causing the functionality lockout state for the client device to be set to a locked out state comprises transmitting a device lockout request to a manufacturer system associated with the client device, where the device lockout request is configured to cause the manufacturer system to set the functionality lockout state for the client device to the locked out state.

Additionally or alternatively, in some embodiments of the example computer-implemented method, causing the functionality lockout state for the client device to be set to a locked out state comprises transmitting a device lockout request to a third-party system associated with the client device, wherein the third-party system comprises a carrier system configured to cause a manufacturer system to set the functionality lockout state for the client device to the locked out state in response to receiving the device lockout request.

Additionally or alternatively, in some embodiments of the example computer-implemented method, processing the claim to determine whether to continue the locked out state for the client device comprises receiving user claim information associated with the claim within a first timestamp interval; and processing the user claim information to authorize the claim associated with the user claim information, and causing updating of the functionality lockout state for the client device based on the determination of whether to continue the locked out state client device comprises: causing the functionality lockout state for the client device to remain set to the locked out state.

Additionally or alternatively, in some embodiments of the example computer-implemented method, processing the claim to determine whether to continue the locked out state for the client device comprises: receiving user claim information associated with the claim within a first timestamp interval; and processing the user claim information to deny the claim associated with the user claim information, and causing updating of the functionality lockout state for the client device based on the determination of whether to continue the locked out state client device comprises: causing the functionality lockout state for the client device to be set to an unlocked state.

Additionally or alternatively, in some embodiments of the example computer-implemented method, processing the claim to determine whether to continue the locked out state for the client device comprises: determining user claim information associated with the claim has not been received within a first timestamp interval, and causing updating of the functionality lockout state for the client device based on the determination of whether to continue the locked out state client device comprises: causing the functionality lockout state for the client device to be set to an unlocked state.

In accordance with yet another aspect of the present disclosure, a computer program product for secure device lockout management is provided. In at least one example embodiment of the computer program product, the computer program product includes at least one non-transitory computer-readable storage medium having computer program code stored thereon. The computer program code is configured, in execution with at least one processor, to perform the computer-implemented method of any of the example embodiment computer-implemented methods described above.

In accordance with yet another aspect of the present disclosure, an apparatus for secure device lockout management is provided. In at least one example embodiment, the apparatus includes at least one processor and at least one non-transitory memory. The at least one non-transitory memory includes computer-coded instructions stored thereon. The computer-coded instructions, in execution with the at least one processor, configure the apparatus to perform the computer-implemented method of any of the example embodiment computer-implemented methods described above. Alternatively or additionally, in some embodiments, the apparatus includes means configured for performing each step of any of the computer-implemented methods described above.

In accordance with yet another aspect of the present disclosure, a second computer-implemented method for secure device lockout management is provided. The second computer-implemented method may be performed via any combination of computing devices embodied in various hardware, software, firmware, and/or a combination thereof, as described herein. In at least one example embodiment, a second example computer-implemented method includes receiving case confirmation data from a trusted third-party provider, the case confirmation data associated with a client device identifier for a client device. The second example computer-implemented method further includes causing rendering of a graphical user interface to a user comprising a request to enter user case information. The second example computer-implemented method further includes receiving, via the graphical user interface, the user case information. In a circumstance where the user case information is received within a threshold claim initiation period, the method further comprises initiating a claim based on the case confirmation data and the user case information; transmitting a claim created notification data object to the trusted third-party provider comprising computer program instructions configured to cause continuation of an electronic lockout for the client device; and receiving claim requirements data from at least one user device associated with the client device, the claim requirements data based on a predefined rule set associated with a device protection program. In a circumstance where the claim requirements data is received within a threshold claim completion period, the method comprises: transmitting a claim denied notification data object to the trusted third-party provider in a circumstance where the claim requirements data do not satisfy the predefined rule set, wherein the claim denied notification data object comprises computer program instructions configured to cause termination of the electronic lockout for the client device; and transmitting a claim authorized notification data object to the trusted third-party provider in a circumstance where the claim requirements data satisfy the predefined rule set, wherein the claim denied notification data object comprises computer program instructions configured to cause continuation of the electronic lockout for the client device.

Additionally or alternatively, in some example embodiments of the second example computer-implemented method, the second computer-implemented method further comprises comparing the claim requirements data with the predefined rule set to determine whether the claim requirements data satisfy the predefined rule set.

Additionally or alternatively, in some example embodiments of the second example computer-implemented method, the second computer-implemented method further comprises terminating processing of the case confirmation data in a circumstance where the user case data is not received from the at least one user device within the threshold claim initiation period.

Additionally or alternatively, in some example embodiments of the second example computer-implemented method, the second computer-implemented method further comprises extracting the device identifier from the case confirmation data.

Additionally or alternatively, in some example embodiments of the second example computer-implemented method, the second computer-implemented method further comprises identifying an authentication token from the case confirmation data; and retrieving third-party case data from the trusted third-party provider utilizing the authentication token, wherein the third-party case data comprises at least the device identifier.

Additionally or alternatively, in some example embodiments of the second example computer-implemented method, the computer-implemented method further comprises. Additionally or alternatively, in the circumstance where the claim requirements data is received within the claim requirements time threshold: comparing the claim requirements data with the predefined rule set to determine whether the claim requirements data satisfy the predefined rule set; and the method further comprises, in a circumstance where the claim requirements data satisfy the predefined rule set, authorizing the claim. Additionally or alternatively, in a circumstance where the claim requirements data do not satisfy the device predefined rule set, denying the claim.

Additionally or alternatively, in some example embodiments of the second example computer-implemented method, the second computer-implemented method further comprises in a circumstance where the claim requirements data is not received within the claim requirements time threshold, terminating processing of the claim; and transmitting a claim cancelled notification data object to the trusted third-party provider, wherein the claim cancelled notification data object is configured to cause the trusted third-party provider to terminate the electronic lockout for the client device.

In accordance with yet another aspect of the present disclosure, a second computer program product for secure device lockout management is provided. In at least one example embodiment of the second computer program product, the second computer program product includes at least one non-transitory computer-readable storage medium having computer program code stored thereon. The computer program code is configured, in execution with at least one processor, to perform the second computer-implemented method of any of the example embodiment second computer-implemented methods described above.

In accordance with yet another aspect of the present disclosure, a second apparatus for secure device lockout management is provided. In at least one example embodiment, the second apparatus includes at least one processor and at least one non-transitory memory. The at least one non-transitory memory includes computer-coded instructions stored thereon. The computer-coded instructions, in execution with the at least one processor, configure the second apparatus to perform the computer-implemented method of any of the second example embodiment computer-implemented methods described above. Alternatively or additionally, in some embodiments, the second apparatus includes means configured for performing each step of any of the second computer-implemented methods described above.

In accordance with yet another aspect of the present disclosure, a third computer-implemented method for secure device lockout management is provided. The third computer-implemented method may be performed via any combination of computing devices embodied in various hardware, software, firmware, and/or a combination thereof, as described herein. In at least one example embodiment, a third example computer-implemented method includes receiving client device event data objects associated with a client device, the client event data objects comprising a case initiation request. The third example computer-implemented method further includes transmitting electronic data signals to the client device configured to cause an electronic lockout of the client device. The third example computer-implemented method further includes transmitting case confirmation data to a device protection program management system, where the case confirmation data is based at least in part on a client device fault data object or a client device loss data object. The third example computer-implemented method further includes, in a circumstance in which a claim status update data object is received from the device protection program management system, performing a device lockout update action based at least on the claim status update data object.

Additionally or alternatively, in some embodiments of the third example computer-implemented method, the computer-implemented method further includes initiating a drop dead timer for a predetermined time period; and in a circumstance in which no claim status update data object is received from the device protection program management system within the predetermined time period or a claim denied notification data object is received from the device protection program management system within the predetermined time period, transmitting electronic data signals to the client device configured to cause termination of the electronic lockout of the client device.

Additionally or alternatively, in some embodiments of the third example computer-implemented method, performing the device lockout update action based on the claim status update data object includes in a circumstance where the claim status update data object comprises a claim denied notification data object, terminating the electronic lockout, and in a circumstance where the claim status updated data object comprises a claim authorized notification data object, continuing the electronic lockout for the client device.

Additionally or alternatively, in some embodiments of the third example computer-implemented method, the computer-implemented method further includes storing at least a portion of information associated with at least one of the client device event data object in response to receiving the client device event data objects, the portion of information comprising at least a client device identifier for the client device; receiving a case information request from the device protection program management system; retrieving the portion of the case information in response to receiving the case information request; and transmitting the portion of the case information to the device protection program management system in response to the case information request.

Additionally or alternatively, in some embodiments of the third example computer-implemented method, the computer-implemented method further includes receiving a claim cancelled notification data object from the device protection program management system; and terminating the electronic lockout for the client device.

Additionally or alternatively, in some embodiments of the third example computer-implemented method, the computer-implemented method further includes receiving user case information associated with the client device; and transmitting the user case information to the device protection program management system.

In accordance with yet another aspect of the present disclosure, a third computer program product for secure device lockout management is provided. In at least one example embodiment of the third computer program product, the third computer program product includes at least one non-transitory computer-readable storage medium having computer program code stored thereon. The computer program code is configured, in execution with at least one processor, to perform the computer-implemented method of any of the example embodiment third computer-implemented methods described above.

In accordance with yet another aspect of the present disclosure, a third apparatus for secure device lockout management is provided. In at least one example embodiment, the third apparatus includes at least one processor and at least one non-transitory memory. The at least one non-transitory memory includes computer-coded instructions stored thereon. The computer-coded instructions, in execution with the at least one processor, configure the third apparatus to perform the computer-implemented method of any of the third example embodiment computer-implemented methods described above. Alternatively or additionally, in some embodiments, the second apparatus includes means configured for performing each step of any of the third computer-implemented methods described above.

BRIEF DESCRIPTION OF THE DRAWINGS

Figure 1:
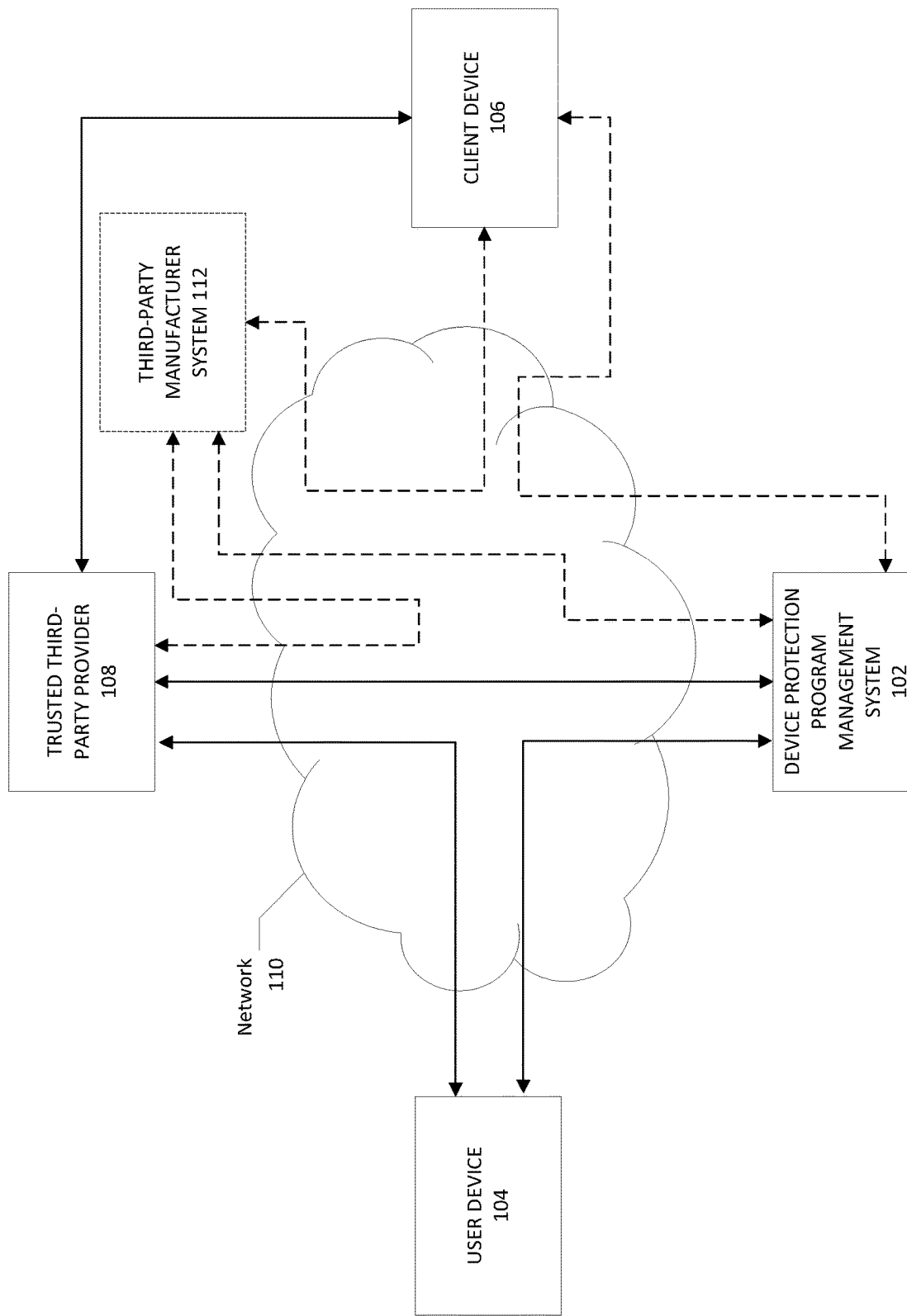
Figure 2A:
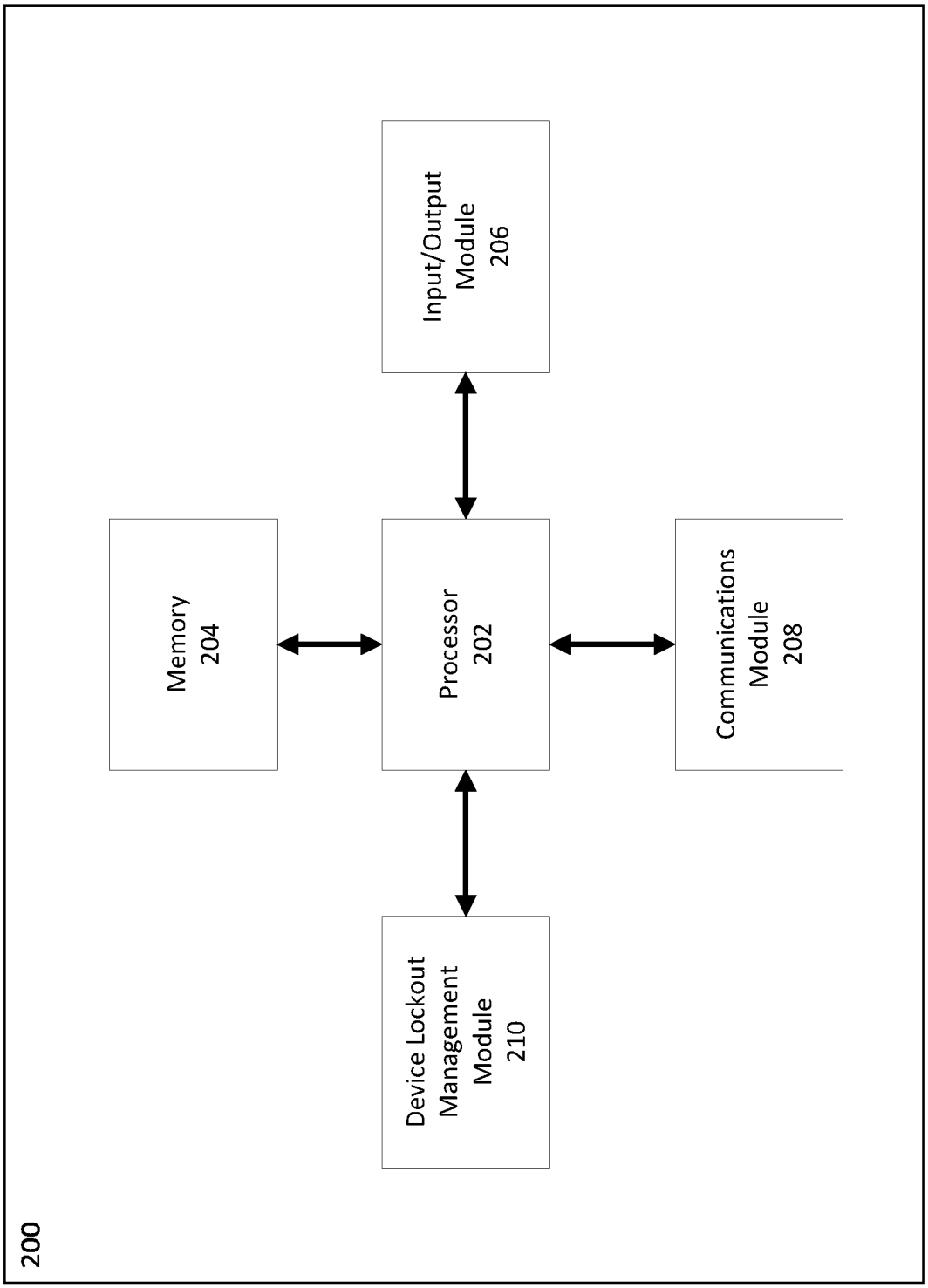
Figure 2B:
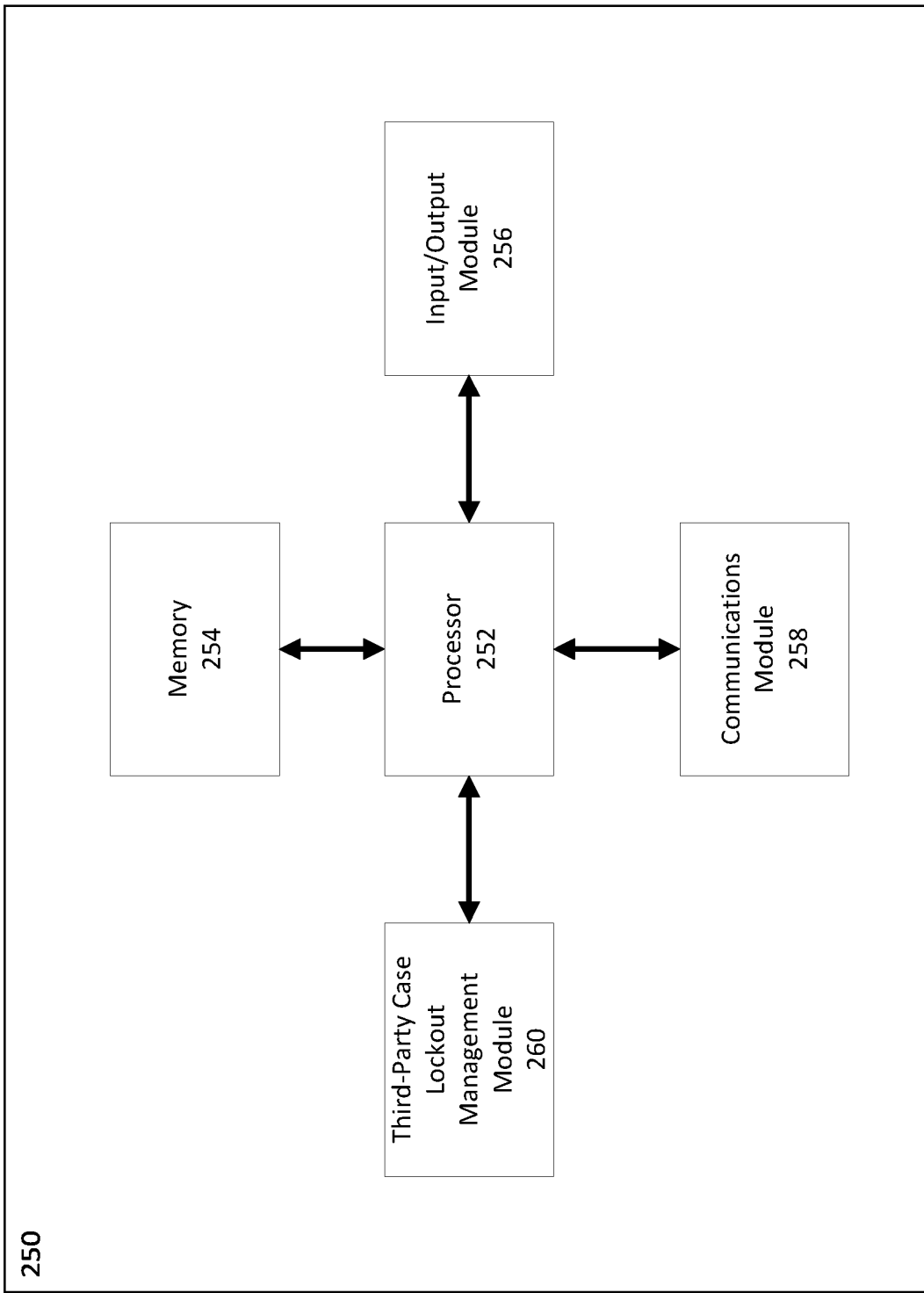
Figure 3:
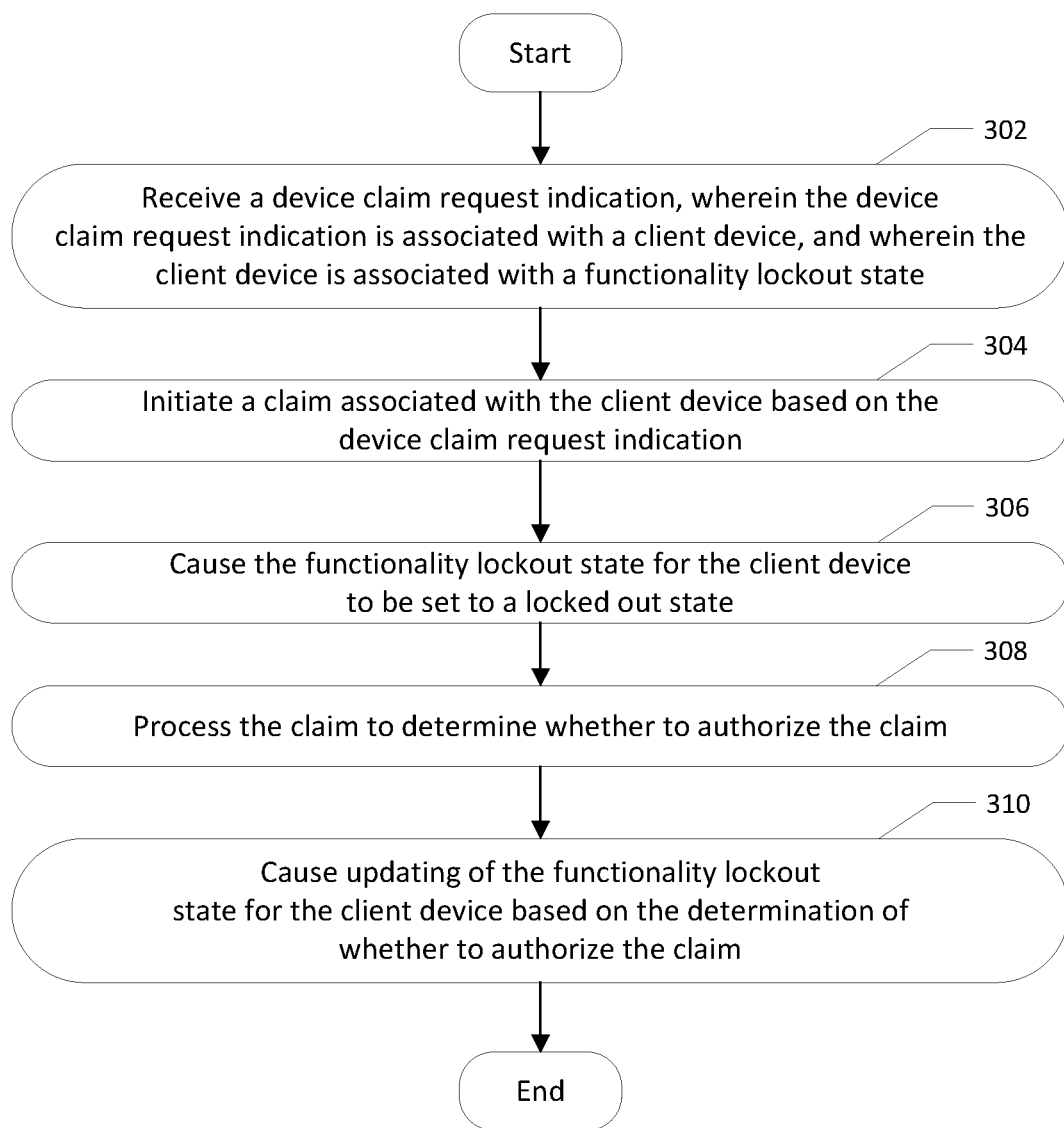
Figure 4A:
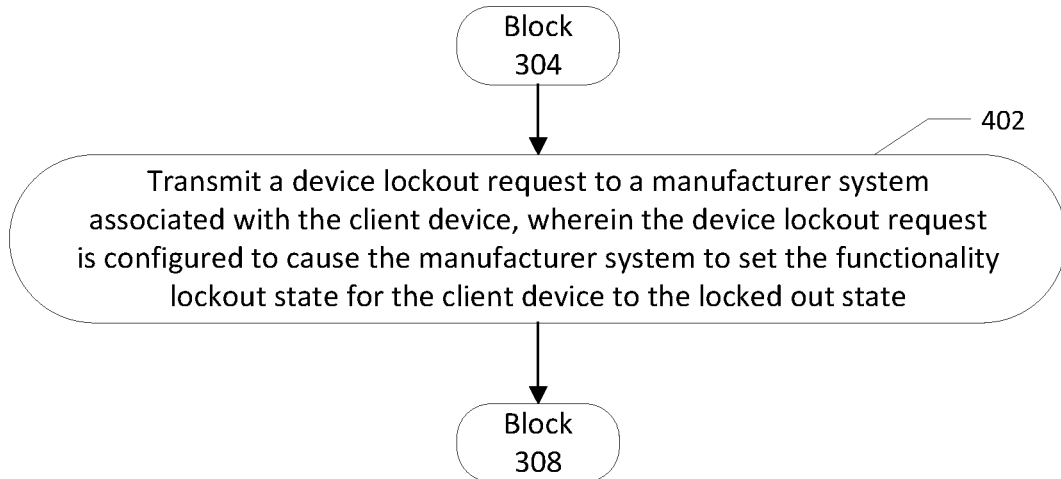
Figure 4B:
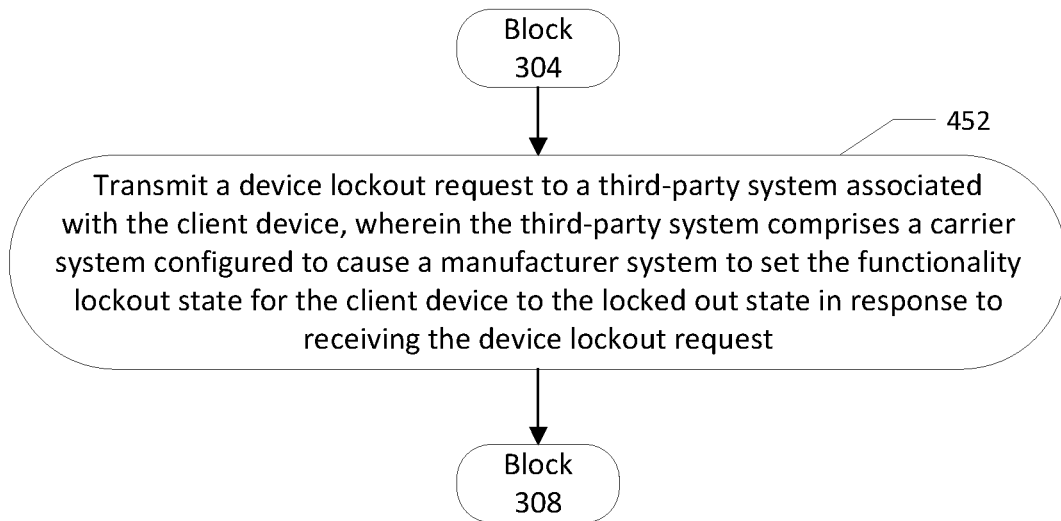
Figure 5:
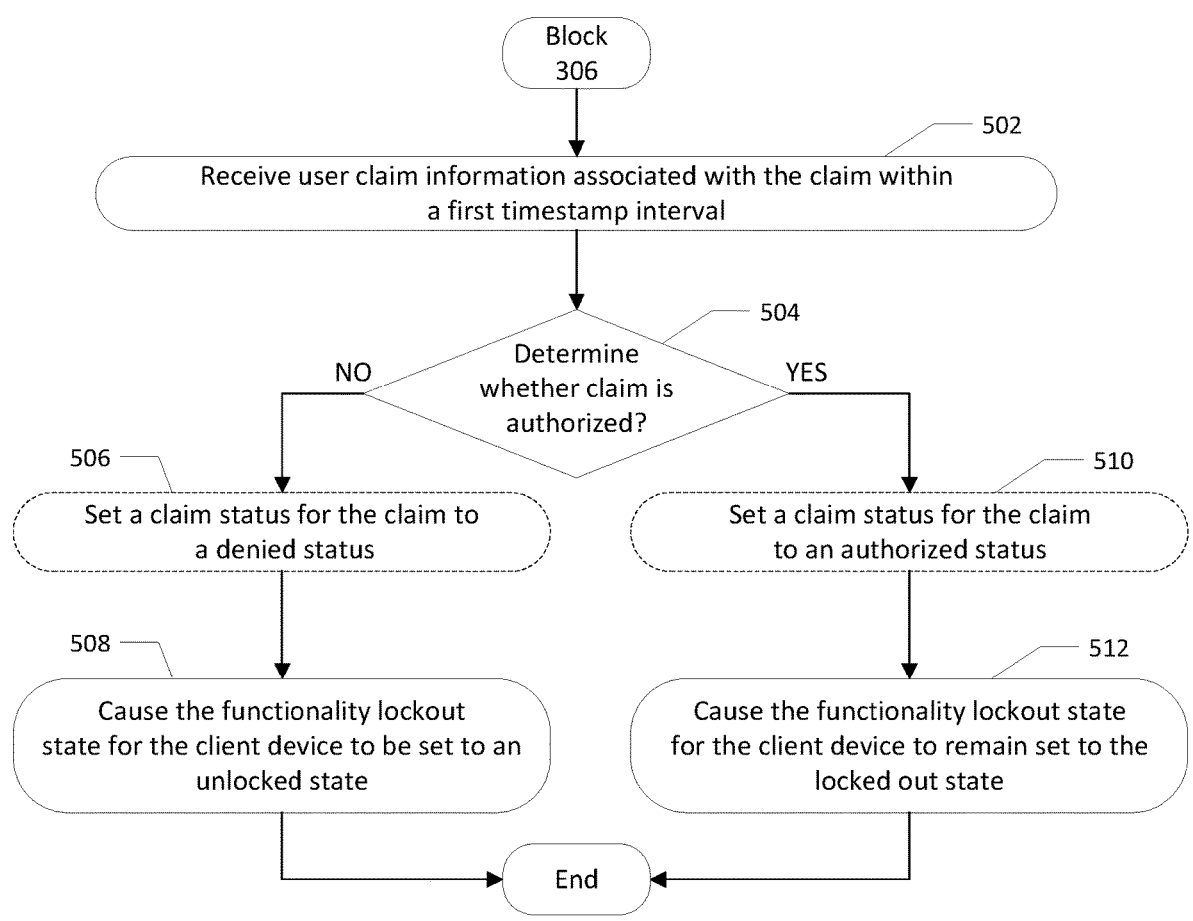
Figure 6A:
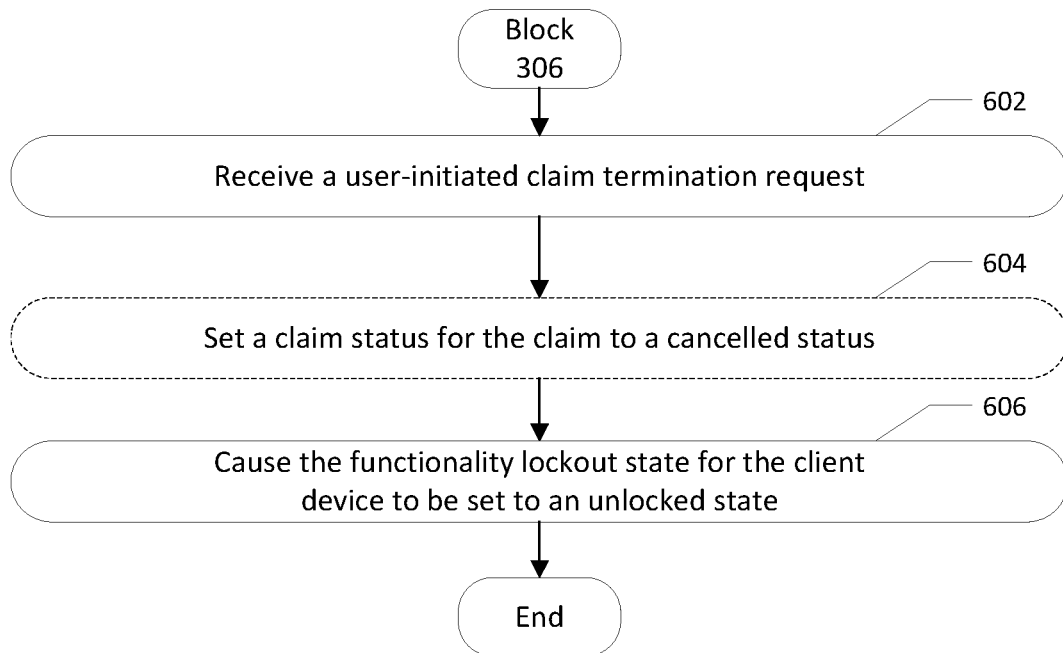
Figure 6B:
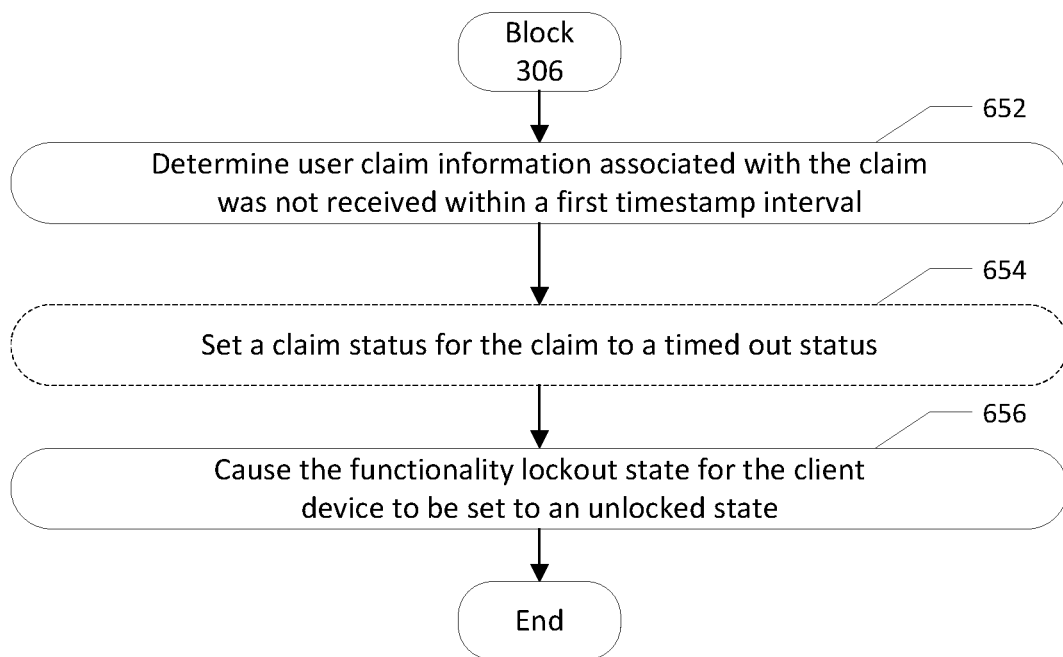
Figure 7:
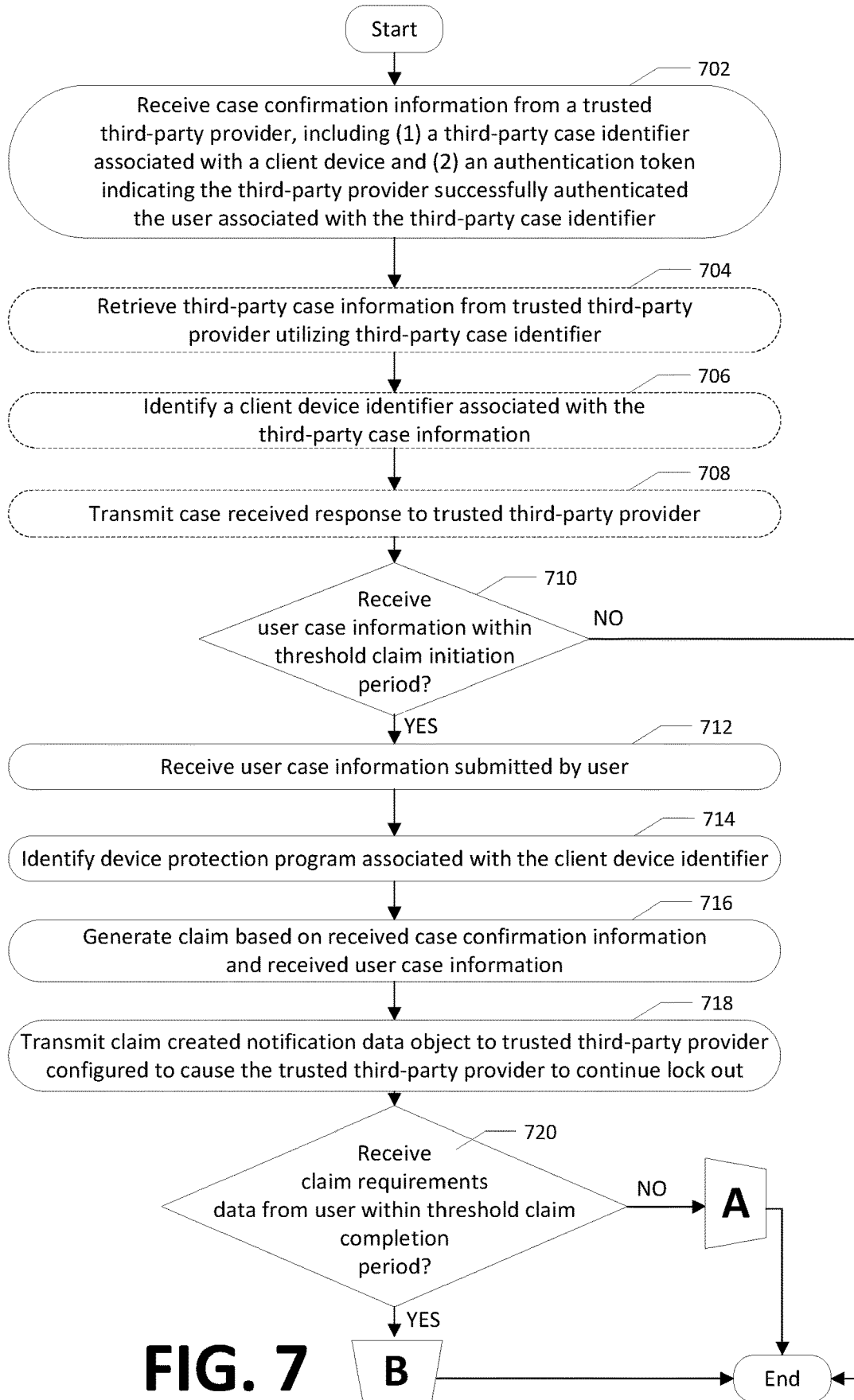
Figure 8:
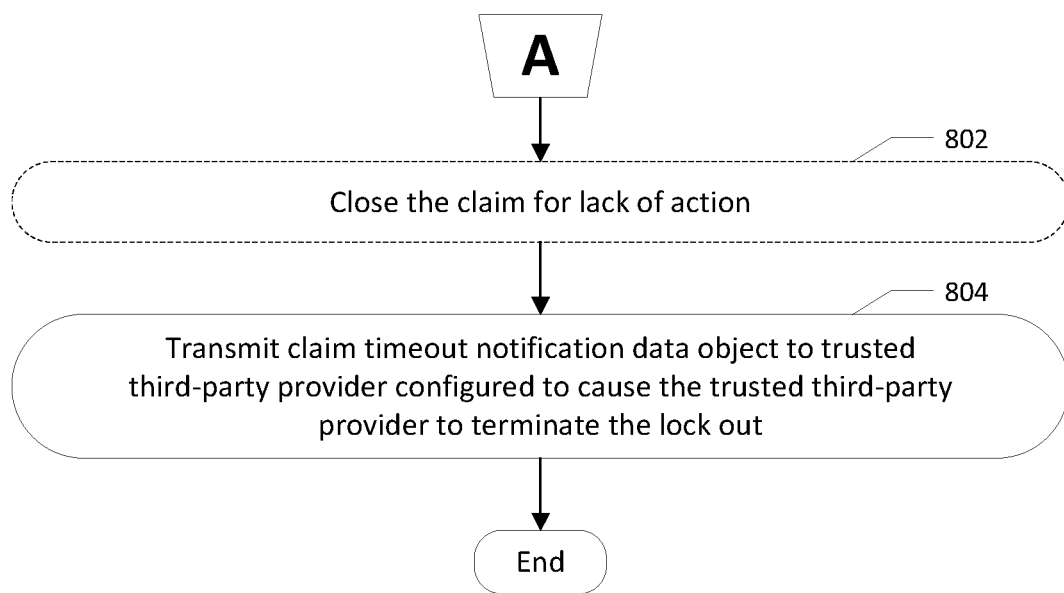
Figure 9:
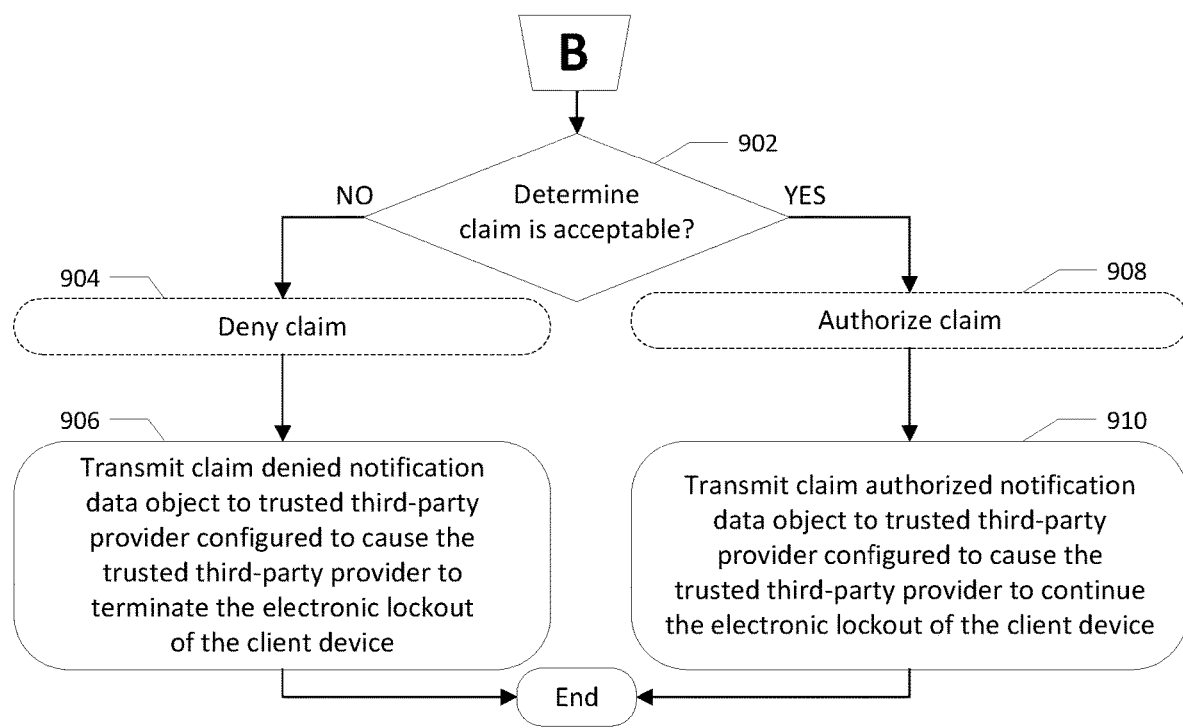
Figure 10:
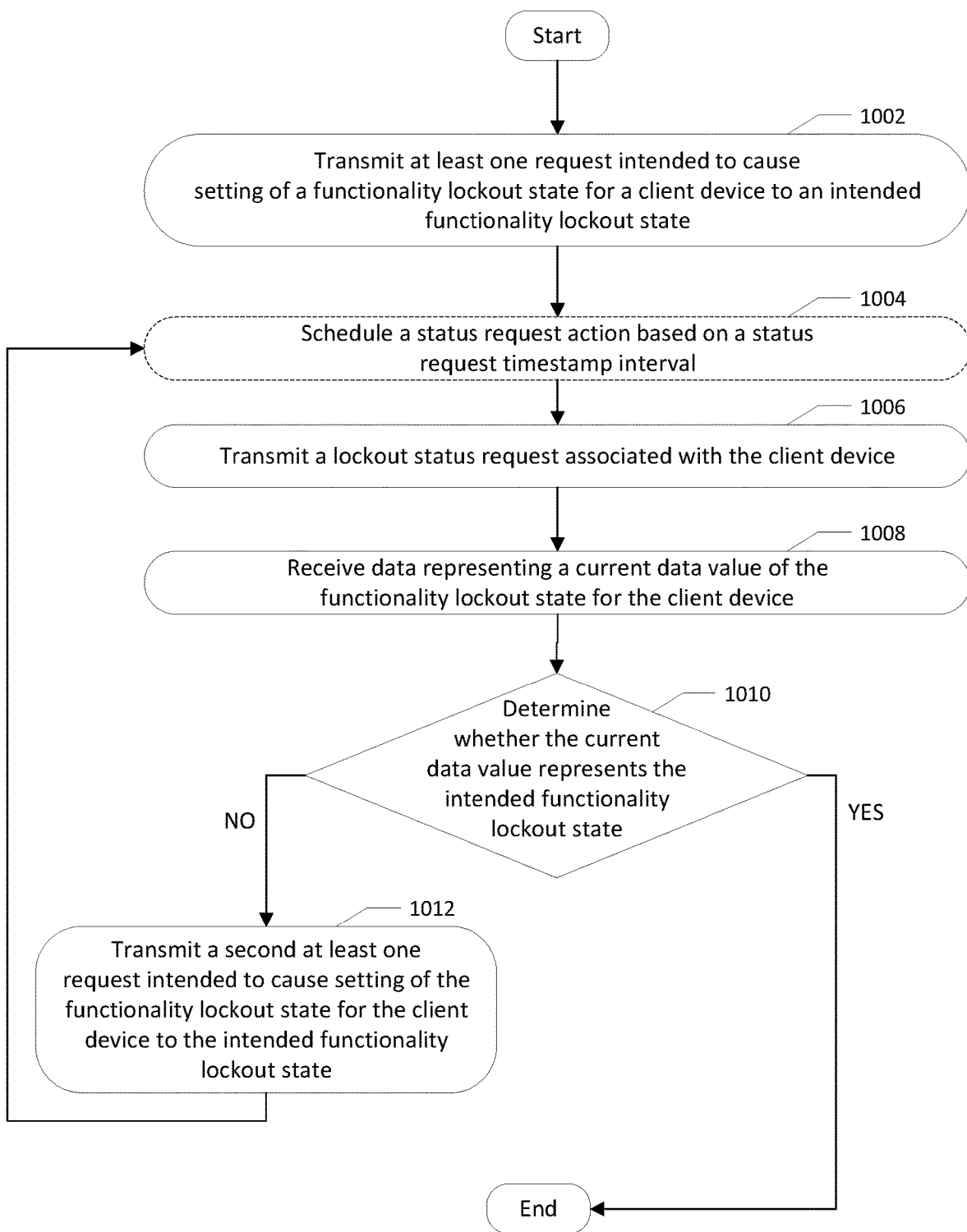
Figure 11:
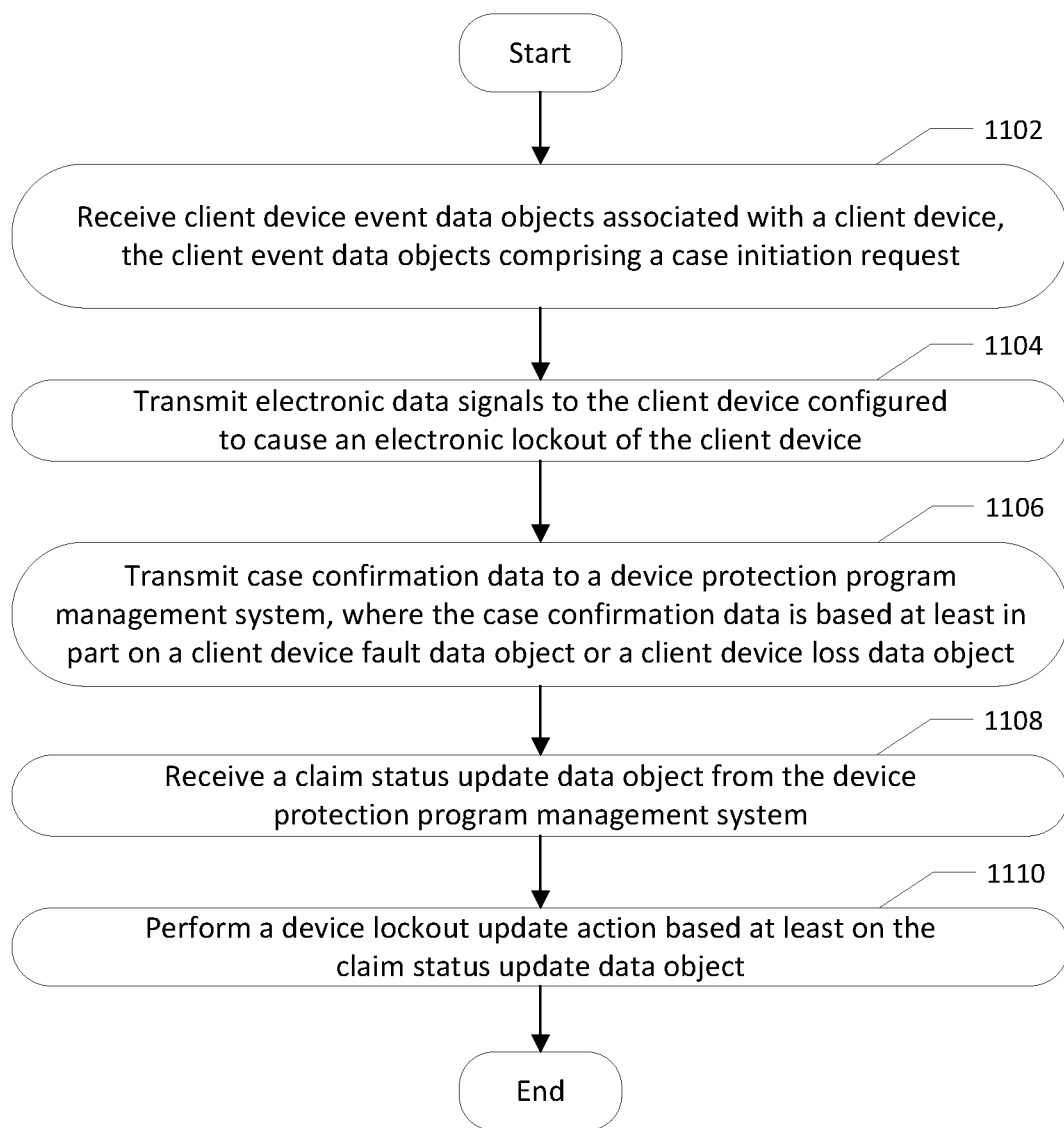
Figure 12:
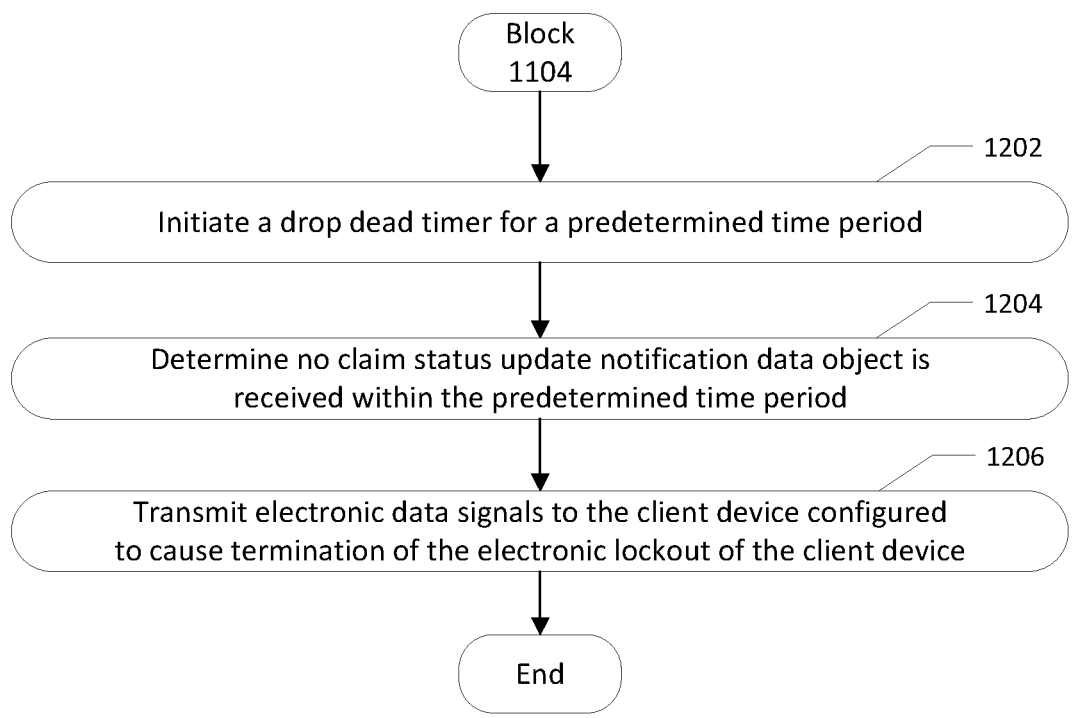
Figure 13:
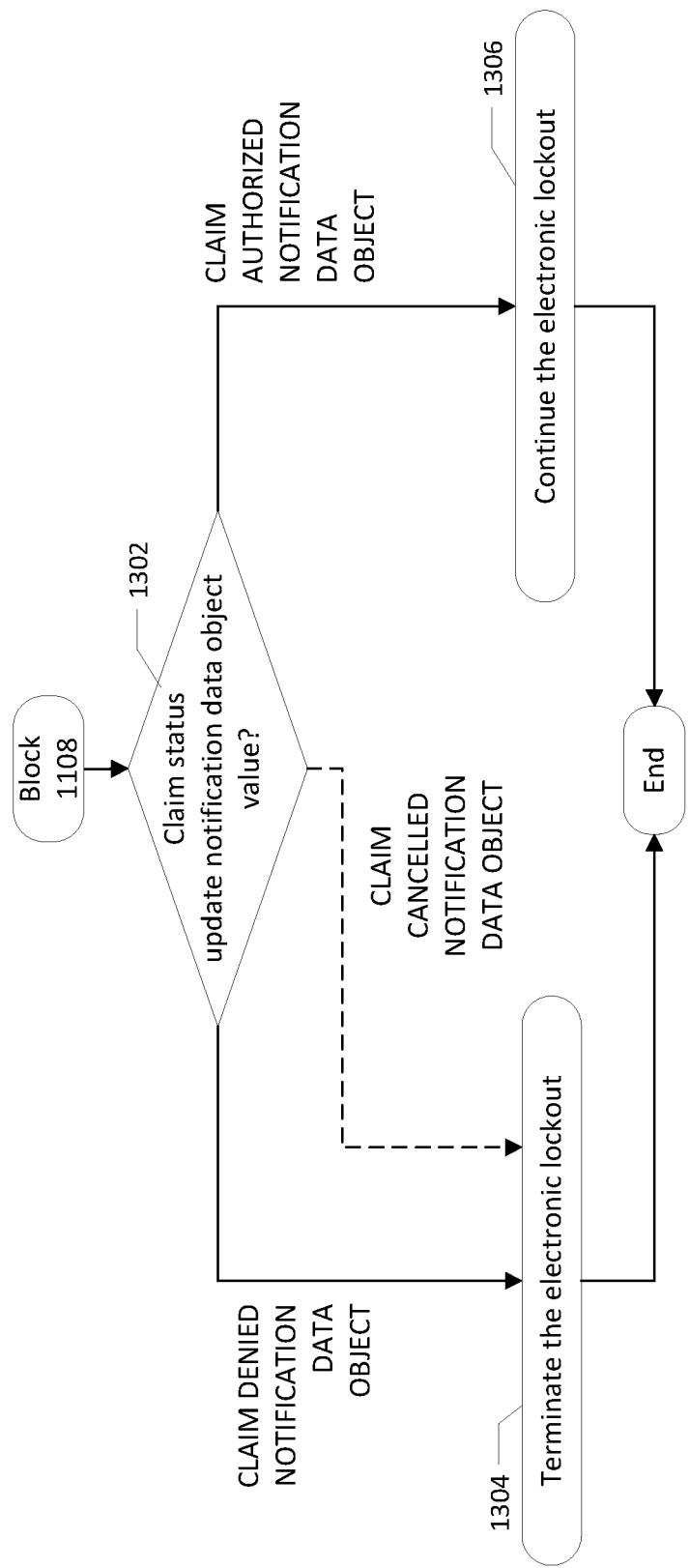
Figure 14:
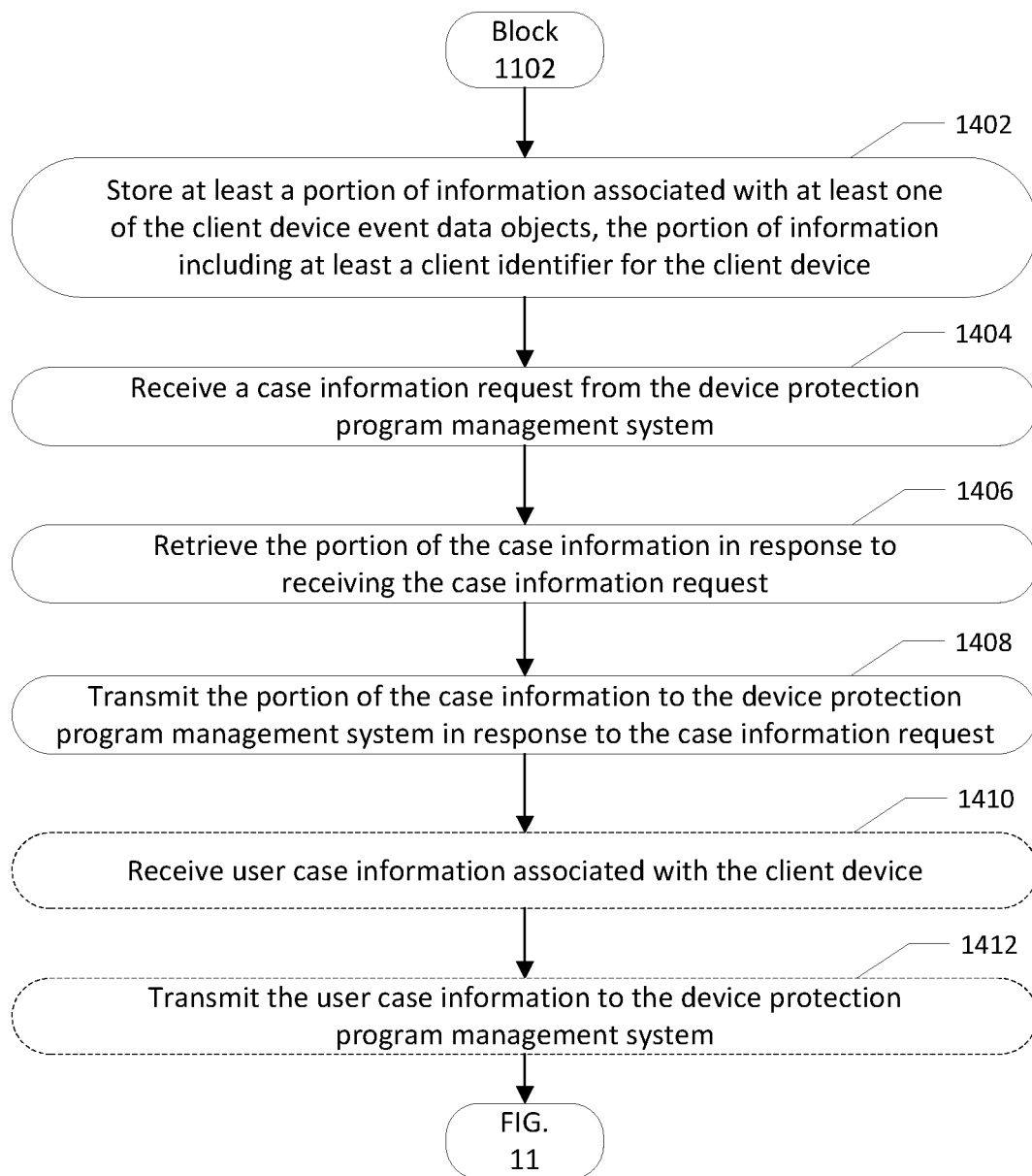

Having thus described the embodiments of the disclosure in general terms, reference now will be made to the accompanying drawings, which are not necessarily drawn to scale, and wherein:

FIG. 1 illustrates a block diagram of a system that may be specially configured within which embodiments of the present disclosure may operate;

FIG. 2A illustrates a block diagram of an example apparatus that may be specially configured in accordance with at least one example embodiment of the present disclosure;

FIG. 2B illustrates a block diagram of yet another example apparatus that may be specially configured in accordance with at least one example embodiment of the present disclosure;

FIG. 3 illustrates example operations of an example process for secured device lockout management in accordance with at least one example embodiment of the present disclosure;

FIG. 4A illustrates additional operations for an example process for secured device lockout management, specifically to cause the functionality lockout state for the client device to be set to a locked out state, in accordance with at least one example embodiment of the present disclosure;

FIG. 4B illustrates additional operations for an example process for secured device lockout management, specifically to cause the functionality lockout state for the client device to be set to a locked out state, in accordance with at least one example embodiment of the present disclosure;

FIG. 5 illustrates additional operations for an example process for secured device lockout management, specifically to process the claim to determine whether to authorize a claim and cause updating of the functionality lockout state for a client device based on the determination of whether to authorize the claim, in accordance with at least one example embodiment of the present disclosure;

FIG. 6A illustrates additional operations for an example process for secured device lockout management, specifically to process the claim to determine whether to authorize a claim and cause updating of the functionality lockout state for a client device based on the determination of whether to authorize the claim, in accordance with at least one example embodiment of the present disclosure;

FIG. 6B illustrates additional operations for an example process for secured device lockout management, specifically to process the claim to determine whether to authorize a claim and cause updating of the functionality lockout state for a client device based on the determination of whether to authorize the claim, in accordance with at least one example embodiment of the present disclosure;

FIG. 7 illustrates example operations of an example detailed process for secure device lockout management, specifically based on information from a trusted third-party provider, in accordance with at least one embodiment of the present disclosure;

FIG. 8 illustrates additional operations for an example detailed process for secured device lockout management, specifically to process the claim as timed out based on lack of user action, in accordance with at least one example embodiment of the present disclosure;

FIG. 9 illustrates additional operations for an example detailed process for secured device lockout management, specifically to process received claim requirements data and set an appropriate lockout state, in accordance with at least one example embodiment of the present disclosure;

FIG. 10 illustrates example operations for secured device lockout management, specifically for device lockout state verification, in accordance with at least one example embodiment of the present disclosure;

FIG. 11 illustrates operations of yet another example process for secured device lockout management, in accordance with at least one example embodiment of the present disclosure;

FIG. 12 illustrates additional operations for an example process for secured device lockout management, specifically to terminate an electronic lockout based on a drop dead timer, in accordance with at least one example embodiment of the present disclosure;

FIG. 13 illustrates additional operations for an example process for secured device lockout management, specifically to perform a device lockout update action based at least on a claim status update data object, in accordance with at least one example embodiment of the present disclosure; and FIG. 14 illustrates additional operations for an example process for secured device lockout management, specifically to provide information to a device protection program management system, in accordance with at least one example embodiment of the present disclosure.

DETAILED DESCRIPTION

Embodiments of the present disclosure now will be described more fully hereinafter with reference to the accompanying drawings, in which some, but not all, embodiments of the disclosure are shown. Indeed, embodiments of the disclosure may be embodied in many different forms and should not be construed as limited to the embodiments set forth herein, rather, these embodiments are provided so that this disclosure will satisfy applicable legal requirements. Like numbers refer to like elements throughout.

Overview

A device protection program management system may be configured to manage one or more device protection programs associated with various client devices, such as wireless devices. Via a device protection program, a user may enroll, or subscribe, a client device in a device protection program such that, in the event the client device is lost or stolen, the user may obtain a new device by filing a claim via the device protection program. In this regard, a claim may be initiated and/or processed via the device protection program management system for a request to replace, repair, and/or otherwise maintain the client device. In this regard, successful processing of the claim may allow fulfilment may involve and/or cause fulfilment of such actions associated with the device.

A user may enroll in a device protection program through a trusted third-party. For example, a user may purchase a client device from a device manufacturer, and similarly enroll in a device protection program via the device manufacturer. The device manufacturer may control systems capable of accessing one or more client devices, such as to obtain device information associated with the client device, information associated with applications installed on or associated with the client device, information associated with the status or performance of the client device, or the like. Additionally, a device manufacturer system may be configured to "lock out" a client device, such that the client device is inoperable or functions associated with the device cannot be accessed. The lock out may prevent an unauthorized user or fraudulent user from using a device that has been reported lost or stolen, or that has been indicated as damaged, inoperable, and/or the like.

The trusted third-party, such as the device manufacturer, may authenticate a user via one or more authentication processes. For example, the trusted third-party may require a user provide user authentication credentials (e.g., a username and password), and authenticate using two-factor authentication.

After a user authenticates with the trusted third-party, such as the device manufacturer, the user may be able to initiate a new third-party case by providing a loss indication associated with the client device covered by a device protection program, which indicates that the client device (e.g., mobile phone) is not in the possession of the user. Accordingly, the trusted third-party may generate a third-party case associated with the client device and indication.

In some instances, the fulfillment of any replacement in accordance with the device protection program is handled via a device protection program management system of a provider of the device protection program. Accordingly, information may be passed between the device protection program management system and trusted third-party (e.g., the device manufacturer) to enhance and ensure user security and privacy, to enable the provider of the device protection program to process a claim associated with the client device, and to not excessively restrict the user's use of the client device.

For example, once a user (e.g., the client owner of a client device) initiates a third-party case, for example via an interface of the device manufacturer, the device manufacturer may provide a user authentication token to the device protection program management system along with a third-party case identifier. The user authentication token may be used to verify that the user initiating the claim was authenticated via the device manufacturer. Accordingly, embodiments of the present disclosure enhance user security and user privacy by enabling a device protection program management system to identify and track a claim initiated at the device manufacturer without requiring the device manufacturer to provide user authentication information directly. The user authentication token and third-party case identifier may enable the device protection program management system to retrieve information about the client device and, in some embodiments, to confirm that via a device identifier that the client device is protected by one or more device protection programs.

The device protection program management system may also associate the trusted third-party, such as the device manufacturer, with one or more authentication factors, such as an IP address, an entity token, and/or the like, which the device protection program management system may utilize to confirm that a new third-party case identifier is associated with the device manufacturer. In this manner, the trusted third party may be responsible for authentication, and the device protection program management system may trust the authentication performed by trusted third party based on its recognition of the trusted third party. The device protection program management system may be configured to store claim/case information associated with the third-party case identifier, and may store the user authentication token, for future communications with the trusted third-party.

As the device protection program manages the generation and processing of a claim, the device protection program may cause the trusted third-party to keep the client device locked out in response to user information, provided within a pre-defined time period, indicating desire for the claim to continue. In some embodiments, if the device protection program management system does not confirm receipt and acceptance of the user authentication token and third-party case identifier, the trusted third party may reverse the lock out and allow access to the client device. For example, once the device manufacturer initiates a new third-party case and transmits the user authentication token and third-party case identifier to the device protection program management system, the device manufacturer may maintain the lock out for a threshold claim initiation period (e.g., 24 hours), unless the device protection program management system indicates that the user authentication token and third-party case identifier have been acknowledged and accepted (e.g., the device protection program management system may confirm that the token and identifier are valid and/or that the client device is protected by a device protection program). If an acknowledgement signal is transmitted from the device protection program management system to the trusted third party, the trusted third party may maintain the lock out and await further status signals from the device protection program management system, and the device protection program management system may begin a claim generation process.

The user may then be presented with an interface of the device protection program management system and may be allowed to submit a claim, which claim may be generated based at least in part on the inputs of the user into the device protection program management system, and the device protection program management system may then begin a claim generation time limit (e.g., 24 hours). If the user does not proceed with the claim (e.g., complete the claim generation process and input all of the required information) and the claim time limit elapses, the device protection program management system may determine the user has abandoned the claim, and the device protection program management system may transmit a status signal to the trusted third party to cause the trusted third party to terminate the lock out for the client device, returning the device to a functioning form (e.g., no claim is being submitted, and thus, it is assumed that the user no longer wishes to replace a lost or stolen device). During the initiation of the claim, before the claim is complete, the user may provide account, payment, incident-related affidavits and statements of fact, or other necessary information to complete the claim. Once the information is complete and the user authorizes the device protection program management system to proceed, the claim may be considered submitted and generated.

If a claim is submitted and authorized, the device protection program management system may proceed with fulfilling the claim. Fulfillment of the claim may result in a decision event, which may include accepting the claim (e.g., issuing a replacement device), denying the claim (e.g., refusing the replacement), and/or closing the claim for lack of activity. Accordingly, the device protection program management system may transmit one or more status signals to cause, for example, the device manufacturer to continue the lock out for the client device indefinitely, as a new device will be delivered to the user. If a claim is submitted and denied or closed due to inactivity, the device protection program management system may determine the claim is fraudulent, and cause the device manufacturer to terminate the lock out for the client device.

By authenticating a user utilizing an authentication token, or equivalent information, provided by the trusted third-party, embodiment device protection program management systems enhance user privacy by enabling authentication without requiring divulgence of the user's authentication credentials. Additionally, embodiment device protection program management systems enhance user security by causing the client device to be locked out or functional, depending on claim status, so that malicious actors cannot access client devices that are determined legitimately lost or stolen, and reduce the risk of fraud to the device protection program management system and trusted third party. The user is also not unreasonably restricted from their device by using multiple check points between the systems to restore access to the client device if the claim is not proceeding, either through user choice or system error.

Accordingly, embodiments of the present disclosure generate, manage, and/or process claims in a secure manner while maintaining appropriate device functionality for corresponding client devices. For example, in some embodiments, when a user loses a client device, or reports it stolen, and initiates a third-party case via a trusted third-party provider, the client device is locked out such that malicious users (e.g., a thief or a malicious finder of the device) cannot access the client device, thus enhancing user privacy and reducing fraud. However, if a user abandons their claim, or cancels their claim via a claim cancel interface provided via the device protection program management system, via a call center claim cancellation request, or the like, embodiment device protection program management systems are configured to provide notice to the trusted third-party resource, to cause the trusted third-party resource to return the device to a functional form. Additionally, utilizing a threshold claim initiation period and/or claim time limit, embodiments of the present disclosure are enabled to detect that a user has abandoned a case and/or associated claim, and cause the trusted third-party resource to return the device to a functional form to reduce the likelihood that a user is improperly or unduly locked out of their device if no longer pursuing a claim. Accordingly, embodiments of the present disclosure utilize a specific flow of information between separate systems and entities to enhance user security and maintain user privacy while providing a positive user claim management experience.

Definitions

The term "secure device lockout management" refers to a specialized hardware, firmware, and/or software level process for preventing access to some or all functionality of an electronic device, such as a user device, server, system, or the like. In some embodiments, secure device lockout management refers to a process for preventing access to some or all functionality of a client device by one or more communicable systems as described herein, for example a device protection program management system and at least one trusted third-party provider.

The term "device protection program management system" refers to any number of computing devices embodied in hardware, software, firmware, and/or a combination thereof, to perform one or more actions associated with enrolling and/or maintaining enrollment of one or more client devices in one or more associated device protection program(s), and/or one or more actions associated with receiving and/or processing data associated with one or more claims associated with a client device enrolled in a device protection program. Additionally or alternatively, in some embodiments, a device protection program management system is configured to perform one or more actions for secure device lockout management, as described herein.

The terms "trusted third-party provider" and "third-party provider" refer to one or more servers, systems, or other computing hardware, in communication with a device protection program management system and controlled by a second entity different than a first entity in control of the device protection program management system. In some embodiments, a trusted third-party provider is configured to communicate with a client device at least to control an electronic lockout of the client device, or is in communication with a second trusted third-party provider configured to communicate with a client device at least to control an electronic lockout of the client device.

The term "manufacturer system" refers to one example of a trusted third-party provider, in control of a manufacturer entity, associated with production, manufacturing, and/or creation of the hardware, software, and/or firmware embodying a client device. In some embodiments, for example, a manufacturer system is embodied by one or more computing devices controlled by a mobile device manufacturer entity and configured for communication with at least a client device, another trusted third-party system, a device protection program management system, and/or any combination thereof.

The term "carrier system" refers to one example of a trusted third-party provider, in control of a carrier entity, associated with providing cellular telephone and/or data connectivity services for one or more client devices enrolled in one or more services provided via the carrier system and/or one or more associated systems controlled by the carrier entity. In some embodiments, a carrier system is embodied by one or more computing devices controlled by the carrier entity and configured for communication at least with the device protection program management system.

The term "device" refers to hardware, firmware, and/or software embodying a computer providing specialized and/or generic computing functionality for use by a user of the device. The term "owner" refers to the rightful owner of a device, which may or may not be a user of the device. Non-limiting examples of a user device include a laptop, desktop, mobile phone, smartphone, tablet, personal digital assistant, smart home device, and customized computing hardware.

The term "client device" refers to a device enrolled in at least one device protection program managed via a device protection program management system. In at least one example context, the term "client device" refers to a mobile device (such as a smartphone) enrolled in an accidental damage protection program.

The term "client device identifier" refers to one or more data values uniquely identifying a client device. In some embodiments, client device identifier is embodied by one or more numeric, alphanumeric, and/or alphabetical identifier embodied in any of a number of computer data values types. For example, in at least one example context, non-limiting examples of a client device identifier include one or more data values encoded via American Standard Code for Information Interchange (ASCII) encoding standard, via a Unicode encoding standard, via a numeric data representation, or the like.

The term "user device" refers to a device communicable with at least a third-party provider and/or a device protection program management system over one or more communication networks. In some embodiments, a user device is utilized to access a third-party provider and/or device protection program management system for performing one or more actions for initiating and/or fulfilling a claim associated with a client device. In some embodiments, for example, the user device is a second device owned by the same owner as a client device to be associated with the claim.

The term "electronic lockout" refers to a state of a client device where the client device is configured to perform a limited set of functionality. In some embodiments, an electronic lockout of a client device is initiated by communication between the client device with one or more remote systems, for example a trusted provider system and/or a device protection program management system. In some embodiments, during an electronic lockout of a client device, the client device is enabled to at least receive one or more signals for terminating the electronic lockout, and/or is enabled to perform at least one permissible limited functionality action(s).

The term "device lockout update action" refers to one or more actions performed by a device protection program management system to initiate, alter, and/or terminate an electronic lockout of at least one client device. In at least some embodiments, a device lockout update action includes, without limitation, setting a functionality lockout state of a client device to initiate and/or terminate the electronic lockout of the client device.

The term "functionality lockout state" refers to an electronic data value representing whether an electronic lockout is currently affecting a client device. In some embodiments, for example, a functionality lockout state for a client device refers to electronic data managed by the client device, and in some embodiments, which can be retrieved by one or more remote systems via one or more request(s).

The term "locked out state," associated with a client device, refers to a first unique electronic data value indicating that the client device is in an electronic lockout, and thus is associated with limited functionality.

The term "device lockout request" refers to electronically generated data associating with setting a functionality lockout state for a client device to a locked out state. In this regard, a device lockout request causes initiation of an electronic lockout of the client device. In some embodiments, a device lockout request is generated and/or transmitted from a device protection program management system to one or more third-party providers, such as a carrier system and/or a manufacturer system, directly or indirectly in communication with the client device to be locked out.

The term "unlocked state," associated with a client device, refers to a second unique electronic data value indicating that the client device is not in an electronic lockout.

The term "device unlock request" refers to electronically generated data associating with setting a functionality lockout state for a client device to an unlocked state. In this regard, a device unlock request causes termination of an electronic lockout of the client device. In some embodiments, a device lockout request is generated and/or transmitted from a device protection program management system to one or more third-party providers, such as a carrier system and/or a manufacturer system, directly or indirectly in communication with the client device to be unlocked.

The term "device claim request indication" refers to data received by a device protection program management system, for example from a user device or a third-party provider, indicating a request to initiate generation and/or processing of a claim associated with a client device. In some embodiments, a device protection program management system receives data representing a device claim request indication from a user device indirectly through a third-party provider in response to submission of information from the user device to the third-party provider.

The term "claim" refers to electronic data managed by a device protection program management system representing a request to replace, repair, and/or otherwise alter a client device based on an associated device protection program for the client device.

The term "claim status" refers to electronically managed data parameter in and/or associated with a claim, where the value for the parameter indicates whether a claim has been processed and/or fulfilled in accordance with the corresponding device protection program. In at least one example context, the value of a claim status represents, without limitation, a pending status, an authorized status, a denied status, a cancelled status, and/or a timeout status, as described herein. In some embodiments, the device protection program is configured to perform a limited subset of actions for a claim based on the corresponding claim status for the claim.

The term "pending status" refers to an electronic data value representing a claim has been submitted, but not yet fully processed via a device protection program management system. In some embodiments, a pending status indicates that further processing of the claim requires submission of additional data. Additionally or alternatively for claims in a pending status, in some embodiments, a device protection program management system is configured to enable one or more actions for submitting additional data, and/or for cancelling processing of the claim.

The term "authorized status" refers to another electronic data value representing a claim has been submitted, fully processed, and authorized for fulfilment via a device protection program management system (i.e., the claim was "authorized"). In some embodiments, for claims in an authorized status, a device protection program management system is configured to enable one or more actions for fulfilling the claim. In some embodiments, once the claim is set to an authorized status, the device protection program prevents cancelling the claim.

The term "denied status" refers to another electronic data value representing a claim has been submitted, fully processed, and not authorized for fulfilment via a device protection program management system (i.e., the claim was "denied"). In some embodiments, for claims in a denied status, a device protection program management system prevents cancelling the claim.

The term "cancelled status" refers to another electronic data value representing a claim has been cancelled by a user via the device protection program management system. In some embodiments, a device protection program management system is configured to enable or more actions for cancelling a claim while the claim has not yet been fully processed, for example when it is at least in a "pending status."

The term "timeout status" refers to refers to another electronic data value representing a claim has been generated, but additional data has not been received, within a required timestamp interval. In some embodiments, a device protection program management system is configured to automatically perform one or more actions for setting a claim status to a timeout status.

The term "claim status update data object" refers to an electronically managed data object representing the value for a claim status for a claim. In some embodiments, a claim status update data object is generated and/or otherwise transmitted by a device protection program management system to a third-party provide upon updating, by the device protection program management system, of the claim status for the claim.

The term "claim created notification data object" refers to an electronically managed data object generated by a device protection program management system and/or transmitted from the device protection program management system to a third-party provider, where the data object represents generation and/or storage of a claim by the device protection program management system.

The term "claim authorized notification data object" refers to an electronically managed data object generated by a device protection program management system, and/or transmitted from the device protection program management system to a third-party provider, where the data object represents setting of the claim status for a claim to an authorized status.

The term "claim denied notification data object" refers to an electronically managed data object generated by a device protection program management system, and/or transmitted from the device protection program management system to a third-party provider, where the data object represents setting of the claim status for a claim to an authorized status.

The term "claim cancelled notification data object" refers to an electronically managed data object generated by a device protection program management system, and/or transmitted from the device protection program management system to a third-party provider, where the data object represents setting of the claim status for a claim to a cancelled status.

The term "claim timeout notification data object" refers to an electronically managed data object generated by a device protection program management system, and/or transmitted from the device protection program management system to a third-party provider, where the data object represents setting of the claim status for a claim to a timeout status.

The term "case confirmation data" refers to data received by a device protection program management system, from a third-party provider and/or a user device, that includes user-submitted data for use in generating a claim for a client device under a corresponding device protection program. In some example embodiments, case confirmation data includes some or all data received by a third-party provider associated with a user request to initiate a claim for a client device, and/or third-party provider generated data associated with such a request. In at least one example context, case confirmation data represents an example device claim request indication.

The term "authentication token" refers to electronically managed data that represents a user identity was validated by a third-party provider. In this regard, in some embodiments, an authentication token includes data indicating that a third-party provider successfully validated the identity of a user associated with submitted data utilizing one or more authentication processes. In some embodiments, the third-party provider generates the authentication token, and/or provides the authentication token to the device protection program management system for use in confirming the identity of the user is valid, and/or accessing and/or retrieving information stored by the third-party provider. In some embodiments, the authentication token includes algorithmic and/or cryptographic information validating the token with respect to the third-party provider that generated it, and/or one or more users or user accounts that were validated by the third-party provider.

The term "case information request" refers to electronically managed data transmitted from a device protection program management system to a third-party provider representing a request for at least some information maintained by the third-party provider associated with user-submitted data to initiate a claim. In some embodiments, a case information request includes an authentication token associated with the third-party provider, such that the third-party provider may use the authentication token to verify the identity of the device protection program management system and/or identify the information to be retrieved and/or transmitted in response to the request.

The term "third-party case data" refers to information stored by a third-party provider associated with a user-submitted request to initiate a claim associated with a client device. In some embodiments, a device protection program management system is configured to retrieve third-party case data associated with a claim from a third-party provider using data stored associated with the claim, for example an authentication token for the third-party provider.

The term "user case information" refers to user-submitted information to complete initiation of a claim associated with a client device. In some embodiments, a device protection program management system receives initial information, such as third-party case data, from a third-party provider, and subsequently receives user case information associated with the third-party case data from a user device. In some embodiments, a device protection program management system is configured to receive user case information directly from a user device. In other embodiments, a device protection program management system is configured to receive user case information indirectly through a third-party provider.

The term "device protection program" refers to electronically managed data representing a set of support and/or protection actions for one or more devices. In this regard, in some embodiments, a device protection program defines one or more circumstances under which a device may be replaced, repaired, and/or otherwise supported, by an entity at no cost and/or a reduced cost to the device owner and/or possessor. In some embodiments, a device protection program is represented by a predefined rule set for receiving one or more fulfillment actions associated with the device protection program.

The term "predefined rule set" refers to any number of electronically performed comparison actions, determination actions, and/or data checking actions, associated with one or more claims, that must be satisfied for the claim to be authorized. In some embodiments, the predefined rule set embodies a device protection program, such that an initiated claim associated with the device protection program will be authorized in a circumstance where data submitted associated with the claim satisfies some or all of the predefined rule set. Examples of a predefined rule in a predefined rule set includes, without limitation, a data check that a user submits data within a predetermined timestamp interval, that certain data be submitted by the user (e.g., sufficient loss or damage event information), and/or that submitted data include certain data values (e.g., damage events are within a predetermined set of covered data values).

The term "claim requirements data" refers to user-submitted data associated with a particular claim for comparison with one or more rules of a predefined rule set representing a device protection program.

The term "timestamp interval" refers to a time period embodied by one or more timestamps. In some embodiments, a timestamp interval is embodied by a start timestamp and an end timestamp.

The term "threshold claim initiation period" refers to a timestamp interval for which the user must submit user case information to a device protection program management system to initiate a claim associated with third-party case data.

The term "threshold claim completion period" refers to a timestamp interval for which the user must submit claim requirements data to a device protection program management system to enable complete processing of an initiated claim. In some embodiments, a device protection program is configured to set a claim status for an initiated claim to a predefined status, for example a timeout status, in a circumstance where claim requirements data is not received for the claim within the threshold claim completion period.

The term "client device event data object" refers to data received from a user device associated with a client device indicating a user request to initiate a claim associated with the client device. In some embodiments, a client device event data object is received by a third-party provider from a user device.

The term "case initiation request" refers to data transmitted from a third-party provider to a device protection program management system to indicate a user has requested initiation of a claim associated with a client device. In some embodiments, a case initiation request includes at least case confirmation data for use in generating the claim.

The term "client device fault data object" refers to electronically managed data representing information associated with a diminished operation and/or damage of a client device. In some embodiments, a client device fault data object includes one or more data values, submitted by a user, that describe the diminished operation and/or damage of the client device.

The term "client device loss data object" refers to refers to electronically managed data representing information associated with theft, loss, and/or an otherwise inaccessible client device. In some embodiments, a client device loss data object includes one or more data values, submitted by a user, that describe the theft, loss, and/or inaccessibility of the client device.

The term "drop dead timer" refers to a timestamp interval, tracked by a third-party provider or an associated system and/or device protection program management system or an associated system, representing a time period within which a user must submit sufficient data to enable complete processing of a claim. In some embodiments, upon completion of a drop dead timer (i.e., the timer runs out without having received sufficient data) the third-party provider and/or device protection program management system is configured to terminate an electronic lockout of the client device.

System Architecture

FIG. 1 illustrates a block diagram of an example system in which embodiments of the present disclosure may operate. As illustrated, the example system includes a device protection program management system 102, a trusted third-party provider 108, a user device 104, and a client device 106. In some embodiments, the trusted third-party provider 108 embodies a device manufacturer system. Alternatively or additionally, in some embodiments, the trusted third-party provider 108 embodies a carrier system. In some embodiments, the example system further includes a third-party manufacturer system 112.

The device protection program management system 102, trusted third-party provider 108, user device 104, and client device 106, may be configured to communicate with each other over one or more networks, such as the network 110. In some embodiments, to enhance user security, the client device 106 may be configured to communicate over the network 110 only with the trusted third-party provider 108, such that the device protection program management system 102 may not be able to communicate with and/or access the client device 106 directly. Additionally or alternatively, in some embodiments, one or more systems is configured to communicate with a third-party manufacturer system 112. In some such embodiments, the third-party manufacturer system 112 is configured to communicate with the client device 106, for example to initiate and/or terminate an electronic lockout of the client device embodying a client device lockout. In some such embodiments, the third-party manufacturer system 112 may communicate with the device protection program management system 102 directly, or indirectly through communications with the trusted third-party provider 108. In some such embodiments, the third-party manufacturer system 112 is configured to communicate with the trusted third-party provider 108 and/or the device protection program management system 102 via one or more communications networks, for example the communication network 110.

The client device 106 may be associated with, such as enrolled in, a device protection program associated with the device protection program management system 102. For example, in some embodiments, the user may subscribe/enroll the client device 106 in a device protection program via the trusted third-party provider 108, such that if the client device 106 is lost or stolen, the user may open a third-party case via the trusted third-party provider 108, which enables the user to submit a claim for a new client device via the device protection program management system 102. In some embodiments, both the user device 104 and the client device 106 may be associated with a single user. Alternatively or additionally, the user device 104 may be accessed to login to a user account associated with the device protection program, the device protection program management system 102, and/or the client device 106.

In some embodiments, the trusted third-party provider 108 is configured to initiate a third-party case associated with a device protection program associated with client device. For example, a user may enroll the client device 106 in a device protection program that covers loss and theft of the client device 106. The trusted third-party provider 108 may be configured to communicate with the user device 104 to authenticate the user associated with the user device 104. In a particular example, the trusted third-party provider 108 may utilize one or more authentication processes to securely authenticate the user, for example authenticating a received username and password, performing multi-factor authentication via a text or SMS message to the user device 104 or a second user device, and/or performing multi-factor authentication via an email profile associated with the user device. Accordingly, the trusted third-party provider 108 may identify an authenticated third-party user account associated with the trusted third-party provider 108.

After authenticating a user, a trusted third-party provider 108 may provide a case initiation interface to the user. For example, the trusted third-party provider 108 may be configured to generate and/or provide a case initiation interface that displays all client and/or user devices associated with the user, such that the user may initiate a third-party case associated with a client device 106 that has been stolen or lost. In response to a loss indication associated with a client device 106, for example in response to user engagement with a "Lost Device" component, associated with a particular client device, of the case initiation interface, the trusted third-party provider 108 may be configured to initiate a new third-party case associated with the client device. The trusted third-party provider 108 may identify third-party case information associated with the third-party case, for example a device identifier associated with the client device 106, previous cases and/or number of previous cases initiated by the user associated with the authenticated third-party user account, and/or the like.

Additionally, and/or alternatively, in response to receiving a loss indication, the trusted third-party provider 108, directly and/or indirectly through a manufacturer system such as the third-party manufacturer system 112, may be configured to access the client device 106 to extract, identify, and/or otherwise retrieve information from and/or associated with the client device, in real-time. For example, the trusted third-party provider 108 may extract, identify, and/or otherwise retrieve, one or more from the group comprising a device identifier (e.g., International Manufacturer Equipment Identity (IMEI), Internet Protocol (IP) address, alphanumeric identifier, or the like), prior case information (e.g., how many third-party cases have been opened associated with a particular client device and/or user), device location resource information (e.g., whether access to a device location application is enabled associated with the client device, whether a user attempted to access the device location application to locate the client device, last time a user accessed a device location resource to locate the device, or the like). Additionally or alternatively, in some embodiments, the third-party case information includes location information, application status information for each application associated with the client device, stored data information, and the like, associated with the client device 106 associated with the case at the time the user initiated the third-party case, such that the third-party case information serves as a snapshot of all information present on the client device 106 at the time the user initiated the third-party case.

Furthermore, the trusted third-party provider 108 may be configured to toggle lock out functionality associated with the client device 106. Lock out functionality may, for example, cause the client device to be inaccessible, inoperable, or otherwise not function. In some embodiments, the trusted third-party provider 108 may be configured to initiate a lock out for the client device 106 upon receiving a loss indication or upon receiving the user's authorization and indication of an intent to file a claim on the lost device.

The device protection program management system 102 is configured to generate, manage, and/or fulfill, one or more claims associated with device protection programs. For example, upon initiation of a new third-party case, the trusted third-party provider may transmit a third-party case confirmation to the device protection program management system 102, indicating a new third-party case associated with a particular third-party case identifier has been initiated by an authenticated user. In some embodiments, the trusted third-party provider provides authentication for the device protection program management system 102. For example, after initiating a new third-party case, the trusted third-party provider may transmit an authentication token to the device protection program management system 102, where the authentication token indicates that the trusted third-party provider 108 successfully authenticated the user associated with the new third-party case. Accordingly, the device protection program management system 102 may receive both the third-party case identifier and an authentication token from the trusted third-party provider 108, such that the device protection program management system 102 may verify that the case was initiated by a legitimate user of the trusted third-party provider system 108 without accessing or requesting the user authentication credentials of a user for accessing the trusted third-party provider system 108.

The device protection program management system 102 may also be configured to continue or terminate lock out for the client device 106 associated with a given third-party case. For example, the trusted third-party provider 108 may lock out the client device 106 upon initiation of a third-party case by an authenticated user, such that the lock out ends after a pre-determined time period (e.g., 24 hours) has elapsed without further notice and/or status updates from the device protection program management system 102. In some embodiments, once a claim generation process is initiated and the process is handed off from the trusted third party to the device protection program management system 102, the device protection program management system 102 is configured to receive user case information from the user and, if the user case information is received within a threshold claim initiation period (e.g., 24 hours), the device protection program management system 102 may transmit signals to cause the trusted third-party provider 108 to continue the lock out, for example by transmitting a claim created notification data object to the trusted third-party provider 108.

In some embodiments, the device protection program management system 102 also is configured to create a claim associated with a third-party case utilizing the received information. In some embodiments, a claim time period begins as soon as the claim is generated and is being processed by the device protection program management system 102. During the claim time period, the user has a limited amount of time, for example a determined or pre-determined length of time (e.g., 30 days) to complete the claim. In some embodiments, after a claim is generated and the user has requested a replacement device, additional claim requirements and/or claim parameters may be identified by the device protection program management system 102, such that the user must submit additional claim information for the claim to proceed. If the claim information is not received within a claim time limit, the device protection program management system 102 may determine the user has abandoned the claim, and close the claim for lack of action. The device protection program management system 102 may transmit a notice to the trusted third-party provider 108, such as a claim cancelled notice, configured to cause the trusted third-party provider 108 to terminate the lock out and return the client device 106 to functioning form.

If, at any point in time, the user affirmatively indicates they want to cancel the claim and/or corresponding third-party case, for example through submitting one or more data requests directly through the device protection program management system 102 and/or indirectly through the trusted third-party provider 108, the lock out for the client device 106 may also be terminated. For example, the user may indicate through engagement with a cancellation user interface component provided by the device protection program management system 102 that the user is cancelling the claim, either during the claim generation process or during claim processing before the claim is fulfilled. The user may do this when they have started a claim, but since located the client device 106, for example. Accordingly, the device protection program management system 102 may cause the trusted third-party provider 108 to terminate the lock out for the client device 106 and return the client device to a functional form. In some embodiments, the device protection program management system 102 may cause terminate the lock out through one or more transmissions to the third-party manufacturer system 112 either directly or indirectly through the trusted third-party provider 108.

When all claim information is received during the fulfillment process, the device protection program management system 102 may be configured to authorize or deny the claim. For example, the device protection program management system authorize or deny the claim based on the third-party case information, user case information, and/or claim parameters or associated requirements. If the claim is authorized the device protection program may cause the trusted third-party provider 108 to update the third-party case status, such as by transmitting a notice to the trusted third-party provider 108, and cause the trusted third-party provider 108 to continue the lock out for the client device 106. After authorizing the claim, the device protection program management system 102 may fulfill the claim and provide a new device to the user associated with the client device 106. Accordingly, by keeping the client device 106 electronically locked out, embodiments herein enhance user security by ensuring the user device 104 may not be accessed by a malicious third-party actor after loss of theft. In some embodiments, after authorizing the claim, the electronic lock out for the client device 106 may continue permanently.

Alternatively, if the device protection program management system 102 may deny the claim based on the third-party case information, user case information, and/or claim parameters or associated requirements. Accordingly, in some embodiments, the device protection program management system 102 is configured to cause the trusted third-party provider 108 to terminate the lock out associated with the client device in response to denying the claim, for example by transmitting a notice to the trusted third-party provider 108.

Example Apparatuses of the Present Disclosure

The device protection program management system 102 may be embodied by one or more computing systems, such as the apparatus 200 illustrated in FIG. 2A. As illustrated in FIG. 2A, the apparatus 200 may include a processor 202, a memory 204, an input/output module 206, a communications module 208, and a device lockout management module 210. The apparatus 200 may be configured, using one or more of the modules 202-210, to execute the operations described below.

Although the components are described with respect to functional limitations, it should be understood that the particular implementations necessarily include the use of particular hardware. It should also be understood that certain of the components described herein may include similar or common hardware. For example, two modules may both leverage user use of the same processor, network interface, storage medium, or the like to perform their associated functions, such that duplicate hardware is not required for each module. The use of the term "module" and/or the term "circuitry" as used herein with respect to components of the apparatus 200 should therefore be understood to include particular hardware configured to perform the functions associated with the particular modules as described herein.

Additionally or alternatively, the terms "module" and "circuitry" should be understood broadly to include hardware and, in some embodiments, software and/or firmware for configuring the hardware. For example, in some embodiments, "module" and "circuitry" may include processing circuitry, storage media, network interfaces, input/out devices, and the like. In some embodiments, other elements of the apparatus 200 may provide or supplement the functionality of the particular module. For example, the processor 202 may provide processing functionality, the memory 204 may provide storage functionality, the communications module 208 may provide network interface functionality, and the like.

In some embodiments, the processor 202 (and/or co-processor or any other processing circuitry assisting or otherwise associated with the processor) may be in communication with the memory 204 via a bus for passing information among components of the apparatus. The memory 204 may be non-transitory and may include, for example, one or more volatile and/or non-volatile memories. In other words, for example, the memory may be an electronic storage device (e.g., a computer readable storage medium). The memory 204 may be configured to store information, data, content, applications, instructions, or the like, for enabling the apparatus 200 to carry out various functions in accordance with example embodiments of the present disclosure.

The processor 202 may be embodied in any one of a myriad of ways and may, for example, include one or more processing devices configured to perform independently. Additionally or alternatively, the processor 202 may include one or more processors configured in tandem via a bus to enable independent execution of instructions, pipelining, and/or multithreading. The use of the terms "processor," "processing module," and "processing circuitry" may be understood to include a single-core processor, a multi-core processor, multiple processors internal to the apparatus, and/or remote or "cloud" processors.

In an example embodiment, the processor 202 may be configured to execute computer-coded instructions stored in the memory 204 or otherwise accessible to the processor. Alternatively, or additionally, the processor 202 may be configured to execute hard-coded functionality. As such, whether configured by hardware or software methods, or by a combination thereof, the processor 202 may represent an entity (e.g., physically embodied in circuitry) capable of performing operations according to an embodiment of the present disclosure while configured accordingly. Alternatively, as another example, when the processor is embodied as an executor of software instructions, the instructions may specifically configure the processor to perform the algorithms and/or operations described herein when the instructions are executed.

As one example context, the processor 202 may be configured to generate, process, and/or fulfil one or more claims associated with a client device. In this regard, the processor 202 may be configured to enable the apparatus 200 to process received data for purposes of determining whether to authorize and/or deny an initiated claim. Additionally or alternatively still, in some embodiments the processor 202 is configured to cause initiation of an electronic lockout and/or cause termination of an electronic lockout of a client device, for example via one or more transmissions. Additionally or alternatively still, in some embodiments, the processor 202 is configured to enable a user to enroll a client device in a device protection program, initiate a claim associated with a device protection program for a client device, cancel an existing claim, and/or unenroll from a device protection program. In some embodiments, the processor 202 is configured to automatically cause initiation of an electronic device lockout and/or cause termination of an electronic device lockout automatically as a claim is initiated, processed, and/or completed.

In some embodiments, the apparatus 200 may include input/output module 206, embodied in hardware, software, firmware, or a combination thereof, that may, in turn, be in communication with processor 202 to provide output to the user and, in some embodiments, to receive an indication of a user input. The input/output module 206 may comprise a user interface and may include a display (e.g., for rendering one or more user interfaces). The user interfaces comprise a web user interface, a mobile application, a desktop application, a linked or networked client device, a kiosk, or the like. In some embodiments, the input/output module 206 may also include a keyboard, a mouse, a joystick, a touch screen, touch areas, soft keys, a microphone, a speaker, or other input/output mechanisms. The processor and/or user interface module comprising the processor, for example processor 202, may be configured to control one or more functions of one or more user interface elements through computer program instructions (e.g., software and/or firmware) stored on a memory accessible to the processor (e.g., memory 204, and/or the like).

Additionally or alternatively, in some embodiments, the apparatus 200 includes a communications module 208. The communications module 208 may be any means such as a device or circuitry embodied in either hardware or a combination of hardware and software that is configured to receive and/or transmit data from/to a network and/or any other device, circuitry, or module in communication with the apparatus 200. In this regard, the communications module 208 may include, for example, a network interface for enabling communications with a wired or wireless communication network. For example, the communications module 208 may include one or more network interface cards, antennae, buses, switches, routers, modems, and supporting hardware and/or software, or any other device suitable for enabling communications via a network. Additionally or alternatively, the communication interface may include the circuitry for interacting with the antenna(s) to cause transmission of signals via the antenna(s) or to handle receipt of signals received via the antenna(s).

Additionally or alternatively, in at least some embodiments, the apparatus 200 includes the device lockout management module 210. In some such embodiments, the device lockout management module 210 is embodied in any of software, hardware, firmware, and/or a combination thereof. In this regard, the device lockout management module 210 may be embodied in any means for enabling enrollment in a device protection program and/or unenrollment from a device protection program. Additionally or alternatively, the device lockout management module 210 may be embodied in any means for enabling initiation of a claim for a client device associated with a device protection program, processing of a claim for a client device, and/or fulfilling a claim for a client device in response to such processing. In some embodiments, additionally or alternatively, the device lockout management module 210 is configured to cause initiation and/or termination of an electronic lockout of a client device as a claim associated with the client device is initiated and/or processed. In some such embodiments, for example, the device lockout management module 210 may be configured to perform one or more device lockout update actions, including, without limitation, generating and/or transmitting one or more requests to a third-party provider to initiate and/or terminate an electronic lockout of a client device by setting an appropriate functionality lockout status. Additionally or alternatively, in at least some embodiments, the device lockout management module 210 is configured to retrieve, for example via communication with a third-party provider, a device functionality status for a client device to confirm the status has been appropriately set, and/or perform an action based on the received device functionality status. It should be appreciated that, in some embodiments, the device lockout management module 210 may include a separate processor, specially configured field programmable gate array (FPGA), or specially configured application-specific integrated circuit (ASIC).

In some embodiments, one or more of the modules 202-210 may share hardware, to eliminate duplicate hardware requirements. Additionally or alternatively, in some embodiments, one or more of the modules 202-210 may be combined, such that a single module includes means configured to perform the operations of two or more of the modules 202-210. For example, in at least one embodiment, the device lockout management module 210 and the processor 202 are combined into a module embodied in processing circuitry. Additionally or alternatively, one or more of the modules 202-210 may be embodied by two or more submodules, which may be communicable, work in conjunction, or be distinct.

The trusted third-party provider 108 and/or the third-party manufacturer system 112 may also be embodied by one or more computing systems, such as the apparatus 250 illustrated in FIG. 2B. As illustrated in FIG. 2B, the apparatus 250 may include a processor 252, a memory 254, an input/output module 256, a communications module 258, and a third-party case lockout management module 260. The apparatus 250 may be configured, using one or more of the modules 252-260, to execute the operations described below.

It should be appreciated that similarly named components may be embodied in similar hardware, software, and/or firmware as the components depicted and described with respect to FIG. 2A. In this regard, the components may perform similar functionality with respect to the apparatus 250. For example, in this regard, similar to the functionality described with respect to apparatus 200 in FIG. 2A, the processor 252 may provide similar processing functionality to the apparatus 250, the memory 254 may provide similar memory storage functionality to the apparatus 250, the input/output module 256 may provide similar input/output, display, and/or interaction functionality to the apparatus 250, and/or the communications module 258 may provide similar networking, interfacing, and/or communication functionality to the apparatus 250. In the interest of brevity, repeated disclosure is omitted.

In some such embodiments, the third-party case lockout management module 260 is embodied in any of software, hardware, firmware, and/or a combination thereof. In this regard, the device lockout management module 210 may be embodied in any means for initiating and/or managing a third-party case associated with user-submitted information, providing one or more interfaces to a user device associated with a user, transmitting data to a device protection program management system and/or processing data received from a device protection program management system, initiating an electronic lockout of a client device, and/or terminating an electronic lockout of a client device. In some such embodiments, the third-party case lockout management module 260 may be configured to perform specific actions based on data received from a device protection program management system. For example, the third-party case lockout management module 260 may update a locally managed third-party case based on one or more claim status update notification data objects (e.g., a claim cancelled notification data object, a claim authorized notification data object, and/or the like) received from the device protection program management system. Additionally or alternatively, the third-party case lockout management module 260 may include means configured to set a functionality lockout state for a corresponding client device to an appropriate value based on the data received from the device protection program management system, for example to initiate an electronic lockout of the client device, continue an electronic lockout, and/or terminate an electronic lockout. Further, during processing of a claim, the third-party case lockout management module 260 may be configured to generate, track, and/or otherwise manage one or more timers associated with initiating and/or processing a claim, for example one or more drop dead timers utilized to determine if a client device should be unlocked as a third-party case, and/or corresponding claim, is determined abandoned. It should be appreciated that, in some embodiments, the third-party case lockout management module 260 may include a separate processor, specially configured field programmable gate array (FPGA), or specially configured application-specific integrated circuit (ASIC).

In some embodiments, one or more of the modules 252-260 may share hardware, to eliminate duplicate hardware requirements. Additionally or alternatively, in some embodiments, one or more of the modules 252-260 may be combined, such that a single module includes means configured to perform the operations of two or more of the modules 252-260. For example, in at least one embodiment, the third-party case lockout management module 260 and the processor 252 are combined into a module embodied in processing circuitry. Additionally or alternatively, one or more of the modules 252-260 may be embodied by two or more submodules, which may be communicable, work in conjunction, or be distinct.

Example Secured Device Lockout Management Flow

FIG. 3 illustrates example operations of an example process for secured device lockout management in accordance with at least one example embodiment of the present disclosure. In some embodiments, the operations depicted are performed by a device protection program management system, for example embodied by the apparatus 200 as depicted and described above. The apparatus 200 may be in communication with one or more other devices, systems, servers, and/or the like, for performing one or more of the operations as depicted and described below. For example, in at least some embodiments, the apparatus 200 is in communication with at least one third-party provider, for example a carrier system and/or a manufacturer system, and/or a client device.

At block 302, the apparatus 200 includes means, such as the device lockout management module 210, communications module 208, input/output module 206, processor 202, and/or the like, or a combination thereof, to receive a device claim request indication. In some embodiments, the device claim request indication is received from a third-party provider, for example an associated carrier system and/or manufacturer system. In this regard, the third-party provider may enable a user to begin the process of initiating a new claim through a device protection program that the user has enrolled an associated device in (e.g., a device protection program for a device registered to the user). Alternatively or additionally, in some embodiments, the device claim request indication is received directly from a user device associated with a user. In this regard, the user may utilize the user device to communicate directly with the apparatus 200 to initiate the claims process, thus bypassing use of the third-party provider.

In some embodiments, the device claim request indication is associated with a client device. For example, in this regard, the device claim request indication may represent a user request to initiate a claim associated with the client device. In some such embodiments, the device claim request indication may include a client device identifier, such as an IMEI or other unique identifier. Additionally or alternatively, in some embodiments, the client device is associated with a functionality lockout state. The functionality lockout state may represent whether the client device is currently associated with limited functionality, for example as controlled by a manufacturer system associated with the client device. In some embodiments, for example in a circumstance where no claim has previously been initiated for the client device, the client device may be in unlocked state (e.g., the value of the functionality lockout state may represent an unlocked state) such that functionality of the client device is not limited.

At block 304, the apparatus 200 includes means, such as the device lockout management module 210, communications module 208, input/output module 206, processor 202, and/or the like, or a combination thereof, to initiate a claim associated with the client device based on the device claim request indication. In some embodiments, the apparatus 200 is configured to determine whether the client device is associated with one or more device protection program(s). In some such embodiments, the apparatus 200 is configured to determine a device protection program based on one or more identifiers earlier received, for example via the device claim request indication. In a circumstance where the apparatus 200 determines the client device is enrolled in at least one device protection program, or specifically in a requested device protection program identifier via earlier received data, the apparatus 200 may be configured to generate and/or store a claim associated with the client device. In some embodiments, to initiate a claim, the apparatus 200 may require the user provide information additional to that received via the device claim request indication, for example as described herein with respect to the figures below.

At block 306, the apparatus 200 includes means, such as the device lockout management module 210, communications module 208, input/output module 206, processor 202, and/or the like, or a combination thereof, to cause the functionality lockout state for the client device to be set to a locked out state. In some embodiments, by setting the functionality lockout state to the locked out state, the apparatus 200 is configured to cause initiation of an electronic lockout for the client device, such that no functionality is accessible or a limited subset of functionality remains accessible. By locking out such functionality, the apparatus 200 improves the data security associated with the client device while minimizing the likelihood that the user is negatively affected, at least in part because the user initiated the claim and thus has certified that the device is to be damaged and/or is already not in the user's possession. The apparatus 200 may be configured to cause the functionality lockout state to be set to the locked out state in any of a myriad of ways, including for example via one or more transmissions to a third-party provider. Non-limiting example processes for setting the functionality lockout state are illustrated and described below with respect to FIGS. 4A and 4B.

At block 308, the apparatus 200 includes means, such as the device lockout management module 210, communications module 208, input/output module 206, processor 202, and/or the like, or a combination thereof, to process the claim to determine whether to authorize the claim. In some such embodiments, to process the claim, the apparatus 200 is configured to compare received information submitted by a user and associated with the claim with various requirements under the associated device protection program associated with the claim, for example embodied by a predefined rule set. In this regard, the apparatus 200 may require the user to submit additional data for determining whether to authorize the claim or deny the claim based on the predefined rule set. Additionally or alternatively, the apparatus 200 may be configured to determine whether the user affirmatively cancels the claim during processing, for example as illustrated and described below with respect to FIG. 6A. Additionally or alternatively, the apparatus 200 may be configured to determine whether the processing of the claim times out based on one or more timestamp intervals, for example as illustrated and described below with respect to FIG. 6B.

At block 310, the apparatus 200 includes means, such as the device lockout management module 210, communications module 208, input/output module 206, processor 202, and/or the like, or a combination thereof, to cause updating of the functionality lockout state for the client device based on the determination of whether to authorize the claim. In some embodiments, for example, the apparatus 200 causes the functionality lockout state to remain locked if the claim was determined authorized, and/or causes updating of the functionality lockout state to an unlocked state in a circumstance where the claim is determined denied. Non-limiting examples of such updating is illustrated and described below with respect to FIG. 5. Similarly, in some embodiments, the apparatus 200 may perform one or more actions to update the functionality lockout state for the client device to an unlocked state in a circumstance where the claim was timed out and/or cancelled during processing, for example as described below with respect to FIGS. 6B and 6A respectively.

FIG. 4A illustrates additional operations for an example process for secured device lockout management, specifically to cause the functionality lockout state for the client device to be set to a locked out state, in accordance with at least one example embodiment of the present disclosure. In some embodiments, the operations depicted are performed by a device protection program management system, for example embodied by the apparatus 200 as depicted and described above. The apparatus 200 may be in communication with one or more other devices, systems, servers, and/or the like, for performing one or more of the operations as depicted and described below. For example, in at least some embodiments, the apparatus 200 is in communication with at least one third-party provider, for example a carrier system and/or a manufacturer system, and/or a client device.

In some embodiments, one or more of the operations illustrated with respect to FIG. 4A occurs additional to, and/or in place of, one or more operations of another process. For example, as depicted, in some embodiments FIG. 4A begins after block 304 as depicted and described with respect to FIG. 3. Additionally or alternatively, as depicted, in some embodiments upon completion of the operations depicted with respect to FIG. 4A, flow returns to block 308 as depicted and described with respect to FIG. 3. It should be appreciated that, in other embodiments, one or more other processes and/or subprocesses may begin after one or more of the operations depicted and described with respect to FIG. 4A, and/or upon completion of the operations depicted and described with respect to FIG. 4A.

At block 402, the apparatus 200 includes means, such as the device lockout management module 210, communications module 208, input/output module 206, processor 202, and/or the like, or a combination thereof, to transmit a device lockout request to a manufacturer system associated with the client device. In some embodiments, the device lockout request is configured to cause the manufacturer system to set the functionality lockout state for the client device to the locked out state. In this regard, transmitting the device lockout request to the manufacturer system initiates an electronic lockout of the client device. In some embodiments, it should be appreciated that the device lockout request is transmitted over any of a number of communication networks, for example over the Internet.

The manufacturer system may be associated with a hardware, software, and/or firmware of the client device. For example, the manufacturer system may embody a computing system controlled by the creator of some, or all, of the software, hardware, and/or firmware embodying the client device. In some such embodiments, the manufacturer system may be configured to communicate with the client device over the same communication network, for example the Internet, and/or a second communication network, to set the functionality lockout state of the client device. For example, in at least one example embodiment, the device lockout request causes the manufacturer system to generate and/or transmit a request to the client device to set the functionality lockout state for the client device to the locked out state. In this regard, in at least some embodiments, the request transmitted from the manufacturer system to the client device is specifically configured based on the desired value for the functionality lockout state, i.e. the locked out state, or otherwise includes data indicating the functionality lockout state is to be set to the locked out state.

FIG. 4B illustrates additional operations for an example process for secured device lockout management, specifically to cause the functionality lockout state for the client device to be set to a locked out state, in accordance with at least one example embodiment of the present disclosure. In some embodiments, the operations depicted are performed by a device protection program management system, for example embodied by the apparatus 200 as depicted and described above. The apparatus 200 may be in communication with one or more other devices, systems, servers, and/or the like, for performing one or more of the operations as depicted and described below. For example, in at least some embodiments, the apparatus 200 is in communication with at least one third-party provider, for example a carrier system and/or a manufacturer system, and/or a client device.

In some embodiments, one or more of the operations illustrated with respect to FIG. 4B occurs additional to, and/or in place of, one or more operations of another process. For example, as depicted, in some embodiments FIG. 4B begins after block 304 as depicted and described with respect to FIG. 3. Additionally or alternatively, as depicted, in some embodiments upon completion of the operations depicted with respect to FIG. 4B, flow returns to block 308 as depicted and described with respect to FIG. 3. It should be appreciated that, in other embodiments, one or more other processes and/or subprocesses may begin after one or more of the operations depicted and described with respect to FIG. 4B, and/or upon completion of the operations depicted and described with respect to FIG. 4B.

At block 452, the apparatus 200 includes means, such as the device lockout management module 210, communications module 208, input/output module 206, processor 202, and/or the like, or a combination thereof, to transmit a device lockout request to a third-party system associated with the client device, wherein the third-part system comprises a carrier system. In some embodiments, the carrier system is in communication with a manufacturer system associated with the client device, where the manufacturer system is communicable with the client device for setting the functionality lockout state to a desired value, for example to a lockout state. In some embodiments, the apparatus 200 and the carrier system communicate over one or more communication network(s), such as the Internet. Additionally or alternatively, the carrier system and the manufacturer system, and/or the manufacturer system and the client device, may be configured to communicate over the one or more communication networks, for example over the Internet, and/or over one or more other communication networks.

In some embodiments, the carrier system is configured to cause a manufacturer system to set the functionality lockout state for the client device to the locked out state in response to receiving the device lockout request. For example, in at least some embodiments, the device lockout request is configured to cause the carrier system to transmit one or more corresponding requests to the manufacturer system. In some embodiments, the carrier system is configured to generate and/or transmit, to the manufacturer system, one or more specially configured requests corresponding to the device lockout request. In this regard, transmitting the device lockout request to the carrier system initiates an electronic lockout of the client device indirectly through the manufacturer system. The electronic lockout is indirectly controlled by the apparatus 200 through communications with one or more third-party system(s).

FIG. 5 illustrates additional operations for an example process for secured device lockout management, specifically to process the claim to determine whether to authorize a claim and cause updating of the functionality lockout state for a client device based on the determination of whether to authorize the claim, in accordance with at least one example embodiment of the present disclosure. In some embodiments, the operations depicted are performed by a device protection program management system, for example embodied by the apparatus 200 as depicted and described above. The apparatus 200 may be in communication with one or more other devices, systems, servers, and/or the like, for performing one or more of the operations as depicted and described below. For example, in at least some embodiments, the apparatus 200 is in communication with at least one third-party provider, for example a carrier system and/or a manufacturer system, and/or a client device.

In some embodiments, one or more of the operations illustrated with respect to FIG. 5 occurs additional to, and/or in place of, one or more operations of another process. For example, as depicted, in some embodiments FIG. 5 begins after block 306 as depicted and described with respect to FIG. 3. Additionally or alternatively, as depicted, in some embodiments upon completion of the operations depicted with respect to FIG. 5, flow returns to another operation of an associated process. It should be appreciated that, in other embodiments, one or more other processes and/or subprocesses may begin after one or more of the operations depicted and described with respect to FIG. 5, and/or upon completion of the operations depicted and described with respect to FIG. 5.

At block 502, the apparatus 200 includes means, such as the device lockout management module 210, communications module 208, input/output module 206, processor 202, and/or the like, or a combination thereof, to receive user claim information associated with the claim within a first timestamp interval. The user claim information may embody one or more data values for use in processing the claim, for example evidentiary data and/or descriptive data associated with the claim. For example, some or all of the user claim information may include data describing an event leading to the claim (e.g., a description of how a device was damaged, lost, stolen, or the like), data associated with subsequent actions taken by the user in response to an event (e.g., whether one or more device location applications were activated), and/or the like. In some embodiments, for example, the first timestamp interval embodies a threshold claim initiation period within which the user claim information is to received to enable processing of the claim. In some embodiments, apparatus 200 stores and/or otherwise predetermines the first timestamp interval. Alternatively or additionally, in some embodiments, apparatus 200 determines the first timestamp interval based on data received and/or otherwise accessible to the apparatus 200, for example earlier received data associated with the claim to be processed including, without limitation, the claim type for the claim, the device protection program associated with the claim, a user setting associated with the user account for the claim, and/or the like.

At decision block 504, the apparatus 200 includes means, such as the device lockout management module 210, communications module 208, input/output module 206, processor 202, and/or the like, or a combination thereof, to determine whether to authorize the claim. In some embodiments, the determination of whether to authorize the claim is based at least on the received user claim information, and/or earlier received data such as case confirmation information, third-party case data, and/or the like, from a third-party system and/or a user device. Additionally or alternatively, the determination may be based at least on a device protection program associated with the claim, the device protection program represented by a predefined rule set. For example, in this regard, the predefined rule set may define required data values to be present in the received data to authorize the claim. As such, in some embodiments, the apparatus 200 is configured to compare some or all of the user claim information and/or earlier received data with the predefined rule set to determine whether the predefined rule set is satisfied (e.g., the data includes values satisfying each rule of the predefined rule set). In some embodiment, if one or more of the rules in the predefined rule set is satisfied, the claim is determined to be authorized. In some other embodiments, the claim is determined to be authorized if the apparatus 200 determines all of the rules in the predefined rule set are satisfied.

In some embodiments, in a circumstance where the apparatus 200 determines the claim is not authorized, the flow proceeds to optional block 506. At optional block 506, apparatus 200 includes means, such as the device lockout management module 210, communications module 208, input/output module 206, processor 202, and/or the like, or a combination thereof, to set a claim status for the claim to a denied status. In this regard, the denied status indicates that the received information associated with the claim does not satisfy the requirements of the associated device protection program. For example, in some embodiments, the denied status indicates that at least one rule of the predefined rule set was not satisfied, or in other embodiments that all rules of the predefined rule set were not satisfied. Accordingly, the claim will not be fulfilled. In this regard, the user may not receive a new device, a replacement device, a repair, a discounted device, or the like. In some embodiments, for example, the claim status for the claim is set to a denied status in circumstances where the apparatus 200 determines that the claim should not be authorized based on the processing of the previously received data and/or comparison of the data with the predefined rule set, for example where such processing and/or comparison(s) indicate fraudulent and/or otherwise behavior not covered by the device protection program.

At block 508, the apparatus 200 includes means, such as the device lockout management module 210, communications module 208, input/output module 206, processor 202, and/or the like, or a combination thereof, to cause the functionality lockout state for the client device to be set to an unlocked state. In some embodiments, by setting the functionality lockout state to the unlocked state, the apparatus 200 is configured to cause termination of an electronic lockout for the client device, such that the client device returns to being fully accessible. By enabling access to the full functionality set, the apparatus 200 prevents access to the client device for a limited time during which a claim is being processed, and once confirmed that the client device is to remain out of the rightful possession (e.g., confirmed lost or to be sent back for repair and/or replacement under a device protection program) the client device returns to full functionality for use by the user in circumstances where it is located and/or possessed, thus minimizing the likelihood that the user is locked out from functionality in circumstances where the user desires to access such functionality.

The apparatus 200 may be configured to cause the functionality lockout state to be set to the unlocked state in any of a myriad of ways, including for example via one or more transmissions to a third-party provider. For example, in some embodiments, the apparatus 200 is configured to generate and/or transmit a device unlock request to a manufacturer system associated with the client device. In this regard, in some embodiments, the device unlock request is configured to cause the manufacturer system to set the functionality lockout state for the client to the unlocked state. Alternatively or additionally, in some embodiments, the apparatus 200 is configured to generate and/or transmit a device unlock request to a carrier system, or other third-party provider, in communication with a manufacturer system associated with the client device. In this regard, in some embodiments, the device unlock request is configured to cause the carrier system, or other third-party provider, to transmit one or more other requests to the manufacturer system, where the requests cause the manufacturer system to set the functionality lockout state for the client device to an unlocked state.

In some embodiments, the device unlock request is embodied by and/or otherwise transmitted together with a claim denied notification data object. The claim denied notification data object may indicate to a third-party provider, for example a carrier system or a manufacturer system, that the claim has been fully processed. In this regard, the functionality lockout state for the client device may be set permanently with respect to the submitted claim, and thus may remain in the unlocked state until a new claim is initiated for the client device (if initiated). Accordingly, the third-party provider may cancel any timers or other pending actions with respect to processing the claim, and/or close an internally stored case associated with the claim for the client device as denied by the apparatus 200.

Returning to decision block 504, in some embodiments in a circumstance where the apparatus 200 determines the claim is authorized, the flow proceeds to optional block 510. At optional block 510, apparatus 200 includes means, such as the device lockout management module 210, communications module 208, input/output module 206, processor 202, and/or the like, or a combination thereof, to set a claim status for the claim to an authorized status. In this regard, the authorized status indicates that the received information associated with the claim satisfies the requirements of the associated device protection program. For example, in some embodiments, the authorized status indicates that at least one rule of the predefined rule set was satisfied, or in other embodiments that all rules of the predefined rule set were satisfied. Accordingly, the claim may proceed to be fulfilled. In this regard, the apparatus 200 may perform one or more additional actions to enable the user to receive a new device, a replacement device, a repair, a discounted device, or the like. In some embodiments, for example, the claim status for the claim is set to an authorized status in circumstances where the apparatus 200 determines that the claim should be authorized based on the processing of the previously received data and/or comparison of the data with the predefined rule set, for example where such processing and/or comparison(s) indicate behavior covered by the device protection program.

At block 508, the apparatus 200 includes means, such as the device lockout management module 210, communications module 208, input/output module 206, processor 202, and/or the like, or a combination thereof, to cause the functionality lockout state for the client device to remain set to a locked state. In some embodiments, by setting the functionality lockout state to the locked state, the apparatus 200 is configured to continue an electronic lockout for the client device, such that the client device remains configured to only enable access to a limited functionality set. By continuing the electronic lockout, the apparatus 200 prevents access to the client device in a circumstance where the device is already determined out of the rightful user's possession, and/or is to be removed from the possession of the rightful user, for example for purposes of replacing and/or repairing the client device (e.g., when the client device is confirmed lost or stolen, and/or to be sent back for repair and/or replacement under a device protection program). In this regard, the apparatus 200 causes the client device to be configured to be inaccessible in a circumstance where the received data sufficiently indicates the client device is not to be in the possession of the rightful user.

The apparatus 200 may be configured to cause the functionality lockout state to remain set to the locked out state in any of a myriad of ways. In some embodiments, the apparatus 200 performs no action such that the client device remains in the locked out state. Alternatively or additionally, in some embodiments, the apparatus 200 is configured to transmit one or more transmissions to a third-party provider to cause the functionality lockout state for the client device to remain set to the locked out state. In this regard, in some embodiments, the apparatus 200 generates and/or transmits a claim authorized notification data object to a third-party provider to cause the functionality lockout state for the client device to remain set to the locked out state. The claim authorized notification data object may indicate to the third-party provider that the claim has been successfully processed an authorized, and that the client device should be updated to a locked out state if not already set. In this regard, the third-party provider may generate and/or transmit one or more transmissions to the client device to set the functionality lockout state to the locked out state in a circumstance where the third-party provider determines that the client device has not been successfully set to the locked out state previously. Additionally or alternatively, in some embodiments, the third-party provider performs no action in a circumstance where it is determined that the client device has been previously set to the locked out state. Additionally or alternatively, in some embodiments, the apparatus 200 may transmit data, for example a claimed authorization notification data object, to cause the third-party provider to update an internal case managed by the third-party provider to an authorized status, and/or otherwise close the internal case associated with the client device as authorized by the apparatus 200.

FIG. 6A illustrates additional operations for an example process for secured device lockout management, specifically to process the claim to determine whether to authorize a claim and cause updating of the functionality lockout state for a client device based on the determination of whether to authorize the claim, in accordance with at least one example embodiment of the present disclosure. In some embodiments, the operations depicted are performed by a device protection program management system, for example embodied by the apparatus 200 as depicted and described above. The apparatus 200 may be in communication with one or more other devices, systems, servers, and/or the like, for performing one or more of the operations as depicted and described below. For example, in at least some embodiments, the apparatus 200 is in communication with at least one third-party provider, for example a carrier system and/or a manufacturer system, and/or a client device.

In some embodiments, one or more of the operations illustrated with respect to FIG. 6A occurs additional to, and/or in place of, one or more operations of another process. For example, as depicted, in some embodiments FIG. 6A begins after block 306 as depicted and described with respect to FIG. 3. Additionally or alternatively, as depicted, in some embodiments upon completion of the operations depicted with respect to FIG. 6A, flow returns to another operation of an associated process. It should be appreciated that, in other embodiments, one or more other processes and/or subprocesses may begin after one or more of the operations depicted and described with respect to FIG. 6A, and/or upon completion of the operations depicted and described with respect to FIG. 6A.

At block 602, the apparatus 200 includes means, such as the device lockout management module 210, communications module 208, input/output module 206, processor 202, and/or the like, or a combination thereof, to receive a user-initiated claim termination request. In some embodiments, the claim termination request indicates a user desire to close and/or otherwise cancel an initiated claim currently pending processing and/or being processed. In this regard, in some embodiments, the claim termination request includes at least a claim identifier, and/or other data identifying a particular device protection program, client device, and/or the like, to be cancelled. In at least some example contexts, a claim termination request is initiated in a circumstance where a user changes their mind regarding a claim submission, locates a lost device, and/or the like. It should be appreciated that a user may decide to terminate a claim for any of a myriad of reasons.

In some embodiments, the apparatus 200 is configured to receive the claim termination request directly via a user device. For example, in some embodiments, the user may communicate with the apparatus 200 via the user device to access one or more user interfaces for submitting a claim termination request. For example, the user may access one or more web pages and/or other native application functionality, such that the apparatus 200 is provides data associated with such interfaces for transmitting the user-initiated claim termination request, for example in response to user interaction with the rendered interface(s).

At optional block 604, the apparatus 200 includes means, such as the device lockout management module 210, communications module 208, input/output module 206, processor 202, and/or the like, or a combination thereof, to set a claim status for the claim to a cancelled status. In this regard, the cancelled status indicates that the claim was not fully processed, but rather was terminated by a user through user interaction. In at least one example context, the cancelled status indicates that the user located a lost device, and/or determined to keep a damaged device rather than replace and/or repair the device through the device protection program. In this regard, in some embodiments, the cancelled status may indicate that the client device should return to having all functionality accessible, for example because the user may be in possession of the client device and desire to utilize such functionality.

At block 606, the apparatus 200 includes means, such as the device lockout management module 210, communications module 208, input/output module 206, processor 202, and/or the like, or a combination thereof, to cause the functionality lockout state for the client device to be set to an unlocked state. In some embodiments, by setting the functionality lockout state to the unlocked state, the apparatus 200 is configured to cause termination of an electronic lockout for the client device, such that the client device returns to being fully accessible. By enabling access to the full functionality set of the client device, the apparatus 200 prevents access to the client device for a limited time during which the claim is being processed, and once indicated by the user that the claim is not being pursued (e.g., via receiving the user-initiated claim termination request), the client device returns to being fully accessible such that the user may continue to utilize the client device with reduced interruption. Similarly, by setting the functionality lockout state to the unlocked state upon user-initiated request, the apparatus 200 is configured to lock out some or all functionality of the client device at least during the time a user indicates the client device may not be accessible to the rightful user, and thus protects against access from unauthorized and/or malicious users.

The apparatus 200 may be configured to cause the functionality lockout state to be set to an unlocked state in any of a myriad of ways, for example via one or more transmissions to a third-party provider. For example, in some embodiments, the apparatus 200 is configured to generate and/or transmit a device unlock request to a manufacturer system associated with the client device. In this regard, in some embodiments, the device unlock request is configured to cause the manufacturer system to set the functionality lockout state for the client to the unlocked state. Alternatively or additionally, in some embodiments, the apparatus 200 is configured to generate and/or transmit a device unlock request to a carrier system, or other third-party provider, in communication with a manufacturer system associated with the client device. In this regard, in some embodiments, the device unlock request is configured to cause the carrier system, or other third-party provider, to transmit one or more other requests to the manufacturer system, where the requests cause the manufacturer system to set the functionality lockout state for the client device to an unlocked state.

In some embodiments, the device unlock request is embodied by and/or otherwise transmitted together with a claim cancelled notification data object. The claim cancelled notification data object may indicate to a third-party provider, for example a carrier system or a manufacturer system, that the claim has been fully processed. In this regard, the functionality lockout state for the client device may be set permanently with respect to the submitted claim, and thus may remain in an unlocked state until a new claim is initiated for the client device (if initiated). Accordingly, the third-party provider may cancel any timers or other pending actions with respect to processing the claim, and/or close an internally stored case associated with the claim for the client device as cancelled by the user in response to the transmission from the apparatus 200.

FIG. 6B illustrates additional operations for an example process for secured device lockout management, specifically to process the claim to determine whether to authorize a claim and cause updating of the functionality lockout state for a client device based on the determination of whether to authorize the claim, in accordance with at least one example embodiment of the present disclosure. In some embodiments, the operations depicted are performed by a device protection program management system, for example embodied by the apparatus 200 as depicted and described above. The apparatus 200 may be in communication with one or more other devices, systems, servers, and/or the like, for performing one or more of the operations as depicted and described below. For example, in at least some embodiments, the apparatus 200 is in communication with at least one third-party provider, for example a carrier system and/or a manufacturer system, and/or a client device.

In some embodiments, one or more of the operations illustrated with respect to FIG. 6A occurs additional to, and/or in place of, one or more operations of another process. For example, as depicted, in some embodiments FIG. 6B begins after block 306 as depicted and described with respect to FIG. 3. Additionally or alternatively, as depicted, in some embodiments upon completion of the operations depicted with respect to FIG. 6B, flow returns to another operation of an associated process. It should be appreciated that, in other embodiments, one or more other processes and/or subprocesses may begin after one or more of the operations depicted and described with respect to FIG. 6B, and/or upon completion of the operations depicted and described with respect to FIG. 6B.

At block 652, the apparatus 200 includes means, such as the device lockout management module 210, communications module 208, input/output module 206, processor 202, and/or the like, or a combination thereof, to determine user claim information associated with the claim was not received within a first timestamp interval. In some embodiments, the first timestamp interval embodies a threshold case information period within which the user claim information is to be received to enable processing of the claim. In some embodiments, the apparatus 200 stores and/or otherwise predetermines the first timestamp interval, for example based the timestamp at which the claim was initiated. In one example context, the first timestamp interval represents a five day timestamp interval, such that user claim information for a claim must be received within 5 days from when the claim was initiated. Alternatively or additionally, in some embodiments, apparatus 200 determines the first timestamp interval based on data received and/or otherwise accessible to the apparatus 200, for example earlier received data associated with the claim to be processed including, without limitation, the claim type for the claim, the device protection program associated with the claim, a user setting associated with the user account for the claim, and/or the like. In some embodiments, the apparatus 200 may be configured to, for example upon initiation of the claim, schedule a task to perform such determination after the first timestamp interval has elapsed. Alternatively or additionally, in some embodiments, the apparatus 200 may be configured to perform one or more checks at various timestamp intervals (e.g., every X seconds, minutes, hours, days, weeks, and/or the like) to determine whether the user claim information has been received if the current timestamp exceeds the first timestamp interval.

At optional block 654, the apparatus 200 includes means, such as the device lockout management module 210, communications module 208, input/output module 206, processor 202, and/or the like, or a combination thereof, to set a claim status for the claim to a timed out status. In this regard, the timed out status indicates that the claim was not fully processed, but rather was closed for lack of user action with respect to the claim. In at least one example context, the timed out status indicates that the user has abandoned pursuing the claim to fulfillment, whether intentional or not. In this regard, in some embodiments, the timed out status may indicate that the client device should return to having all functionality accessible, for example such that the user has access to such functionality if the user has regained possession of the client device or otherwise decided to keep the client device and desires to utilize such functionality.

At block 656, the apparatus 200 includes means, such as the device lockout management module 210, communications module 208, input/output module 206, processor 202, and/or the like, or a combination thereof, to cause the functionality lockout state for the client device to be set to an unlocked state. In some embodiments, by setting the functionality lockout state to the unlocked state, the apparatus 200 is configured to cause termination of an electronic lockout for the client device, such that the client device returns to being fully accessible. By enabling access to the full functionality set of the client device, the apparatus 200 prevents access to the client device for a limited time during which the user may be working to provide data to the apparatus 200 for processing, and once a certain timestamp interval has elapsed (e.g., predetermined or determined as the first timestamp interval), the apparatus 200 determines the user likely abandoned the claim and returns the client device to being fully accessible such that, if the user has regained possession of the client device or otherwise decided to retain possession of the client device and forgot about or otherwise ignored the initiated claim, the user may continue to utilize the client device with reduced interruption. Similarly, by setting the functionality lockout state to the unlocked state after the first timestamp interval, the apparatus 200 is configured to lock out some or all functionality of the client device at least during a sufficient time for the user to submit requisite data to the apparatus 200 for processing, such that the client device is not unlocked at too early a time that may be likely to expose the client device to use by a wrongful possessor and/or malicious user, such as during a reasonable time frame for data submission.

The apparatus 200 may be configured to cause the functionality lockout state to be set to an unlocked state in any of a myriad of ways, for example via one or more transmissions to a third-party provider. For example, in some embodiments, the apparatus 200 is configured to generate and/or transmit a device unlock request to a manufacturer system associated with the client device. In this regard, in some embodiments, the device unlock request is configured to cause the manufacturer system to set the functionality lockout state for the client to the unlocked state. Alternatively or additionally, in some embodiments, the apparatus 200 is configured to generate and/or transmit a device unlock request to a carrier system, or other third-party provider, in communication with a manufacturer system associated with the client device. In this regard, in some embodiments, the device unlock request is configured to cause the carrier system, or other third-party provider, to transmit one or more other requests to the manufacturer system, where the requests cause the manufacturer system to set the functionality lockout state for the client device to an unlocked state.

In some embodiments, the device unlock request is embodied by and/or otherwise transmitted together with a claim timeout notification data object. The claim timeout notification data object may indicate to a third-party provider, for example a carrier system or a manufacturer system, that the claim was not fully processed or cancelled, but close as determined abandoned by the initiating user. In this regard, the functionality lockout state for the client device may be set permanently with respect to the submitted claim, and thus may remain in an unlocked state until a new claim is initiated for the client device (if initiated). Accordingly, the third-party provider may terminate any timers or other pending actions with respect to processing the claim, and/or close an internally stored case associated with the claim for the client device as timed out by the user based at last on the transmission from the apparatus 200.

Example Detailed Secured Device Lockout Management Flow

FIGS. 7, 8, 9, and 10 illustrate example operations of an example detailed process for secure device lockout management, specifically based on information from a trusted third-party provider, in accordance with at least one embodiment of the present disclosure. In some embodiments, the operations depicted are performed by a device protection program management system, for example embodied by the apparatus 200 as depicted and described above. The apparatus 200 may be in communication with one or more other devices, systems, servers, and/or the like, for performing one or more of the operations as depicted and described below. For example, in at least some embodiments, the apparatus 200 is in communication with at least one third-party provider, for example a carrier system and/or a manufacturer system, and/or a client device.

At block 702, the apparatus 200 includes means, such as the device lockout management module 210, communications module 208, input/output module 206, processor 202, and/or the like, or a combination thereof, to receive case confirmation from a trusted third-party provider. In some embodiments, the trusted third-party provider is embodied by a carrier system in communication with the apparatus 200. In yet other embodiments, the trusted third-party provider is embodied by a manufacturer system in communication with the apparatus 200. It should be appreciated that, as described herein, the apparatus 200 may receive the information from the trusted third-party provider over one or more communication networks, for example over the Internet.

In some embodiments, the case confirmation information includes at least a third-party case identifier associated with a client device. In some embodiments, the third-party case identifier uniquely identifies corresponding third-party case information stored by the trusted third-party. In some embodiments, additionally or alternatively, the apparatus 200 receives an authentication token may be indicating that the trusted third-party provider successfully authenticated a user associated with the third-party case identifier. In some embodiments, the trusted third-party provider is configured to authenticate a user utilizing one or more authentication process(s). In a particular example context, the trusted third-party provider requires the user to provide one or more user authentication credentials, and subsequently validate their identity using two or multi-factor authentication (e.g., an email message, SMS or text message to an associated user device, or the like). An authentication token may be signed by the third-party provider such that embodiments of the present disclosure may validate the authentication token, for example using public-key cryptography, to verify the authentication token did originate from the trusted third-party provider. To enhance security, some embodiments perform additional security checks. For example, in some embodiments, an embodiment system associates a trusted third-party provider with one or more IP addresses, and the embodiment system is configured to verify that the received third-party case information originated from the trusted third-party provider.

At optional block 704, the apparatus 200 includes means, such as the device lockout management module 210, communications module 208, input/output module 206, processor 202, and/or the like, or a combination thereof, to retrieve some, or all, of the third-party case information from the trusted third-party provider and/or from one or more local or networked storage locations utilizing the third-party case identifier. For example, some embodiment systems utilize an application programming interface (API) to request, from the trusted third-party provider, some or all of the third-party case information associated with a particular third-party case identifier. Third-party case information, in some embodiments, includes one or more from the group comprising a device identifier (e.g., International Manufacturer Equipment Identity (IMEI), Internet Protocol (IP) address, alphanumeric identifier, or the like), prior case information (e.g., how many third-party cases have been opened associated with a particular client device and/or user), device location resource information (e.g., whether access to a device location application is enabled associated with the client device, whether a user attempted to access the device location application to locate the client device, last time a user accessed a device location resource to locate the device, or the like). Additionally or alternatively, in some embodiments, the third-party case information includes location information, application status information for each application associated with the client device, stored data information, and the like, associated with the client device associated with the case at the time the user initiated the third-party case, such that the third-party case information serves as a snapshot of all information present on the client device at the time the user initiated the third-party case. Some embodiments are further configured to store the third-party case identifier, and/or otherwise store claim information associated with the third-party case identifier such that claim information is retrievable utilizing the third-party case identifier. Additionally or alternatively, some embodiments store all, or some, or the third-party case information, such that the third-party case information is retrievable using the third-party case identifier. In yet some other embodiments, the third-party case information is received together with the case confirmation information at an earlier step, for example at block 702.

At optional block 706, the apparatus 200 includes means, such as the device lockout management module 210, communications module 208, input/output module 206, processor 202, and/or the like, or a combination thereof, to identify a client device identifier associated with the third-party case information. In this regard, the client device identifier may uniquely identify the client device for which the user has started the claim initiation process. Some embodiments are configured to extract the client device identifier from the third-party case information. Alternatively or additionally, in some embodiments, the client device identifier is identified from the case confirmation information received at an earlier step, for example at block 702. In some such embodiments, the apparatus 200 is configured to extract and/or otherwise parse the client device identifier from the case confirmation information.

At optional block 708, the apparatus 200 includes means, such as the device lockout management module 210, communications module 208, input/output module 206, processor 202, and/or the like, or a combination thereof, to transmit a case received response to the trusted third-party provider. In some embodiments, the case received response is configured to cause the trusted third-party provider to initiate a lock out of the client device, or otherwise maintain the lock out of the client device that may have been initiated by the trusted third party upon acknowledgement by the user that the device is lost or stolen and the user wishes to proceed with claim fulfillment prior to transmission of the case confirmation information, such that the client device is inoperable or otherwise inaccessible until a future status change (e.g., a claim status update notification data object) is transmitted by the embodiment device protection program management system to the trusted third-party provider indicating that access to the device should be restored. For example, the trusted third-party provider may lock out the client device by configuring the client device to indefinitely display a user interface not capable of receiving, or responding to, user engagement.

At block 710, the apparatus 200 includes means, such as the device lockout management module 210, communications module 208, input/output module 206, processor 202, and/or the like, or a combination thereof, to determine whether user case information is received within a threshold claim initiation period. In some embodiments, the case received response is also configured to present the user, for example via a user device, with an interface configured and/or provided by the apparatus 200 to begin the claim initiation process by submitting user case information. For example, the user may be provided, redirected to, or otherwise access, a user case information gathering interface, configured to enable the user to enter and/or submit user claim information. User claim information, in some embodiments, includes at least one or more from the group comprising an incident date (e.g., when the client device was lost or stolen), an incident description, user incident response information, user information, payment information, and/or the like.

In some embodiments, a third-party case associated with a given third-party case identifier may only remain accessible for submitting information via the apparatus 200 for a determined, or pre-determined, threshold claim initiation period, if a claim is not submitted associated with the third-party case. For example, in a particular embodiment system, the apparatus 200 may provide functionality to enable a user to access submit user case information associated with received third-party case information for a limited time for which the third-party case may be open awaiting submission the user's initial user case information. In at least one example embodiment, the threshold claim initiation period represents one day (24 hours). In a circumstance where the apparatus 200 determines a user has not submitted user case information within the threshold claim initiation period, the apparatus 200 may transmit information to cause the trusted third-party provider to close the case. In this regard, the apparatus 200 may determine that, based on the lack of action by the user, the user no longer is proceeding with fulfilling a claim associated with the client device via the apparatus 200. In some embodiments, the apparatus 200 may be configured to delete, or otherwise make inaccessible, information associated with the third-party case to be closed, such as the third-party case identifier and/or third-party case information associated with the third-party case identifier. Accordingly, if user case information is not received within the threshold claim initiation period, t the trusted third-party may end the lock out associated with the client device, such that the client device returns to a functional form. Alternatively or additionally, in some embodiments, the apparatus 200 may cause the trusted third-party provider to end the lock out associated with the client device, for example through one or more transmissions as described herein. For example, in at least one embodiment, the apparatus 200 is configured to transmit a device unlock request and/or a claim timeout notification data object, and/or a similar data object, to the trusted third-party provider to cause termination of the lock out of the client device. In some embodiments, closing a browser, or otherwise terminating the session with the apparatus 200 may cause the apparatus 200 to determine the user case information has not been received within the threshold claim initiation period, and thus to transmit information to cause the case to be closed and/or the client device to be unlocked without submission of a claim. In some embodiments, the trusted third-party provider may maintain its own timer, for example a drop dead timer, to await confirmation from the device protection program management system that the claim was generated. In some such embodiments, if the drop dead timer expires before the apparatus 200 provides an indication that a claim was successfully initiated, the trusted third-party provider automatically causes termination of the lock out for the client device.

Alternatively, in some example contexts, the apparatus 200 includes means, such as the device lockout management module 210, communications module 208, input/output module 206, processor 202, and/or the like, or a combination thereof, to receive the user case information submitted by the user, for example as illustrated at block 712. In some embodiments, for example, the apparatus receives the user case information from a user device via user interaction by the user with a user case information gathering interface to enter such user case information. For example, in some embodiments, the user case information may include a device protection policy identifier and/or other associated information, client device information, a claim type to use for the claim to be generated, and/or the like. In some such, the user case information may include all remaining information necessary to generate a claim via the apparatus 200, and/or additional information useful for generating and/or beginning initial processing of the claim.

At block 714, the apparatus 200 includes means, such as the device lockout management module 210, communications module 208, input/output module 206, processor 202, and/or the like, or a combination thereof, to identify a device protection program associated with at least the client device identifier. Additionally or alternatively, in some embodiments, the apparatus 200 may be configured to identify the device protection program based on the received user case information submitted by the user. For example, in some embodiments, the user case information submitted by the user may include a device protection program identifier selected by the user for use in generating the claim. Additionally or alternatively, in some embodiments, the earlier received information from a trusted third-party provider may be used to identify the device protection program. For example, the case confirmation information and/or third-party case information may include a device protection program identifier associated with the claim to be generated. The identified device protection program may be embodied by a predefined rule set defining the coverage provided by the device protection program. In this regard, the device protection program may define various parameters for which information received associated with the claim must satisfy for the apparatus 200 to authorize the claim.

At block 716, the apparatus 200 includes means, such as the device lockout management module 210, communications module 208, input/output module 206, processor 202, and/or the like, or a combination thereof, to generate a claim based at least in part on the received case confirmation information and/or received user case information. For example, a client device may be subscribed to, or otherwise enrolled in, a device protection program that is associated with certain claim parameters and/or requirements embodied by a predefined rule set. In some such embodiments, the client device may be subscribed to a plurality of device protection programs, each of which may cover any number of claim types. In this regard, the user case information and/or information received from the trusted third-party provider may include a device protection program identifier, a claim type, and/or the like. In some embodiments, based on the various information provided, the claim may be generated in association with the identified device protection program, such that the claim comprises parameters for which values are to be provided for by a user. In some embodiments, for a claim associated with a particular device protection program, the claim may be authorized if the claim parameters meet the requirements of the device protection program, as described herein. In some embodiments, the apparatus 200 may deny the claim otherwise, or request further information if the provided value for the claim parameters are incomplete or insufficient.

At block 718, the apparatus 200 includes means, such as the device lockout management module 210, communications module 208, input/output module 206, processor 202, and/or the like, or a combination thereof, to generate and/or transmit a claim created notification data object to the trusted third-party provider. In some embodiments, the claim created notification data object is configured to indicate that a user has successfully initiated a claim associated with a third-party case. In some such embodiments, the claim created notification data object may cause the trusted third-party provider to terminate one or more timers for claim initiation, for example one or more drop dead timer(s) associated with termination of the lock out for the client device. In this regard, the trusted third-party provider may be configured to automatically terminate the lock out for the client device associated with a third-party case after a drop dead timer elapses, such that the client device returns to a functional form, if no information is received from the apparatus 200 and/or a notification data object indicates the apparatus 200 has not received the user case information within the threshold claim initiation period (e.g., within 24 hours of the trusted third-party transmitting the case confirmation information to the device protection program management system). Additionally or alternatively, in some embodiments, the claim created notification data object is configured to cause the trusted third-party provider to update the status of the case stored by the trusted third-party provider, for example, to provide the claim status to the user via the trusted third-party provider.

The claim created notification data object may be configured to cause the trusted third-party to change a case status associated with the third-party case, stored and/or otherwise managed by the trusted third-party provider, from a case received status, such as "Case Received", to a claim created status, such as "Claim Created." A trusted third-party provider may set the case status to a Case Received status together with transmission of the case confirmation information and/or third-party case information, as illustrated, to the apparatus 200. Alternatively or additionally, in some embodiments, a trusted third-party provider is configured to set the case status for a third-party case to a Case Received status when the third-party provider receives, from the apparatus 200, the case received response acknowledging transmission of the case confirmation information to the apparatus 200. Accordingly, a lock out for the client device associated with the third-party case may end, or otherwise be terminated, if the apparatus 200 determines that no claim is being submitted (e.g., if the time period expires or the system otherwise determines lack of interest in the claim) and/or unless the case status is updated within a threshold claim initiation period. In accordance with at least some example embodiments of the present disclosure, the apparatus 200 may cause the trusted third-party provider to set the case status to a Claim Created status indicating that the apparatus 200 generated a claim associated with and/or otherwise based on the third-party case. In this regard, the device lock out for the client device associated with the third-party case is initiated and/or maintained during processing and fulfillment of the claim.

In some embodiments, the claim and/or identified device protection program is associated with claim requirements data embodying parameters that represent information required by the user. For example, a particular claim may be associated with claim requirements data indicating the user must submit one or more claim disclaimers, claim forms, or the like, associated with the claim. Additionally or alternatively, in some embodiments, the claim requirements data may indicate the user must provide supplemental claim information to the apparatus 200 to enable the claim to be fully processed.

In some embodiments, the apparatus 200 is configured associated with a claim completion period associated with receiving the claim requirement data from the user after generation of the claim. For example, in some embodiments, if the user does not submit all claim requirements data to the apparatus 200 within a determined, or pre-determined, threshold claim completion period (e.g., 30 days), the apparatus 200 is configured to close the claim for lack of action by the user. Accordingly, in some embodiments, apparatus 200 transmits a notification data object, such as a claim timed out notification data object, to the trusted third-party provider to. In some embodiments, the claim timed out notification data object is configured to cause the trusted third-party provider to set the case status associated with the third-party case to a case closed status or case timed out status, such as "Case Closed For Lack of Activity." In response to receiving the claim timed out notification data object, and/or in response to the case status update to case closed/timed out status, the trusted third-party provider may then terminate the lock out for the client device associated with the case, such that the client device returns to a functional state.

In some embodiments, a user may cancel, and/or affirmatively abandon, a claim and/or third-party case during processing. In this regard, the claim may be cancelled before the claim has been fully processed by the apparatus 100. For example, in some embodiments, the apparatus 200 is configured to enable such affirmative cancellation of one or more claims as described herein, for example as described and/or depicted with respect to FIG. 8 below.

At block 720, the apparatus 200 includes means, such as the device lockout management module 210, communications module 208, input/output module 206, processor 202, and/or the like, or a combination thereof, to receive claim requirements data from a user within a threshold claim completion period. In this regard, the apparatus 200 is configured to determine whether the claim requirements data, if received, was received within the threshold claim completion period. In at least one example embodiment, in a circumstance where the claim requirements data is received from the user within the threshold claim completion period, the flow proceeds to block B, for example as depicted and described with respect to FIG. 9. Alternatively or additionally, in at least one example embodiment, in a circumstance where the claim requirements data is not received from the user within the threshold claim completion period, the flow proceeds to block A, for example as depicted and described with respect to FIG. 8.

FIG. 8 illustrates additional operations for an example detailed process for secured device lockout management, specifically to process the claim as timed out based on lack of user action, in accordance with at least one example embodiment of the present disclosure. In some embodiments, the operations depicted are performed by a device protection program management system, for example embodied by the apparatus 200 as depicted and described above. The apparatus 200 may be in communication with one or more other devices, systems, servers, and/or the like, for performing one or more of the operations as depicted and described below. For example, in at least some embodiments, the apparatus 200 is in communication with at least one third-party provider, for example a carrier system and/or a manufacturer system, and/or a client device.

In some embodiments, one or more of the operations illustrated with respect to FIG. 8 occurs additional to, and/or in place of, one or more operations of another process. For example, as depicted, in some embodiments FIG. 8 begins at block A as depicted and described with respect to FIG. 7. Additionally or alternatively, as depicted, in some embodiments upon completion of the operations depicted with respect to FIG. 8, flow returns to FIG. 7 or the flow ends as depicted and described. It should be appreciated that, in other embodiments, one or more other processes and/or subprocesses may begin after one or more of the operations depicted and described with respect to FIG. 8, and/or upon completion of the operations depicted and described with respect to FIG. 8.

At optional block 802, the apparatus 200 includes means, such as the device lockout management module 210, communications module 208, input/output module 206, processor 202, and/or the like, or a combination thereof, to close the claim for lack of action. In some embodiments, to close the claim for lack of action, the apparatus 200 is configured to set a claim status for the claim to a claim timeout status. In this regard, the claim timeout status represents a final status for the claim, such that the claim has been fully processed based on the actions (or more specifically, lack of action), by the user.

At block 804, the apparatus 200 includes means, such as the device lockout management module 210, communications module 208, input/output module 206, processor 202, and/or the like, or a combination thereof, to transmit a claim timeout notification data object to the trusted third-party provider. In some embodiments, the claim timeout notification data object is configured to cause the trusted third-party provider to terminate the lock out of the client device. For example, as described herein, the claim timeout notification data object may be configured to cause the trusted third-party provider to communicate directly with the client device, such as where the trusted third-party device embodies a manufacturer system. Additionally or alternatively, in some embodiments, the claim timeout notification data object may be configured to cause the trusted third-party provider to communicate with a manufacturer system configured to set the functionality lockout state of the client device via one or more communications. Additionally or alternatively, in some embodiments, the apparatus 200 is configured to transmit the claim timeout notification data object to cause the trusted third-party provider to set one or more case statuses for a third-party case associated with the claim to a timed out status.

FIG. 9 illustrates additional operations for an example detailed process for secured device lockout management, specifically to process received claim requirements data and set an appropriate lockout state, in accordance with at least one example embodiment of the present disclosure. In some embodiments, the operations depicted are performed by a device protection program management system, for example embodied by the apparatus 200 as depicted and described above. The apparatus 200 may be in communication with one or more other devices, systems, servers, and/or the like, for performing one or more of the operations as depicted and described below. For example, in at least some embodiments, the apparatus 200 is in communication with at least one third-party provider, for example a carrier system and/or a manufacturer system, and/or a client device.

In some embodiments, one or more of the operations illustrated with respect to FIG. 9 occurs additional to, and/or in place of, one or more operations of another process. For example, as depicted, in some embodiments FIG. 9 begins at block B as depicted and described with respect to FIG. 7. Additionally or alternatively, as depicted, in some embodiments upon completion of the operations depicted with respect to FIG. 9, flow returns to FIG. 7 or the flow ends as depicted and described. It should be appreciated that, in other embodiments, one or more other processes and/or subprocesses may begin after one or more of the operations depicted and described with respect to FIG. 9, and/or upon completion of the operations depicted and described with respect to FIG. 9.

At block 902, the apparatus 200 includes means, such as the device lockout management module 210, communications module 208, input/output module 206, processor 202, and/or the like, or a combination thereof, to determine whether a claim is acceptable, or in other words is to be authorized. In some embodiments, the apparatus 200 is configured to determine whether the claim is acceptable based on one or more from the group comprising the user case information, the third-party case information, the claim parameters, the claim requirements data, and/or the like. For example, in at least one example embodiment, the apparatus 200 is configure to compare the claim requirements data with the predefined rule set embodying the device protection program to determine whether the claim requirements data satisfies the predefined rule set. In some such circumstances, the apparatus 200 is configured to determine the claim is acceptable in a circumstance where the claim requirements data satisfies the predefined rule set embodying the device protection program, and determine the claim is not acceptable otherwise.

In some embodiments, in a circumstance where the apparatus determines the claim is acceptable, flow proceeds to optional block 908. At optional block 908, the apparatus 200 includes means, such as the device lockout management module 210, communications module 208, input/output module 206, processor 202, and/or the like, or a combination thereof, to authorize the claim. Additionally or alternatively, in at least some example embodiments, the apparatus 200 is configured to perform one or more operations to fulfill the claim. For example, the apparatus 200 may set a claim status associated with the claim that indicates the claim was authorized, such as by setting the claim status to an authorized status value. Additionally or alternatively, the apparatus 200 may initiate one or more actions associated with sending a replacement device to the user, for example, via an associated system and/or warehouse associated with the apparatus 200, or via the trusted third-party provider and/or an associated system. Additionally or alternatively, to fulfill the claim, the apparatus 200 may provide information to the user, for example via a user device associated with the user, to enable the user to begin the process for replacing, repairing, and/or the like, with respect to the client device for which the claim was submitted.

At block 910, the apparatus 200 includes means, such as the device lockout management module 210, communications module 208, input/output module 206, processor 202, and/or the like, or a combination thereof, to transmit a claim authorized notification data object to the trusted third-party provider. In some embodiments, the claim authorized notification data object is configured to cause continuation of an electronic lockout of the client device. In some embodiments, the claim authorized notification data object is configured to cause the trusted third-party provider to set the case status associated with the third-party case to a claim decision status indicating the claim associated with the third-party case was authorized, such as "Claim Authorized". In response to receiving the claim authorized notice, and/or in response to the case status update to a to the third-party case indicating the claim was authorized, the trusted third-party provider may continue the lock out for the client device associated with the case, such that the client device remains permanently inoperative, not functional, or otherwise inaccessible. In some embodiments, no action is required to continue the client device lock out. In other embodiments, one or more requests is/are transmitted to a client device, for example directly or indirectly through a manufacturer system, to cause the client device to remain permanently in a locked out state.

Returning to block 902, in a circumstance where the claim is not determined to be acceptable, flow continues to optional block 904. In some embodiments, the claim may be determined not acceptable in circumstances where the processed data is determined deficient, fraudulent, or otherwise unacceptable. For example, the apparatus 200 may be configured to determine that the claim is unacceptable because the submitted claim requirements data does not satisfy claim requirements represented by the predefined rule set of a device protection program.

At optional block 904, the apparatus 200 includes means, such as the device lockout management module 210, communications module 208, input/output module 206, processor 202, and/or the like, or a combination thereof, to deny the claim. For example, the apparatus 200 may set a claim status associated with the claim that indicates the claim was denied, for example by setting the value of the claim status to a claim denied status. In this regard, the claim denied status may indicate that the claim has been fully processed and will not be fulfilled. In this regard, the denied claim status further indicates that the client device will not be repaired and/or replaced based on the device protection program, and thus that unlocking the functionality of the client device may be best for purposes of minimizing data inaccessibility and/or user frustration.

At block 906, the apparatus 200 includes means, such as the device lockout management module 210, communications module 208, input/output module 206, processor 202, and/or the like, or a combination thereof, to transmit a claim denied notification data object to the trusted third-party provider. In some embodiments, the claim denied notification data object is configured to cause the trusted third-party provider terminate the electronic lockout of the client device. In some embodiments, the claim denied notification data object is configured to cause the trusted third-party provider to set the case status associated with the third-party case to a value indicating the claim associated with the third-party case was denied, such as "Claim Denied". In response to receiving the claim denied notification data object, and/or in response to the case status update to a status indicating the claim associated with the third-party case was denied, the trusted third-party provider may end the electronic lock out for the client device associated with the case, such that the client device returns functioning properly.

It should be appreciated that, during processing as illustrated in FIGS. 7, 8, and 9, the apparatus may be configured to receive a user-initiated cancellation of the initiated claim. In this regard, the apparatus 200 may be configured to provide the process as illustrated and described with respect to FIG. 6A in parallel with one or more operations as depicted and described with respect to FIGS. 7, 8, and/or 9. Additionally or alternatively, in some embodiments, the process as depicted and described with respect to FIG. 6A occurs after one or more of the blocks performed in the processes depicted and described with respect to FIGS. 7, 8, and/or 9.

In some embodiments, for example, the apparatus 200 includes means, such as the device lockout management module 210, communications module 208, input/output module 206, processor 202, and/or the like, or a combination thereof, to provide one or more interfaces to the user, for example directly to a user device associated with the user and/or indirectly via a trusted third-party provider, for initiating cancellation of an existing claim. In this regard, the interface(s) may include a cancel claim component configured to enable selection of an initiated claim to cancel, and/or submission of the cancellation to the apparatus 200. In some embodiments, in response to user engagement with the cancel claim component (e.g., a cancel claim button rendered via a web interface or an application interface). Alternatively or additionally, in some embodiments, a user may cancel a claim via user interaction with one or more call center system associated with the apparatus 200, such as via a call center generated claim cancellation request, or the like.

In some embodiments, the apparatus 200 is configured to cancel the claim, for example by setting the claim status to a claim cancelled status as described, and/or cause cancellation of a corresponding third-party case, for example through one or more transmissions to a trusted third-party provider. In some embodiments, upon termination of the claim and/or third-party case, the apparatus 200 may be configured to delete, cancel, and/or otherwise make inaccessible, all stored information associated with the claim and/or third-party case, and/or cause the trusted third-party to delete, cancel, and/or otherwise make inaccessible, all stored information associated with the third-party case. Additionally or alternatively, in some embodiments, the apparatus causes termination of an electronic lockout of a client device associated with the claim upon cancellation of the claim by a user.

Example Operations for Device Lockout State Verification

FIG. 10 illustrates example operations for secured device lockout management, specifically for device lockout state verification, in accordance with at least one example embodiment of the present disclosure. In some embodiments, the operations depicted are performed by a device protection program management system, for example embodied by the apparatus 200 as depicted and described above. The apparatus 200 may be in communication with one or more other devices, systems, servers, and/or the like, for performing one or more of the operations as depicted and described below. For example, in at least some embodiments, the apparatus 200 is in communication with at least one third-party provider, for example a carrier system and/or a manufacturer system, and/or a client device.

In some embodiments, the operations depicted with respect to FIG. 10 are performed additional to and/or in parallel with one or more of the other operations depicted and described herein, for example FIGS. 3-10. Alternatively or additionally, in some embodiments, one or more of the operations depicted and described with respect to FIG. 10 occur additional to, and/or in place of, one or more operations of another process. For example, in some embodiments, the operations depicted with respect to FIG. 10 begin after one or more blocks for setting the functionality lockout state of a client device, and/or otherwise causing initiation and/or termination of an electronic lockout of the client device. Some or all of the operations depicted and described with respect to FIG. 10 may occur additional to, and/or in place of, one or more operations of another process described herein. For example, at least block 1002 may include and/or replace one or more other operations described for causing setting of a functionality lockout state for a client device, or otherwise causing initiation and/or termination of an electronic lockout of a client device.

At block 1002, the apparatus 200 includes means, such as the device lockout management module 210, communications module 208, input/output module 206, processor 202, and/or the like, or a combination thereof, to transmit at least one request intended to cause setting of a functionality lockout state for a client device to an intended functionality lockout state. In some embodiments, the operation occurs as described in one or more blocks of another process described herein, for example block 310 of FIG. 3, block 402 of FIG. 4A, block 452 of FIG. 4B, block 508 and/or block 512 of FIG. 5, block 606 of FIG. 6A, and/or block 656 of FIG. 6B. In this regard, the apparatus 200 may generate and/or transmit such transmissions to cause initiation and/or termination of an electronic lockout of the client device. For example, if the intended functionality lockout state represents a locked out state, such transmissions may be intended to cause initiation of an electronic lockout. Similarly, if the intended functionality lockout state represents an unlocked state, such transmissions may be intended to cause termination of an electronic lockout.

In some example contexts, such transmissions may be ineffective due to any of a myriad of errors. For example, in at least one example context, the transmission may fail to reach a third-party provider due to a faulty and/or corrupted connection between the apparatus 200 and the third-party provider. Alternatively or additionally, in at least some example contexts, the transmission may fail to reach a manufacturer system due to a faulty and/or corrupted connection between a third-party provider, such as a carrier system, and the manufacturer system. Additionally or alternatively still, in at least some example contexts, the transmission may fail to reach a client device due to a faulty and/or corrupted connection between a manufacturer system and the client device. For any of the above reasons, and/or other errors in transmitting and/or processing the transmissions by any system involved in setting the functionality lockout state for the client device, the client device may not be successfully set to the intended functionality lockout state based on the attempted transmission of the at least one request.

At optional block 1004, the apparatus 200 includes means, such as the device lockout management module 210, communications module 208, input/output module 206, processor 202, and/or the like, or a combination thereof, to schedule a status request action based on a status request timestamp interval. In this regard, the status request timestamp interval may represent a time period after which a status request action is to be performed. In some such embodiments, the status request action may include one or more actions for receiving the current value for the functionality lockout state of a client device, as described herein. For example, the status request action may include one or more operations described herein, for example the operation described below with respect to block 1006. In this regard, the apparatus 200 may wait until the status request timestamp interval elapses to perform the status request action.

At block 1006, the apparatus 200 includes means, such as the device lockout management module 210, communications module 208, input/output module 206, processor 202, and/or the like, or a combination thereof, to transmit a lockout status request associated with the client device. In some embodiments, the lockout status request is transmitted to a third-party provider, such as a manufacturer system, in communication with the client device. In this regard, the lockout status request may be specially configured to cause the third-party provider to communicate with the client device to retrieve the value of the device lockout state for the client device. Alternatively or additionally, in some embodiments, the lockout status request is transmitted to a third-party provider, such as a carrier system, in communication with a manufacturer system configured to communicate with the client device. In this regard, the lockout status request may be specially configured to cause the third-party provider to transmit one or more requests to the manufacturer system to cause the manufacturer system to retrieve the value of the device lockout state for the client device. It should be appreciated that the various systems may be configured to communicate over any number of communication networks. For example, in some embodiments, the apparatus 200, third-party provider, manufacturer system, and/or client device may each communicate over an Internet connection, and/or over one or more cellular networks, private networks, and/or the like.

At block 1008, the apparatus 200 includes means, such as the device lockout management module 210, communications module 208, input/output module 206, processor 202, and/or the like, or a combination thereof, to receive data representing a current data value of the functionality lockout state for the client device. In some such embodiments, the data representing the current data value of the functionality lockout state may be received in response to the lockout status request transmitted at block 1006. In some such embodiments, the current data value of the functionality lockout state for the client device may be parsed from the received response data. The data representing the current data value of the functionality lockout state for the client device may embody a different value based on whether the client device is currently affected by an electronic lockout.

At decision block 1010, the apparatus 200 includes means, such as the device lockout management module 210, communications module 208, input/output module 206, processor 202, and/or the like, or a combination thereof, to determine whether the current data value represents the intended functionality lockout state. In at least one example context, the current data value of the functionality lockout state for the client device indicates whether the electronic device is currently affected by an electronic lockout. For example, in at least one example context, the current data value may represent a locked out state in a circumstance where the client device is currently affected by an electronic lockout. Similarly, in the at least one example context, the current data value may represent an unlocked state in a circumstance where the client device is not currently affected by an electronic lockout. In this regard, in some embodiments, the apparatus 200 may be configured to compare the current data value for the client device received at block 1008 with the value of the intended functionality lockout state to determine whether the current data value represents the intended functionality lockout state. In some such embodiments, in a circumstance where the current data value does represent the intended functionality lockout state, the apparatus 200 determines that the intended functionality lockout state has been successfully set. Similarly, in some such embodiments, in a circumstance where the current data value does not represent the intended functionality lockout state, the apparatus 200 determines that the intended functionality lockout state has not been successfully set.

In a circumstance where the apparatus 200 determines that the current data value represents the intended functionality lockout state, and/or that the intended functionality lockout state has successfully been set, the flow may end. Alternatively, in at least one example embodiment, the apparatus 200 may perform one or more additional actions based on the determination. For example, in at least one embodiment, the apparatus 200 may mark one or more indicators representing that the apparatus 200 has verified the current functionality lockout state for the client device as correct.

Returning to decision block 1010, in a circumstance where the apparatus 200 determines that the current data value does not represent the intended functionality lockout state, and/or that the intended functionality lockout state has not successfully been set, the flow may proceed to block 1012. At block 1012, the apparatus 200 includes means, such as the device lockout management module 210, communications module 208, input/output module 206, processor 202, and/or the like, or a combination thereof, to transmit a second at least one request intended to cause setting of the functionality lockout state for the client device to the intended functionality lockout state. In this regard, the second at least one request may represent a second attempt, performed by the apparatus 200, at setting the intended functionality lockout state. In this regard, the apparatus 200 may similarly attempt to transmit the second at least one request over one or more communication networks, for example to a third-party provider such as a carrier system and/or manufacturer system in communication with a client device. Upon and/or after transmitting the second at least one request, flow may proceed back to optional block 1004. In some such embodiments, the status request timestamp interval may be increased with each iteration (e.g., doubled or multiplied by another factor, increased by a flat amount, or the like). In this regard, the flow may continue throughout the cycle embodied by the various depicted and described blocks until the apparatus 200 determines the current data value of the functionality lockout state for the client device represents the intended functionality lockout state, for example at decision block 1010. In this regard, the apparatus 200 may be configured to determine with certainty that the client device has been set to an intended functionality lockout state, such that an electronic lockout is confirmed as initiated when desired and terminated when not desired. The apparatus 200 may thus provide advantages in reducing the likelihood that the client device remains in an improper functionality lockout state, for example reducing the opportunity for unauthorized users to access functionality of the client device in circumstances where the electronic lockout has not yet been successfully set due to error, and/or reducing user frustration due to locking the user out from functionality via their client device in circumstances where the electronic lockout has not yet been successfully terminated due to error. The depicted and described processes provide such advantageous without additional processing by the client device, thus conserving computing resources of the client device.

Example Secured Device Lockout Management Flow Performed by a Third-Party Provider FIG. 11 illustrates an example process for secured device lockout management in accordance with at least one example embodiment of the present disclosure. In some embodiments, the operations depicted are performed by a third-party provider system, such as a carrier system and/or manufacturer system, for example embodied by the apparatus 250 as depicted and described above. The apparatus 250 may be in communication with one or more other devices, systems, servers, and/or the like, for performing one or more of the operations as depicted and described below. For example, in at least some embodiments, the apparatus 250 is in communication with a user device, a device protection program management system, a client device, and/or another third-party provider such as a carrier system and/or manufacturer system.

At block 1102, the apparatus 250 includes means, such as the third-party case lockout management module 260, communications module 258, input/output module 256, processor 252, and/or the like, or a combination thereof, to receive client device event data objects associated with a client device, the client event data objects comprising a case initiation request. In at least some embodiments, the client device event data objects are received from a user device associated with a user. In this regard, the user may submit the client device event data objects to initiate a claim process associated with the client device. In some embodiments, the client device event data objects includes one or more client device fault data objects, for example indicating that the client device has become damaged or otherwise defective, and/or a client device loss data objects, indicating that the client device has been lost, stolen, or otherwise has become physically inaccessible. In some embodiments, the case initiation request includes at least a client device identifier associated with the client device, for example such that the apparatus 250 may utilize the client device identifier to uniquely associate the received data with a particular client device. Additionally or alternatively, in some embodiments, the apparatus 250 is configured to generate a third-party case in response to the case initiation request, for example based on at least the client device event data objects received. Additionally or alternatively still, in some embodiments, the apparatus 250 is configured to authenticate the user associated with the received client device event data objects. For example, in some embodiments the apparatus 250 is configured to provide one or more user authentication processes that enables the apparatus 250 to verify the identity of the user. Non-limiting examples of such processes include login with user credentials (e.g., a username and password), validation through a device associated with a known user (e.g., a two-factor authentication through a separate device or channel), or a combination thereof.

At block 1104, the apparatus 250 includes means, such as the third-party case lockout management module 260, communications module 258, input/output module 256, processor 252, and/or the like, or a combination thereof, to transmit electronic data signals to the client device. The electronic data signals may be specially configured to cause an electronic lockout of the client device. In this regard, in some embodiments, the electronic signals represent a request to set a functionality lockout state of the client device to a locked out state. It should be appreciated that, in some example contexts, the electronic data signals are transmitted to the client device directly, for example via one or more communication networks between the apparatus 250 and the client device. Alternatively or additionally, in at least one example context, the electronic data signals are transmitted indirectly, for example via a manufacturer system configured to cause the electronic lockout. In some such embodiments, the electronic data signals may be transmitted to the manufacturer system through one or more APIs, for example.

At block 1106, the apparatus 250 includes means, such as the third-party case lockout management module 260, communications module 258, input/output module 256, processor 252, and/or the like, or a combination thereof, to transmit case confirmation data to a device protection program management system. In some such embodiments, the case confirmation data is based at least in part on a client device fault data object or a client device loss data object. In this regard, the case confirmation data may include some or all of the client device event data objects received at an earlier step, and/or information generated based on the client device event data objects. For example, in some embodiments, the case confirmation data includes one or more authentication tokens generated by the apparatus 250 after successfully authenticating a user associated with the received client device event data objects, a client device identifier, a claim type, a device protection program identifier, and/or a combination thereof. In this regard, the claim type may be based on whether a client device fault data object or a client device loss data object was received from the user, such that a corresponding claim type is transmitted within the case confirmation data. In some such embodiments, the claim confirmation data may be used by the device protection program management system in initiating a claim associated with the client device.

At block 1108, the apparatus 250 includes means, such as the third-party case lockout management module 260, communications module 258, input/output module 256, processor 252, and/or the like, or a combination thereof, to receive a claim status update data object from the device protection program management system. In some embodiments, the claim status update data object represents whether the device protection program management system successfully initiated a claim associated with the case confirmation data. Alternatively or additionally, in some embodiments, the claim status update data objects represents whether the device protection program management system successfully processed the claim, and/or whether the claim was denied or authorized. Further, in some embodiments, the claim status update data object represents whether the claim timed out and/or was cancelled by the user. It should be appreciated that the claim status update data object may embody an of a number of values as described herein.

At block 1110, the apparatus 250 includes means, such as the third-party case lockout management module 260, communications module 258, input/output module 256, processor 252, and/or the like, or a combination thereof, to perform a device lockout update action based at least on the claim status update data object. In this regard, the apparatus 250 may be configured to perform an appropriate device lockout update action based on the value of the claim status update data object received. In at least one example context, the apparatus 250, to perform the device lockout update action, is configured to either terminate an electronic lockout for the client device, or continue the electronic lockout for the client device. A non-limiting example process to perform the device lockout update action based on the claim status update data object is depicted and described herein with respect to FIG. 13.

FIG. 12 illustrates additional operations for an example process for secured device lockout management, specifically to terminate an electronic lockout based on a drop dead timer, in accordance with at least one example embodiment of the present disclosure. In some embodiments, the operations depicted are performed by a third-party provider system, such as a carrier system and/or manufacturer system, for example embodied by the apparatus 250 as depicted and described above. The apparatus 250 may be in communication with one or more other devices, systems, servers, and/or the like, for performing one or more of the operations as depicted and described below. For example, in at least some embodiments, the apparatus 250 is in communication with a user device, a device protection program management system, a client device, and/or another third-party provider such as a carrier system and/or manufacturer system.

In some embodiments, one or more of the operations illustrated with respect to FIG. 12 occurs additional to, and/or in place of, one or more operations of another process. For example, as depicted, in some embodiments FIG. 12 beings after block 1104 as depicted and described with respect to FIG. 11. Additionally or alternatively, as depicted, in some embodiments, upon completion of the operations depicted with respect to FIG. 12, the flow ends. Alternatively or additionally, it should be appreciated that in other embodiments one or more other processes and/or subprocesses may begin after one or more of the operations depicted and described with respect to FIG. 12, and/or upon completion of the operations depicted and described with respect to FIG. 12.

At block 1202, the apparatus 250 includes means, such as the third-party case lockout management module 260, communications module 258, input/output module 256, processor 252, and/or the like, or a combination thereof, to initiate a drop dead timer for a predetermined time period. In this regard, the drop dead timer may represent a timestamp interval after which a case is determined abandoned. To minimize the effects of user abandonment of a case, for example where a user forgets about the pending case and later recovers a lost or stolen device, the client device should be unlocked to enable the functionality of the client device to be accessed by the user. Accordingly, in some embodiments, the predetermined time period may be specially determined based on a reasonable time to enable a user to submit initial user case information to initiate a claim. In some embodiments, the predetermined time period represents the threshold claim initiation period of an associated device protection program management system.

At block 1204, the apparatus 250 includes means, such as the third-party case lockout management module 260, communications module 258, input/output module 256, processor 252, and/or the like, or a combination thereof, to determine no claim status update is received within the predetermined time period. In this regard, the apparatus 250 may be configured to track the drop dead timer, for example performing periodic checks to determine whether a claim status update has been received from the device protection program management system. Additionally or alternatively, the apparatus 250 may be configured to perform a check to determine whether a claim status update notification data object has been received from the device protection program management system once the drop dead timer elapses (e.g., after the predetermined time period). If a claim status update notification data object is received within the predetermined time period (e.g., before the drop dead timer elapses), the apparatus may be configured to cancel and/or otherwise terminate the drop dead timer. In this regard, in some embodiments, the apparatus 250 determines no claim status update notification data object is received within the predetermined time period after the drop dead timer has elapsed without cancellation and/or other termination by the apparatus 250. The determination may indicate that a user has abandoned initiation of a claim via the device protection program management system.

At block 1206, the apparatus 250 includes means, such as the third-party case lockout management module 260, communications module 258, input/output module 256, processor 252, and/or the like, or a combination thereof, to transmit electronic data signals to the client device, where the electronic data signals are configured to cause termination of the electronic lockout of the client device. In this regard, in some embodiments, the electronic signals represent a request to set a functionality lockout state of the client device to an unlocked state. By terminating the electronic lockout of the client device, the client device returns to normal functionality such that a user ma access such functionality for having abandoned initiation and/or processing of the claim. Such restoration of functionality may be advantageous for protecting access to the data of the client device when lost or otherwise to be removed from the rightful user's possession, but where a user has located a client device or otherwise decided to keep a client device, and thus abandoned a claim, and desires access to utilize such functionality of client device. It should be appreciated that, in some example contexts, the electronic data signals are transmitted to the client device directly, for example via one or more communication networks between the apparatus 250 and the client device. Alternatively or additionally, in at least one example context, the electronic data signals are transmitted indirectly, for example via a manufacturer system configured to cause the electronic lockout. In some such embodiments, the electronic data signals may be transmitted to the manufacturer system through one or more APIs, for example.

FIG. 13 illustrates additional operations for an example process for secured device lockout management, specifically to perform a device lockout update action based at least on a claim status update data object, in accordance with at least one example embodiment of the present disclosure. In some embodiments, the operations depicted are performed by a third-party provider system, such as a carrier system and/or manufacturer system, for example embodied by the apparatus 250 as depicted and described above. The apparatus 250 may be in communication with one or more other devices, systems, servers, and/or the like, for performing one or more of the operations as depicted and described below. For example, in at least some embodiments, the apparatus 250 is in communication with a user device, a device protection program management system, a client device, and/or another third-party provider such as a carrier system and/or manufacturer system.

In some embodiments, one or more of the operations illustrated with respect to FIG. 13 occurs additional to, and/or in place of, one or more operations of another process. For example, as depicted, in some embodiments FIG. 13 begins after block 1108 as depicted and described with respect to FIG. 11. Additionally or alternatively, as depicted, in some embodiments, upon completion of the operations depicted with respect to FIG. 13, the flow ends. Alternatively or additionally, it should be appreciated that in other embodiments one or more other processes and/or subprocesses may begin after one or more of the operations depicted and described with respect to FIG. 13, and/or upon completion of the operations depicted and described with respect to FIG. 13.

At block 1302, the apparatus 250 includes means, such as the third-party case lockout management module 260, communications module 258, input/output module 256, processor 252, and/or the like, or a combination thereof, to determine a value for a received claim status update notification data object. In this regard, the value of the received claim status update notification data object may represent the type of claim status update notification received. In this regard, the apparatus 250 may be configured to perform a different action based on the value for the received claim status update notification data object.

For example, as illustrated, in a circumstance where the apparatus 250 determines the claim status update notification data object comprises a claim denied notification data object, flow continues to block 1304. At block 1304, the apparatus 250 includes means, such as the third-party case lockout management module 260, communications module 258, input/output module 256, processor 252, and/or the like, or a combination thereof, to terminate the electronic lockout for the client device. For example, in some embodiments, to terminate the electronic lockout for the client device the apparatus 250 is configured to transmit one or more specially configured electronic data signals to the client device to set a functionality lockout state for the client device to an unlocked state. In this regard, the apparatus 250 may be configured to terminate the electronic lockout through direct communication with the client device, for example in a circumstance where the apparatus 250 embodies a manufacturer system, or indirectly through communication with a manufacturer system, for example in a circumstance where the apparatus 250 embodies a carrier system.

Additionally or alternatively, optionally in some embodiments, flow proceeds to block 1304 in a circumstance where the claim status update notification data object comprises a claim cancelled notification data object. In this regard, the claim cancelled notification data object indicates that a user has affirmatively cancelled an initiated claim, further indicating that the user has located a lost and/or stolen client device and/or otherwise has decided to keep a client device. In such circumstances, terminating the electronic lockout for the client device enables the functionality of the client device to be restored for accessing by the user.

In a circumstance where the apparatus 250 determines the claim status update notification data object comprises a claim authorized notification data object, flow proceeds to block 1306. At block 1206, the apparatus 250 includes means, such as the third-party case lockout management module 260, communications module 258, input/output module 256, processor 252, and/or the like, or a combination thereof, to continue the electronic lockout of the client device. In this regard, by continuing the electronic lockout, the accessible functionality of the client device remains limited, for example in instances where the client device has been authorized for replacement and/or repair and thus should be removed from the users possession. In this regard, by continuing the electronic lockout of the client device, the apparatus 250 enhances the security of the data accessible via the client device by preventing unauthorized or otherwise unintended and/or malicious users from accessing the data and/or other functionality. As described herein, it should be appreciated that in some embodiments the apparatus 250 performs no additional steps to continue the electronic lockout of the client device. Alternatively or additionally, the apparatus 250 may update a case status associated with the claim to indicate that the claim has been finally resolved, and that the functionality lockout state for the client device is to remain permanent. Additionally or alternatively still, the apparatus 250 may transmit one or more electronic data signals to the client device, for example directly or indirectly via one or more other third-party provider(s), for example a manufacturer device.

FIG. 14 illustrates additional operations for an example process for secured device lockout management, specifically to provide information to a device protection program management system, in accordance with at least one example embodiment of the present disclosure. In some embodiments, the operations depicted are performed by a third-party provider system, such as a carrier system and/or manufacturer system, for example embodied by the apparatus 250 as depicted and described above. The apparatus 250 may be in communication with one or more other devices, systems, servers, and/or the like, for performing one or more of the operations as depicted and described below. For example, in at least some embodiments, the apparatus 250 is in communication with a user device, a device protection program management system, a client device, and/or another third-party provider such as a carrier system and/or manufacturer system.

In some embodiments, one or more of the operations illustrated with respect to FIG. 14 occurs additional to, and/or in place of, one or more operations of another process. For example, as depicted, in some embodiments FIG. 14 begins after block 1102 as depicted and described with respect to FIG. 11. In some embodiments, for example as depicted, upon completion of the operations depicted and described with respect to FIG. 14, flow returns to one or more operations depicted with respect to FIG. 11. Additionally or alternatively, in some embodiments, upon completion of the operations depicted with respect to FIG. 14, the flow ends. Alternatively or additionally, it should be appreciated that in other embodiments one or more other processes and/or subprocesses may begin after one or more of the operations depicted and described with respect to FIG. 14, and/or upon completion of the operations depicted and described with respect to FIG. 14.

At block 1402, the apparatus 250 includes means, such as the third-party case lockout management module 260, communications module 258, input/output module 256, processor 252, and/or the like, or a combination thereof, to store at least a portion of the information associated with at least one of the client device event data objects. In some embodiments, the portion of information stored includes at least a client identifier for the client device. In some embodiments, the apparatus 250 creates and stores, for example in one or more datastores managed by the apparatus 250, a third-party case including at least the portion of information. In this regard, the third-party case may include information associated with the processing of information received by the user, and may be generated together with a case identifier utilized to uniquely identify the third-party case. In some embodiments, the stored portion of information further includes an authentication token generated by the apparatus 250 in response to successfully validating the identity of the user associated with the submitted information. In this regard, the authentication token may represent that the apparatus 250 successfully validated the identity of a user through one or more authentication processes.

At block 1404, the apparatus 250 includes means, such as the third-party case lockout management module 260, communications module 258, input/output module 256, processor 252, and/or the like, or a combination thereof, to receive a case information request from the device protection program management system. The case information request may include one or more identifiers, such as a third-party case identifier, for user in retrieving information to be utilized by the device protection program management system for initiating a claim associated with submitted information and/or processing a claim associated with the submitted information. In this regard, the case information request may include a third-party case identifier for use in retrieving corresponding information. Additionally or alternatively, in some embodiments, the case information request includes an authentication token forwarded to the device protection program management system from the apparatus 250.

At block 1406, the apparatus 250 includes means, such as the third-party case lockout management module 260, communications module 258, input/output module 256, processor 252, and/or the like, or a combination thereof, to retrieve the portion of the case information in response to receiving the case information request. For example, in at least some embodiments, the apparatus 250 may query one or more datastores to retrieve the portion of stored case information. In some such embodiments, the apparatus 250 may be configured to query the datastores based on one or more identifiers received via the case information request, for example one or more third-party case identifiers.

At block 1408, the apparatus 250 includes means, such as the third-party case lockout management module 260, communications module 258, input/output module 256, processor 252, and/or the like, or a combination thereof, to transmit the portion of the case information to the device protection program management system. In some embodiments, the portion of the case information is transmitted to the device protection program management system in response to the case information request. Such case information may be transmitted to the device protection program management system to enable the device protection program management system to utilize such case information in initiating a claim (e.g., for generating a claim) and/or for processing a claim (e.g., for determining whether the claim satisfies a predetermined rule set embodying a device protection program).

At optional block 1410, the apparatus 250 includes means, such as the third-party case lockout management module 260, communications module 258, input/output module 256, processor 252, and/or the like, or a combination thereof, to receive user case information associated with the client device. In this regard, the user may submit the user case information to the apparatus 250 for association with a claim to be initiated. In some such embodiments, the apparatus 250 may receive the user case information from a user device associated with the user. In some such embodiments, the apparatus 250 is configured to provide one or more interfaces to the user device that enable the user to input, and/or submit for transmission, the user case information to the apparatus 250. It should be appreciated that, in other embodiments, the device protection program management system directly receives the user case information, for example through direct communication with the user device as described herein.

At optional block 1412, the apparatus 250 includes means, such as the third-party case lockout management module 260, communications module 258, input/output module 256, processor 252, and/or the like, or a combination thereof, to transmit the user case information to the device protection program management system. In this regard, the user case information may be transmitted to the device protection program management system together with a third-party case identifier and/or a claim identifier received by the apparatus 250 and stored associated with a particular third-party case identifier at an earlier step. The user case information may be processed by the device protection program management system, for example for use in initiating a claim based on the user case information. In this regard, the user case information may include a claim type, a device protection program identifier, and/or the like. In some embodiments, additionally or alternatively, it should be appreciated that the transmission may cause the device protection program management system to store the user case information for future processing. Upon receiving the user case information he device protection program may have access to sufficient data to generate a claim and/or begin processing the claim. In some such embodiments, the apparatus 250 may return to one or more operations as depicted in FIG. 11, for example for processing a claim status notification data object subsequently received from the device protection program.

Additional Implementation Details

Although an example processing system has been described above, implementations of the subject matter and the functional operations described herein can be implemented in other types of digital electronic circuitry, or in computer software, firmware, or hardware, including the structures disclosed in this specification and their structural equivalents, or in combinations of one or more of them.

Embodiments of the subject matter and the operations described herein can be implemented in digital electronic circuitry, or in computer software, firmware, or hardware, including the structures disclosed in this specification and their structural equivalents, or in combinations of one or more of them. Embodiments of the subject matter described herein can be implemented as one or more computer programs, i.e., one or more modules of computer program instructions, encoded on at least one computer storage medium for execution by, or to control the operation of, the data processing apparatus. Alternatively, or in addition, the program instructions can be encoded on an artificially-generated propagated signal, e.g., a machine-generated electrical, optical, or electromagnetic signal, which is generated to encode information/data for transmission to suitable receiver apparatus for execution by an information/data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described herein can be implemented as operations performed by an information/data processing apparatus on information/data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a repository management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or information/data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described herein can be performed by one or more programmable processors executing one or more computer programs to perform actions by operating on input information/data and generating output. Processors suitable for the execution of a computer program include, by way of example, both general and special purpose microprocessors, and any one or more processors of any kind of digital computer. Generally, a processor will receive instructions and information/data from a read-only memory or a random access memory or both. The essential elements of a computer are a processor for performing actions in accordance with instructions and one or more memory devices for storing instructions and data. Generally, a computer will also include, or be operatively coupled to receive information/data from or transfer information/data to, or both, one or more mass storage devices for storing data, e.g., magnetic, magneto-optical disks, or optical disks. However, a computer need not have such devices. Devices suitable for storing computer program instructions and information/data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry. In this regard, the processes and logic flows described herein, and/or various combinations and subcombinations of the operations depicted and described, may embody one or more computer-implemented process(es), one or more computer program product(s), and/or one or more specially configured apparatus(es) in accordance with the present disclosure.

To provide for interaction with a user, embodiments of the subject matter described herein can be implemented on a computer having a display device, e.g., a CRT (cathode ray tube) or LCD (liquid crystal display) monitor, for displaying information/data to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described herein can be implemented in a computing system that includes a back-end component, e.g., as an information/data server, or that includes a middleware component, e.g., an application server, or that includes a front-end component, e.g., a client computer having a graphical user interface or a web browser through which a user can interact with an implementation of the subject matter described herein, or any combination of one or more such back-end, middleware, or front-end components. The components of the system can be interconnected by any form or medium of digital information/data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits information/data (e.g., an HTML, page) to a client device (e.g., for purposes of displaying information/data to and receiving user input from a user interacting with the client device). Information/data generated at the client device (e.g., a result of the user interaction) can be received from the client device at the server.

While this specification contains many specific implementation details, these should not be construed as limitations on the scope of any disclosures or of what may be claimed, but rather as descriptions of features specific to particular embodiments of particular disclosures. Certain features that are described herein in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

Conclusion

Many embodiments of the subject matter described may include all, or portions thereof, or a combination of portions, of the systems, apparatuses, methods, and/or computer program products described herein. The subject matter described herein includes, but is not limited to, the following specific embodiments:

A. A computer-implemented method for secure device lockout management, the computer-implemented method comprising:

receiving a device claim request indication, wherein the device claim request indication is associated with a client device, and wherein the client device is associated with a functionality lockout state;

initiating a claim associated with the client device based on the device claim request indication;

causing the functionality lockout state for the client device to be set to a locked out state;

processing the claim to determine whether to authorize the claim; and causing updating of the functionality lockout state for the client device based on the determination of whether to authorize the claim.

B. The computer-implemented method of embodiment A, wherein causing the functionality lockout state for the client device to be set to a locked out state comprises:

transmitting a device lockout request to a manufacturer system associated with the client device, wherein the device lockout request is configured to cause the manufacturer system to set the functionality lockout state for the client device to the locked out state.

C. The computer-implemented method of any of embodiments A-B, wherein causing the functionality lockout state for the client device to be set to a locked out state comprises:

transmitting a device lockout request to a third-party system associated with the client device, wherein the third-party system comprises a carrier system configured to cause a manufacturer system to set the functionality lockout state for the client device to the locked out state in response to receiving the device lockout request.

D. The computer-implemented method of any of embodiments A-C, wherein processing the claim to determine whether to continue the locked out state for the client device comprises:

receiving user claim information associated with the claim within a first timestamp interval; and processing the user claim information to authorize the claim associated with the user claim information, and wherein causing updating of the functionality lockout state for the client device based on the determination of whether to continue the locked out state client device comprises:

causing the functionality lockout state for the client device to remain set to the locked out state.

E. The computer-implemented method of any of embodiments A-D, wherein processing the claim to determine whether to continue the locked out state for the client device comprises:

receiving user claim information associated with the claim within a first timestamp interval; and processing the user claim information to deny the claim associated with the user claim information, and wherein causing updating of the functionality lockout state for the client device based on the determination of whether to continue the locked out state client device comprises:

causing the functionality lockout state for the client device to be set to an unlocked state.

F. The computer-implemented method of any of embodiments A-E, wherein processing the claim to determine whether to continue the locked out state for the client device comprises:

determining user claim information associated with the claim has not been received within a first timestamp interval, and wherein causing updating of the functionality lockout state for the client device based on the determination of whether to continue the locked out state client device comprises:

causing the functionality lockout state for the client device to be set to an unlocked state.

G. A computer program product for secure device lockout management, the computer program product comprising at least one non-transitory computer-readable storage medium having computer program code stored thereon, the computer program code configured, in execution with at least one processor, to perform the method of any of embodiments A-F.

H. An apparatus for secure device lockout management, the apparatus comprising means for performing the method of any of embodiments A-F.

I. A computer-implemented method for secure device lockout management, the computer-implemented method comprising:

receiving case confirmation data from a trusted third-party provider, the case confirmation data associated with a client device identifier for a client device;

causing rendering of a graphical user interface to a user comprising a request to enter user case information;

receiving, via the graphical user interface, the user case information, wherein in a circumstance where the user case information is received within a threshold claim initiation period, the method comprises:

initiating a claim based on the case confirmation data and the user case information;

transmitting a claim created notification data object to the trusted third-party provider comprising computer program instructions configured to cause continuation of an electronic lockout for the client device; and receiving claim requirements data from at least one user device associated with the client device, the claim requirements data based on a predefined rule set associated with a device protection program, wherein in a circumstance where the claim requirements data is received within a threshold claim completion period, the method comprises:

transmitting a claim denied notification data object to the trusted third-party provider in a circumstance where the claim requirements data do not satisfy the predefined rule set, wherein the claim denied notification data object comprises computer program instructions configured to cause termination of the electronic lockout for the client device; and transmitting a claim authorized notification data object to the trusted third-party provider in a circumstance where the claim requirements data satisfy the predefined rule set, wherein the claim denied notification data object comprises computer program instructions configured to cause continuation of the electronic lockout for the client device.

J. The computer-implemented method of embodiment I, the computer-implemented method further comprising:

comparing the claim requirements data with the predefined rule set to determine whether the claim requirements data satisfy the predefined rule set.

K. The computer-implemented method of any of embodiments I-J, the computer-implemented method further comprising:

terminating processing of the case confirmation data in a circumstance where the user case data is not received from the at least one user device within the threshold claim initiation period.

L. The computer-implemented method of any of embodiments I-K, the computer-implemented method further comprising:

extracting the device identifier from the case confirmation data.

M. The computer-implemented method of any of embodiments I-L, the computer-implemented method further comprising:

identifying an authentication token from the case confirmation data; and retrieving third-party case data from the trusted third-party provider utilizing the authentication token, wherein the third-party case data comprises at least the device identifier.

N. The computer-implemented method of any of embodiments I-M, wherein the computer-implemented method further comprises, in the circumstance where the claim requirements data is received within the claim requirements time threshold:

comparing the claim requirements data with the predefined rule set to determine whether the claim requirements data satisfy the predefined rule set; and wherein the method further comprises, in a circumstance where the claim requirements data satisfy the predefined rule set, authorizing the claim; and wherein the method further comprises, in a circumstance where the claim requirements data do not satisfy the device predefined rule set, denying the claim.

O. The computer-implemented of any of embodiments I-N, the computer-implemented method further comprising:

in a circumstance where the claim requirements data is not received within the claim requirements time threshold, terminating processing of the claim; and transmitting a claim cancelled notification data object to the trusted third-party provider, wherein the claim cancelled notification data object is configured to cause the trusted third-party provider to terminate the electronic lockout for the client device.

P. A computer program product for secure device lockout management, the computer program product comprising at least one non-transitory computer-readable storage medium having computer program code stored thereon, the computer program code configured, in execution with at least one processor, to perform the method of any of embodiments I-O.

Q. An apparatus for secure device lockout management, the apparatus comprising means for performing the method of any of embodiments I-O.

R. A computer-implemented method for secure device lockout management, the computer-implemented method comprising:
 receiving client device event data objects associated with a client device, the client event data objects comprising a case initiation request;
 transmitting electronic data signals to the client device configured to cause an electronic lockout of the client device;
 transmitting case confirmation data to a device protection program management system, wherein the case confirmation data is based at least in part on a client device fault data object or a client device loss data object; and
 in a circumstance in which a claim status update data object is received from the device protection program management system, performing a device lockout update action based at least on the claim status update data object.

S. The computer-implemented method of embodiment R, the computer-implemented method further comprising:
 initiating a drop dead timer for a predetermined time period; and
 in a circumstance in which no claim status update data object is received from the device protection program management system within the predetermined time period or a claim denied notification data object is received from the device protection program management system within the predetermined time period, transmitting electronic data signals to the client device configured to cause termination of the electronic lockout of the client device.

T. The computer-implemented method of any of embodiments R-S, wherein performing the device lockout update action based on the claim status update data object comprises:
 in a circumstance where the claim status update data object comprises a claim denied notification data object, terminating the electronic lockout, and
 in a circumstance where the claim status updated data object comprises a claim authorized notification data object, continuing the electronic lockout for the client device.

U. The computer-implemented method of any of embodiments R-T, the computer-implemented method further comprising:
 storing at least a portion of information associated with at least one of the client device event data object in response to receiving the client device event data objects, the portion of information comprising at least a client device identifier for the client device;
 receiving a case information request from the device protection program management system;
 retrieving the portion of the case information in response to receiving the case information request; and
 transmitting the portion of the case information to the device protection program management system in response to the case information request.

V. The computer-implemented method of any of embodiments R-U, the computer-implemented method further comprising:
 receiving a claim cancelled notification data object from the device protection program management system; and
 terminating the electronic lockout for the client device.

W. The computer-implemented method of any of embodiments R-V, the computer-implemented method further comprising:
 receiving user case information associated with the client device; and
 transmitting the user case information to the device protection program management system.

X. A computer program product for secure device lockout management, the computer program product comprising at least one non-transitory computer-readable storage medium having computer program code stored thereon, the computer program code configured, in execution with at least one processor, to perform the method of any of embodiments R-W.

Y. An apparatus for secure device lockout management, the apparatus comprising means for performing the method of any of embodiments R-W.

Many modifications and other embodiments of the embodiments set forth herein will come to mind to one skilled in the art to which these embodiments pertain having the benefit of the teachings presented in the foregoing descriptions and the associated drawings. For example, any combination of some or all of the subroutines and sub-processes described herein may be claimed in combination or individually without departing from the scope and spirit of the present disclosure. Therefore, it is to be understood that the embodiments are not to be limited to the specific embodiments disclosed and that modifications and other embodiments are intended to be included within the scope of the appended claims. Although specific terms are employed herein, they are used in a generic and descriptive sense only and not for purposes of limitation

What is claimed is:

1. An apparatus comprising at least one processor and at least one memory, the at least one memory having computer-coded instructions stored thereon that, in execution with the at least one processor, causes the apparatus to:
 receive client device event data objects associated with a client device, the client event data objects comprising a case initiation request;
 transmit electronic data signals to the client device configured to cause an electronic lockout of the client device;
 transmit case confirmation data to a device protection program management system, wherein the case confirmation data is based at least in part on a client device fault data object or a client device loss data object; and
 in a circumstance in which a claim status update data object is received from the device protection program management system, perform a device lockout update action based at least in part on the claim status update data object, wherein to perform the device lockout update action in the circumstance in which the claim status update data object is received from the device protection program management system, the apparatus is caused to:
  receive a claim cancelled notification data object from the device protection program management system; and
  terminate the electronic lockout for the client device.

2. The apparatus according to claim 1, the apparatus further caused to:
  initiate a drop dead timer for a predetermined time period; and
  in a circumstance in which no claim status update data object is received from the device protection program management system within the predetermined time period or a claim denied notification data object is received from the device protection program management system within the predetermined time period, transmit electronic data signals to the client device configured to cause termination of the electronic lockout of the client device.

3. The apparatus according to claim 1, wherein to perform the device lockout update action based on the claim status update data object, the apparatus is caused to:
  in a circumstance where the claim status updated data object comprises a claim authorized notification data object, continue the electronic lockout for the client device.

4. The apparatus according to claim 1, the apparatus further caused to:
  store at least a portion of information associated with at least one of the client device event data objects in response to receiving the client device event data objects, the portion of information comprising at least a client device identifier for the client device;
  receive a case information request from the device protection program management system;
  retrieve the portion of the case information in response to receiving the case information request; and
  transmit the portion of the case information to the device protection program management system in response to the case information request.

5. The apparatus according to claim 1, the apparatus further caused to:
  receive user case information associated with the client device; and
  transmit the user case information to the device protection program management system.

6. The apparatus according to claim 1, the apparatus further caused to:
  authenticate identity data corresponding to the client device;
  generate a user authentication token indicating verification of the identity data; and
  transmit the user authentication token to the device protection program management system.

7. A computer-implemented method comprising:
  receiving client device event data objects associated with a client device, the client event data objects comprising a case initiation request;
  transmitting electronic data signals to the client device configured to cause an electronic lockout of the client device;
  transmitting case confirmation data to a device protection program management system, wherein the case confirmation data is based at least in part on a client device fault data object or a client device loss data object; and
  in circumstances in which a claim status update data object is received from the device protection program management system, performing a device lockout update action based at least in part on the claim status update data object, wherein performing the device lockout update action in the circumstance in which the claim status update data object is received from the device protection program management system comprises:
  receiving a claim cancelled notification data object from the device protection program management system; and
  terminating the electronic lockout for the client device.

8. The computer-implemented method according to claim 7, the computer-implemented method further comprising:
  initiating a drop dead timer for a predetermined time period; and
  in a circumstance in which no claim status update data object is received from the device protection program management system within the predetermined time period or a claim denied notification data object is received from the device protection program management system within the predetermined time period, transmitting electronic data signals to the client device configured to cause termination of the electronic lockout of the client device.

9. The computer-implemented method according to claim 7, wherein performing the device lockout update action based on the claim status update data object comprises:
  in a circumstance where the claim status updated data object comprises a claim authorized notification data object, continuing the electronic lockout for the client device.

10. The computer-implemented method according to claim 7, the computer-implemented method further comprising:
  storing at least a portion of information associated with at least one of the client device event data objects in response to receiving the client device event data objects, the portion of information comprising at least a client device identifier for the client device;
  receiving a case information request from the device protection program management system;
  retrieving the portion of the case information in response to receiving the case information request; and
  transmitting the portion of the case information to the device protection program management system in response to the case information request.

11. The computer-implemented method according to claim 7, the computer-implemented method further comprising:
  receiving user case information associated with the client device; and
  transmitting the user case information to the device protection program management system.

12. The computer-implemented method according to claim 7, the computer-implemented method further comprising:
  authenticating identity data corresponding to the client device;
  generating a user authentication token indicating verification of the identity data; and
  transmitting the user authentication token to the device protection program management system.

13. A computer program product comprising at least one non-transitory computer readable storage medium having computer program code stored thereon that, in execution with at least one processor, configures the computer program product for:
  receiving client device event data objects associated with a client device, the client event data objects comprising a case initiation request;

transmitting electronic data signals to the client device configured to cause an electronic lockout of the client device;

transmitting case confirmation data to a device protection program management system, wherein the case confirmation data is based at least in part on a client device fault data object or a client device loss data object; and in a circumstance in which a claim status update data object is received from the device protection program management system, performing a device lockout update action based at least in part on the claim status update data object, wherein performing the device lockout update action in the circumstance in which the claim status update data object is received from the device protection program management system comprises:

receiving a claim cancelled notification data object from the device protection program management system; and terminating the electronic lockout for the client device.

14. The computer program product according to claim 13, the computer program product further configured for:

initiating a drop dead timer for a predetermined time period; and in a circumstance in which no claim status update data object is received from the device protection program management system within the predetermined time period or a claim denied notification data object is received from the device protection program management system within the predetermined time period, transmitting electronic data signals to the client device configured to cause termination of the electronic lockout of the client device.

15. The computer program product according to claim 13, wherein performing the device lockout update action based on the claim status update data object comprises:

in a circumstance where the claim status updated data object comprises a claim authorized notification data object, continuing the electronic lockout for the client device.

16. The computer program product according to claim 13, the computer program product further configured for:

storing at least a portion of information associated with at least one of the client device event data objects in response to receiving the client device event data objects, the portion of information comprising at least a client device identifier for the client device;

receiving a case information request from the device protection program management system;

retrieving the portion of the case information in response to receiving the case information request; and transmitting the portion of the case information to the device protection program management system in response to the case information request.

17. The computer program product according to claim 13, the computer program product further configured for:

authenticating identity data corresponding to the client device;

generating a user authentication token indicating verification of the identity data; and transmitting the user authentication token to the device protection program management system.

18. A computer-implemented method comprising:

receiving client device event data objects associated with a client device, the client event data objects comprising a case initiation request;

transmitting electronic data signals to the client device configured to cause an electronic lockout of the client device;

transmitting case confirmation data to a device protection program management system, wherein the case confirmation data is based at least in part on a client device fault data object or a client device loss data object; and in circumstances in which a claim status update data object is received from the device protection program management system, wherein the claim status updated data object comprises a claim authorized notification data object, performing a device lockout update action comprising continuing the electronic lockout for the client device in response to the claim status update data object.

19. The computer-implemented method according to claim 18, the computer-implemented method further comprising:

receiving user case information associated with the client device; and transmitting the user case information to the device protection program management system.

20. The computer-implemented method according to claim 18, the computer-implemented method further comprising:

authenticating identity data corresponding to the client device;

generating a user authentication token indicating verification of the identity data; and transmitting the user authentication token to the device protection program management system.

* * * * *